(12) United States Patent
Hirai

(10) Patent No.: US 7,476,423 B2
(45) Date of Patent: Jan. 13, 2009

(54) POLYMERIZABLE LIQUID CRYSTAL COMPOSITION

(75) Inventor: Yoshiharu Hirai, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 47 days.

(21) Appl. No.: 11/812,615

(22) Filed: Jun. 20, 2007

(65) Prior Publication Data

US 2008/0014374 A1    Jan. 17, 2008

(30) Foreign Application Priority Data

Jun. 29, 2006   (JP) ............................. 2006-178972
Mar. 26, 2007   (JP) ............................. 2007-078570

(51) Int. Cl.
C09K 19/52    (2006.01)
C09K 19/32    (2006.01)

(52) U.S. Cl. ........................... 428/1.1; 428/1.2; 428/1.3; 252/299.01; 252/299.5; 252/299.62; 252/299.66; 252/299.67

(58) Field of Classification Search ............ 252/299.01, 252/299.5, 299.62, 299.66, 299.67; 428/1.1, 428/1.2, 1.3; 349/117, 123
See application file for complete search history.

(56) References Cited

U.S. PATENT DOCUMENTS

| 5,863,457 | A | 1/1999 | Hasebe et al. |
| 6,379,758 | B1 | 4/2002 | Hanmer et al. |
| 2005/0140900 | A1 | 6/2005 | Jeon et al. |
| 2005/0224754 | A1 | 10/2005 | Hirai et al. |
| 2006/0114392 | A1 | 6/2006 | Tanaka |
| 2006/0182900 | A1 | 8/2006 | Kim et al. |

FOREIGN PATENT DOCUMENTS

| GB | 2 324 382 | 10/1998 |
| JP | 10-319408 | 12/1998 |
| JP | 2001-172339 | * 6/2001 |
| JP | 2002-243942 | 8/2002 |
| JP | 2004-198478 | 7/2004 |
| JP | 2005-196221 | 7/2005 |

OTHER PUBLICATIONS

English translation by computer for JP 2001-172339, http://www4.ipdl.inpit.go.jp/Tokujitu/PAJdetail.ipdl?N0000=60&N0120=01&N2001=2&N3001=2001-172339.*
J.S. Yu et al., "A New Polarizer with Wide Viewing Angle and Low Color Shift Characteristics designed for In-Plane-Swithcing Liquid Crystal Display (IPS-LCD)", IDW '04 FMC8-4, pp. 655-658, 2004.
Masakazu Nakata et al., "P-58: Novel Optical Compensation Films for IPS-LCDs", SID '06 P-58, pp. 420-423, 2006.
Abstract of WO 05/38517, published Apr. 28, 2005.
Abstract of JP 2000-514202, published Oct. 24, 2000.
Abstract of JP 7-294735, published Nov. 10, 1995.
Abstract of WO 04/72699, published Aug. 26, 2004.
Abstract of JP 2006-126757, published May 18, 2006.

* cited by examiner

*Primary Examiner*—Shean C Wu
(74) *Attorney, Agent, or Firm*—Wenderoth, Lind & Ponack, L.L.P.

(57) ABSTRACT

The invention is to provide such a polymerizable liquid crystal composition that is excellent in stability in a solution state, shows good coating property on a supporting substrate, and has uniform homeotropic alignment property. The polymerizable liquid crystal composition of the invention contains an acrylate compound and a bisphenol fluorene compound. The bisphenol fluorene compound is effective for controlling uniform homeotropic alignment of the polymerizable liquid crystal composition.

18 Claims, 1 Drawing Sheet

POLYMERIZABLE LIQUID CRYSTAL COMPOSITION

FIELD OF THE INVENTION

The present invention relates to a polymerizable liquid crystal composition and a liquid crystal film obtained from the same. The invention also relates to an optical compensation film, an optical device and a liquid crystal display device using the film.

BACKGROUND OF THE INVENTION

A polymerizable compound having a liquid crystal phase provides a polymer having such a function as optical compensation through polymerization. This is because the alignment of the liquid crystal molecules is fixed by polymerization. In order to utilize the function of the polymer, various kinds of polymerizable compounds have been developed. However, sufficient functions may not be obtained with only one polymerizable compound. Accordingly, there have been attempts that a composition is prepared by using plural polymerizable compounds, and the composition is polymerized (as described in JP-A-10-319408 (GB 2324382A), JP-A-2004-198478, JP-A-2002-243942 and JP-A-2005-196221).

The situation that an alignment state of a liquid crystal skeleton is in homogeneous alignment, tilted alignment, homeotropic alignment or twisted alignment is sometimes referred simply to as such an expression that a polymer has homogeneous alignment, tilted alignment, homeotropic alignment or twisted alignment, respectively.

A polymer having homeotropic alignment has an optical axis in an $n_z$ direction, and the refractive index in the direction of the optical axis is larger than the refractive index in the direction perpendicular to the optical axis. Accordingly, the polymer is classified into a positive C plate in terms of optical indicatrix. The positive C plate can be applied, by combining with a film having the other optical function, to optical compensation of a liquid crystal mode with horizontal alignment, i.e., a so-called IPS (in-plane switching) mode, and the like, such as improvement in viewing angle characteristics of a polarizing plate (as described in M. S. Park, et al., IDW, '04, FMC8-4, M. Nakata, et al., SID, '06, P-58, WO 05/38517 and US 2006/182900).

In the aforementioned purposes, a polymerizable liquid crystal material may be laminated with a glass substrate or a plastic substrate in some cases. Examples of the material used for the plastic substrate include TAC (triacetyl cellulose), polycarbonate, PET and a cycloolefin polymer.

In order to make a polymerizable liquid crystal in homeotropic alignment, there are such methods, in the case where the supporting substrate is a glass substrate, as a method of selecting the structure of the polymerizable liquid crystal compound to exhibit a smectic phase (as described in JP-A-2000-514202 (U.S. Pat. No. 6,379,758 B1)), and a method of coating lecithin as a homeotropic alignment film on the glass substrate (as described in JP-A-7-294735 (U.S. Pat. No. 5,863,457)). In the case where the supporting substrate is a plastic substrate, it is necessary to form an alignment film on the supporting substrate (as described in JP-A-10-319408 (GB 2324382A) and WO 04/72699). The inventors have found such a polymerizable liquid crystal composition that a polymerizable liquid crystal compound can be formed on a glass substrate or a plastic substrate to have homeotropic alignment without formation of an alignment film on the supporting substrate and can be excellent in adhesion property (JP-A-2006-126757 (US 2005/224754 A1)). However, the composition may suffer increase of the viscosity of the solution to provide a problem in storage stability, and thus it is necessary to mix an additive immediately before use. Furthermore, there are some cases where uniform alignment property cannot be obtained depending on the kind of the supporting substrate. Accordingly, such a polymerizable liquid crystal composition has been demanded that provides homeotropic alignment on a glass substrate and a plastic substrate without a surface treatment with a homeotropic alignment film having long-chain alkyl groups or the like or an inorganic material, and particularly is excellent in storage stability of the solution.

SUMMARY OF THE INVENTION

An object of the invention is to provide such a polymerizable liquid crystal composition that is excellent in stability in a solution state, shows good coating property on a supporting substrate, and has uniform homeotropic alignment property without a surface treatment with a homeotropic alignment film having a long-chain alkyl group or the like or an inorganic material particularly in the case where a plastic substrate is used as the supporting substrate. Another object of the invention is to provide a liquid crystal layer controlled in alignment containing the polymerizable liquid crystal composition, a liquid crystal film obtained by polymerizing the polymerizable liquid crystal composition, and an optical compensation film containing the film. Still another object of the invention is to provide an image display device, such as a liquid crystal display device, an organic EL display device and PDP, containing the optical compensation film.

The inventors have found that the use of a bisphenol fluorene compound as a component of a polymerizable liquid crystal composition is effective for controlling uniform homeotropic alignment of the polymerizable liquid crystal composition without a surface treatment with a homeotropic alignment film having a long-chain alkyl group or the like or an inorganic material in the case where the supporting substrate is a glass substrate or a plastic substrate, and provides good storage stability of the solution since the solution does not suffer coloration, change in viscosity, and the like with the lapse of time, whereby the invention has been completed. The bisphenol fluorene compound has at least one acryloyloxy group and can be polymerized as similar to a polymerizable liquid crystal compound. A polymer obtained from the polymerizable liquid crystal composition has uniform homeotropic alignment, and the same advantages can be obtained in the case where the polymerizable liquid crystal composition is coated on a supporting substrate having been subjected to a mechanical surface treatment, such as rubbing, or a chemical surface treatment.

The invention includes, as one aspect, a polymerizable liquid crystal composition shown in the following item [1].

[1] A polymerizable liquid crystal composition containing at least one compound selected from a group of compounds represented by the formulae (1-1) and (1-2) as a component (A), at least one compound selected from a group of compounds represented by the formula (2-1) as a component (B), and at least one compound selected from a group of compounds represented by the formulae (3-1) to (3-6) as a component (C); arbitrarily containing at least one compound selected from a group of compounds represented by the formulae (4-1) and (4-2) as a component (D); and arbitrarily containing a non-liquid crystalline multifunctional polymerizable compound having from 3 to 70 acryloyl groups or methacryloyl groups in one molecule as a component (E):

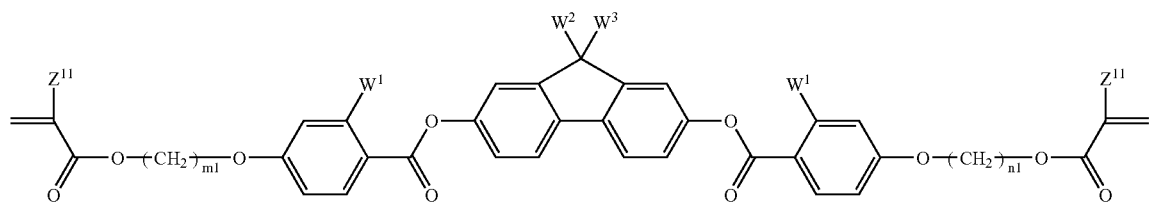
(1-1)

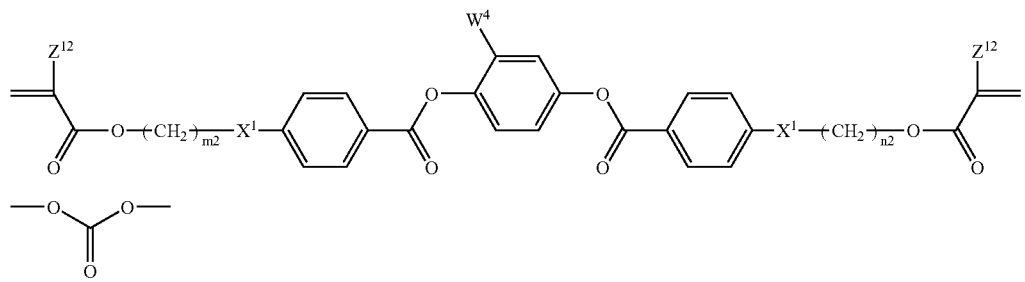
(1-2)

(a)

wherein $Z^{11}$ independently represents hydrogen, fluorine, methyl or trifluoromethyl; $Z^{12}$ independently represents hydrogen, fluorine, methyl or trifluoromethyl; $W^1$ independently represents hydrogen or fluorine; $W^2$ and $W^3$ each independently represents hydrogen or methyl; $W^4$ represents hydrogen or methyl; $X^1$ represents —O— or a group represented by the formula (a); and m1, m2, n1 and n2 each independently represents an integer of from 2 to 15,

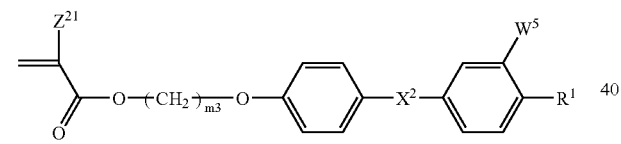
(2-1)

wherein $Z^{21}$ represents hydrogen or methyl; $R^1$ represents cyano, trifluoromethoxy, alkyl having from 1 to 10 carbon atoms or alkoxy having from 1 to 10 carbon atoms; $W^5$ represents hydrogen or fluorine; $X^2$ represents a single bond, —COO— or —OCO—; and m3 represents an integer of from 2 to 15,

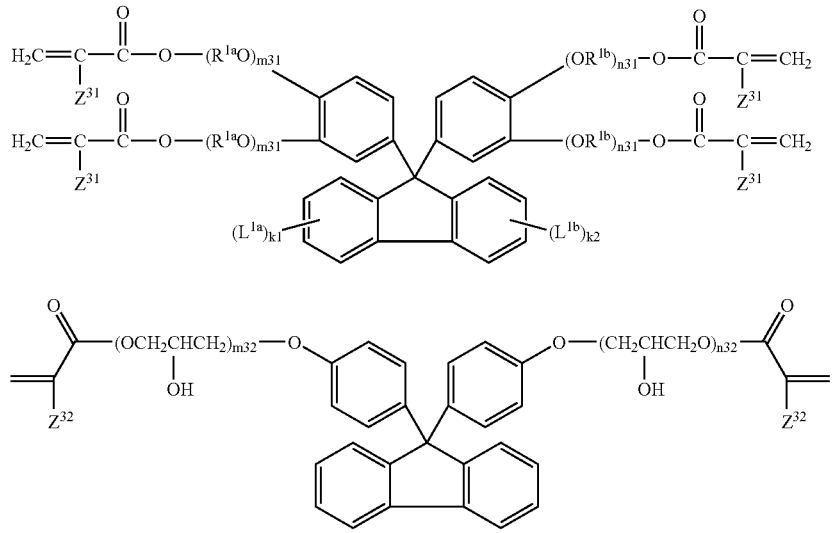
(3-1)

(3-2)

-continued

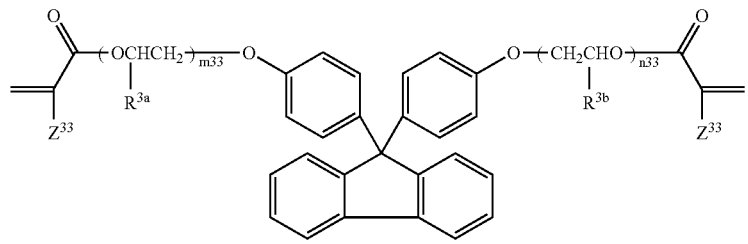 (3-3)

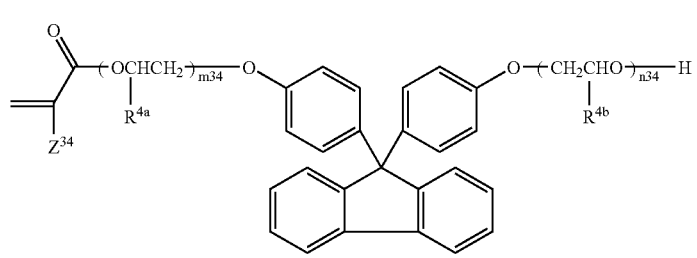 (3-4)

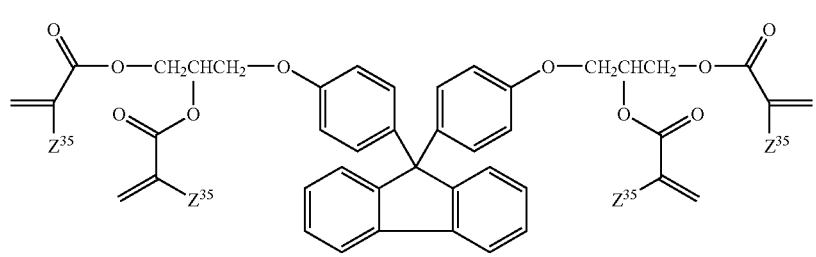 (3-5)

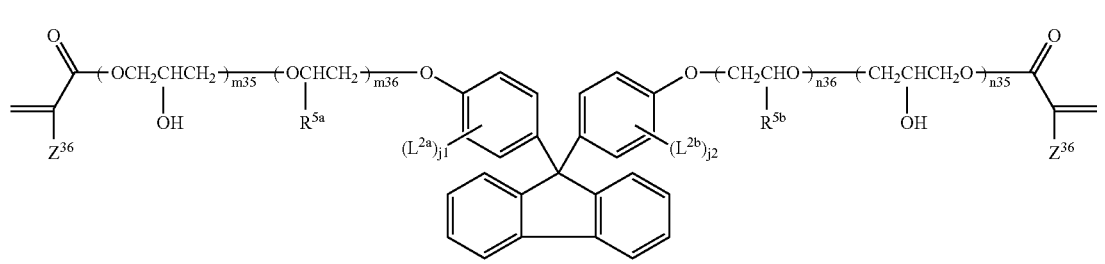 (3-6)

wherein in the formula (3-1), $L^{1a}$ and $L^{1b}$ each independently represents alkyl having from 1 to 4 carbon atoms; $R^{1a}$ and $R^{1b}$ each independently represents alkylene having from 2 to 4 carbon atoms; $Z^{31}$ independently represents hydrogen or methyl; k1 and k2 each independently represents an integer of from 0 to 4; and m31 and n31 each independently represents an integer of from 0 to 6, in the formula (3-2), $Z^{32}$ independently represents hydrogen or methyl; and m32 and n32 each independently represents an integer of from 1 to 3, in the formula (3-3), $Z^{33}$ independently represents hydrogen or methyl; $R^{3a}$ and $R^{3b}$ each independently represents hydrogen, methyl or ethyl; and $m^{33}$ and $n^{33}$ each independently represents an integer of from 0 to 3, in the formula (3-4), $Z^{34}$ represents hydrogen or methyl; $R^{4a}$ and $R^{4b}$ each independently represents hydrogen or alkyl having from 1 to 6 carbon atoms; and m34 and n34 each independently represents an integer of from 0 to 10, in the formula (3-5), $Z^{35}$ independently represents hydrogen or methyl, and in the formula (3-6), $Z^{36}$ independently represents hydrogen or methyl; $R^{5a}$ and $R^{5b}$ each independently represents hydrogen or alkyl having from 1 to 6 carbon atoms; $L^{2a}$ and $L^{2b}$ each independently represents alkyl having from 1 to 6 carbon atoms; m35 and n35 each independently represents an integer of from 1 to 3; m36 and n36 each independently represents an integer of from 1 to 3; and j1 and j2 each independently represents an integer of from 0 to 4,

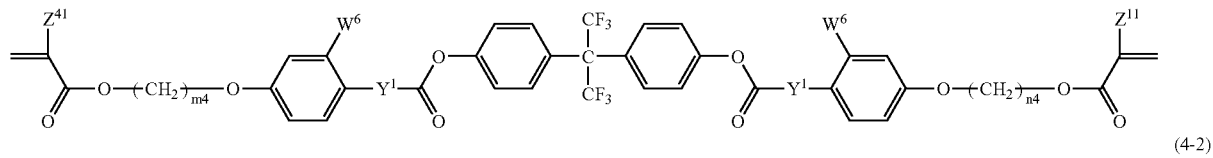

(4-1)

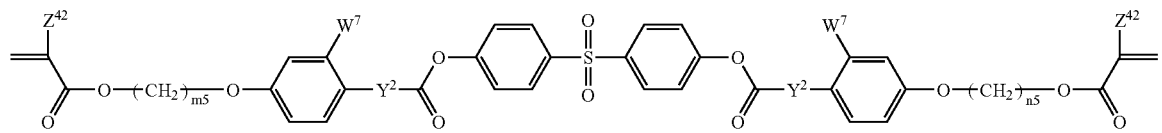

(4-2)

wherein $Z^{41}$ and $Z^{42}$ each independently represents hydrogen or methyl; $Y^1$ and $Y^2$ each independently represents a single bond, —$(CH_2)_2$— or —CH=CH—; $W^6$ and $W^7$ each independently represents hydrogen or fluorine; and m4, m5, n4 and n5 each independently represents an integer of from 2 to 15.

DETAILED DESCRIPTION OF THE INVENTION

Figure 1:
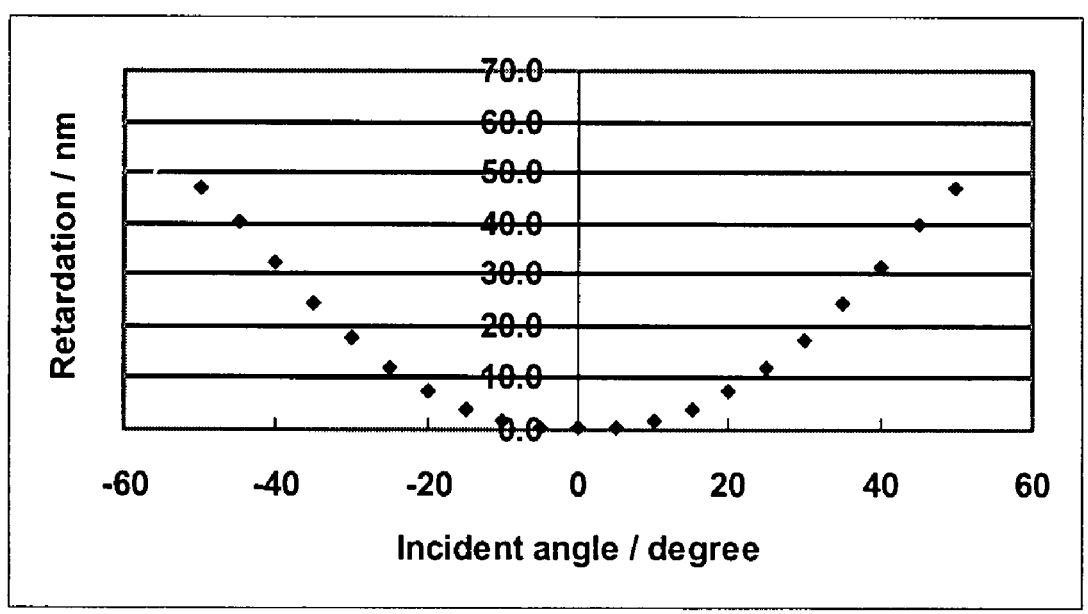
FIG. 1 is a graph showing measurement results of retardation of a liquid crystal film of Example 1.

The terms used herein are defined as follows. A liquid crystal compound is a generic term for a compound having a liquid crystal phase and a compound having no liquid crystal phase but being useful as a component of a liquid crystal composition. A liquid crystal phase includes a nematic phase, a smectic phase, a cholesteric phase and the like, and means a nematic phase in many cases. Polymerizability means such a capability that a monomer undergoes polymerization through such means as light, heat or a catalyst to provide a polymer. At least one compound represented by the formula (1-1) is sometimes referred to as a compound (1-1). The rule may also be applied to compounds represented by the other formulae. The component (E) may be referred to as a compound (E). The term "(meth) acrylate" means one or both of acrylate and methacrylate. In the chemical formulae, in the case where a substituent on a benzene ring has a bond that does not bonded to any specific atom on the benzene ring, the substituent is bonded to an arbitrary position on the benzene ring.

In the invention, the polymerizable liquid crystal composition is described as a system containing no solvent for convenience of clear illustration the compositional ratios of the components of the composition. A solution containing the polymerizable liquid crystal composition and a solvent is expressed as a solution of the polymerizable liquid crystal composition. However, the expression does not only mean that a polymerizable liquid crystal composition containing no solvent is firstly prepared, which is then diluted by adding a solvent. In normal cases, the components of the polymerizable liquid crystal composition are dissolved in a solvent to prepare a solution of the polymerizable liquid crystal composition.

Alignment of liquid crystal molecules is classified into homogeneous, homeotropic, tilted, twisted and the like, based on the extent of the tilt angle and the like. The tilt angle is an angle between the alignment state of the liquid crystal molecule and a supporting substrate. The homogeneous alignment is such a state that the alignment state of the liquid crystal molecules is in parallel to the substrate, and the liquid crystal molecules are aligned in one direction. The tilt angle in the homogeneous alignment is, for example, from 0 to 5 degree. The homeotropic alignment is such a state that the alignment state of the liquid crystal molecules is perpendicular to the substrate. The tilt angle in the homeotropic alignment is, for example, from 85 to 90 degree. The tilted alignment is such a state that the alignment state of the liquid crystal molecules is changed from parallel to perpendicular apart from the substrate. The tilt angle in the tilted alignment is, for example, from 5 to 85 degree. The twisted alignment is such a state that the alignment state of the liquid crystal molecules is in parallel to the substrate, but is twisted in a step form with a helical axis as the center. The tilt angle in the twisted alignment is, for example, from 0 to 5 degree.

The invention also includes the following items [2] to [18] in addition to the aforementioned item [1].

[2] The polymerizable liquid crystal composition according to the item [1], wherein in the formulae (1-1) and (1-2), $Z^{11}$ independently represents hydrogen, fluorine, methyl or trifluoromethyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); and m1, m2, n1 and n2 each independently represents an integer of from 2 to 10, in the formula (2-1), $Z^{21}$ represents hydrogen or methyl; $R^1$ represents cyano, alkyl having from 1 to 8 carbon atoms or alkoxy having from 1 to 8 carbon atoms; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ independently represents hydrogen or methyl; and m31 and n31 each independently represents an integer of from 0 to 6, in the formula (3-2), $Z^{32}$ independently represents hydrogen or methyl; and m32 and n32 each independently represents an integer of from 1 to 3, in the formula (3-3), $Z^{33}$ independently represents hydrogen or methyl; $R^{3a}$ and $R^{3b}$ each independently represents hydrogen, methyl or ethyl; and m33 and n33 each independently represents an integer of from 0 to 3, in the formula (3-4), $Z^{34}$ represents hydrogen or methyl; $R^{4a}$ and $R^{4b}$ each independently represents hydrogen or alkyl having from 1 to 6 carbon atoms; and m34 and n34 each independently represents an integer of from 0 to 10, in the formula (3-5), $Z^{35}$ independently represents hydrogen or methyl, in the formula (3-6), $Z^{36}$ independently represents hydrogen or methyl; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 2 to 10, the component (E) is a non-liquid crystalline multifunctional polymerizable compound having from 3 to 64 acryloyloxy groups or methacryloyloxy groups in one molecule, and the ratio of the component (A) is from 30 to 97% by weight, the ratio of the component (B) is from 3 to 45% by weight, and the ratio of the component (D) is from 0 to 25% by weight, based on the total weight of the component (A), the component (B) and the component (D); and the weight ratio of the component (C) is from 0.01 to 0.20 and the weight ratio of the component (E) is from 0 to 0.30, in terms of the total weight of the component (A), the component (B) and the component (D).

[3] The polymerizable liquid crystal composition according to the item [1], wherein in the formulae (1-1) and (1-2), $Z^{11}$ independently represents hydrogen or methyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); and m1, m2, n1 and n2 each independently represents an integer of from 2 to 10, in the formula (2-1), $Z^{21}$ represents hydrogen or methyl; $R^1$ represents cyano, alkyl having from 1 to 8 carbon atoms or alkoxy having from 1 to 8 carbon atoms; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ represents hydrogen; and m31 and n31 each independently represents an integer of from 0 to 6, in the formula (3-2), $Z^{32}$ represents hydrogen; and m32 and n32 each independently represents an integer of from 1 to 3, in the formula (3-3), $Z^{33}$ represents hydrogen; $R^{3a}$ and $R^{3b}$ each represents hydrogen; and m33 and n33 each independently represents an integer of from 0 to 3, in the formula (3-4), $Z^{34}$ represents hydrogen; $R^{4a}$ and $R^{4b}$ each represents hydrogen; and m34 and n34 each independently represents an integer of from 0 to 10, in the formula (3-5), $Z^{35}$ represents hydrogen, in the formula (3-6), $Z^{36}$ represents hydrogen; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 2 to 10, the component (E) is a non-liquid crystalline multifunctional polymerizable compound having from 3 to 32 acryloyloxy groups or methacryloyloxy groups in one molecule, and the ratio of the component (A) is from 35 to 97% by weight, the ratio of the component (B) is from 3 to 45% by weight, and the ratio of the component (D) is from 0 to 20% by weight, based on the total weight of the component (A), the component (B) and the component (D); and the weight ratio of the component (C) is from 0.01 to 0.20 and the weight ratio of the component (E) is from 0 to 0.28, in terms of the total weight of the component (A), the component (B) and the component (D).

[4]) The polymerizable liquid crystal composition according to the item [1], wherein in the formulae (1-1) and (1-2), $Z^{11}$ independently represents hydrogen or methyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); and m1, m2, n1 and n2 each independently represents an integer of from 2 to 10, in the formula (2-1), $Z^{21}$ represents hydrogen or methyl; $R^1$ represents cyano, alkyl having from 1 to 8 carbon atoms or alkoxy having from 1 to 8 carbon atoms; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ represents hydrogen; and m31 and n31 each independently represents an integer of from 0 to 6, in the formula (3-2), $Z^{32}$ represents hydrogen; and m32 and n32 each represents 1, in the formula (3-3), $Z^{33}$ represents hydrogen; $R^{3a}$ and $R^{3b}$ each represents hydrogen; and m33 and n33 each independently represents an integer of from 1 to 3, in the formula (3-4), $Z^{34}$ represents hydrogen; $R^{4a}$ and $R^{4b}$ each represents hydrogen; and m34 and n34 each independently represents an integer of from 0 to 5, in the formula (3-5), $Z^{35}$ represents hydrogen, in the formula (3-6), $Z^{36}$ represents hydrogen; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 2 to 10, the component (E) is a non-liquid crystalline multifunctional polymerizable compound having from 3 to 32 acryloyloxy groups or methacryloyloxy groups in one molecule, and the ratio of the component (A) is from 35 to 95% by weight, the ratio of the component (B) is from 5 to 45% by weight, and the ratio of the component (D) is from 0 to 20% by weight, based on the total weight of the component (A), the component (B) and the component (D); and the weight ratio of the component (C) is from 0.01 to 0.20 and the weight ratio of the component (E) is from 0 to 0.28, in terms of the total weight of the component (A), the component (B) and the component (D).

[5] The polymerizable liquid crystal composition according to the item [1], wherein in the formulae (1-1) and (1-2), $Z^{11}$ independently represents hydrogen or methyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); m1 and n1 each independently represents an integer of from 2 to 8; and m2 and n2 each independently represents an integer of from 2 to 8, in the formula (2-1), $Z^{21}$ represents hydrogen or methyl; $R^1$ represents cyano; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ represents hydrogen; and m31 and n31 each independently represents an integer of from 1 to 4, in the formula (3-2), $Z^{32}$ represents hydrogen; and m32 and n32 each represents 1, in the formula (3-3), $Z^{33}$ represents hydrogen; $R^{3a}$ and $R^{3b}$ each represents hydrogen; and m33 and n33 each independently represents an integer of from 1 to 3, in the formula (3-4), $Z^{34}$ represents hydrogen; $R^{4a}$ and $R^{4b}$ each represents hydrogen; and m34 and n34 each independently represents an integer of from 0 to 2, in the formula (3-5), $Z^{35}$ represents hydrogen, in the formula (3-6), $Z^{36}$ represents hydrogen; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 2 to 8, the component (E) is a non-liquid crystalline multifunctional polymerizable compound having from 3 to 16 acryloyloxy groups or methacryloyloxy groups in one molecule, and the ratio of the component (A) is from 35 to 90% by weight, the ratio of the component (B) is from 10 to 45% by weight, and the ratio of the component (D) is from 0 to 20% by weight, based on the total weight of the component (A), the component (B) and the component (D); and the weight ratio of the component (C) is from 0.03 to 0.15 and the weight ratio of the component (E) is from 0 to 0.28, in terms of the total weight of the component (A), the component (B) and the component (D).

[6] The polymerizable liquid crystal composition according to the item [1], wherein in the formulae (1-1) and (1-2), $Z^{11}$ independently represents hydrogen or methyl; $Z^{12}$ independently represents hydrogen, fluorine or methyl; $W^1$ represents hydrogen; $W^2$ represents hydrogen; $W^3$ represents methyl; $W^4$ represents hydrogen or methyl; $X^1$ represents —O— or a group represented by the formula (a); m1 and n1 each independently represents an integer of from 4 to 6; and m2 and n2 each independently represents an integer of from 4 to 6, in the formula (2-1), $Z^{21}$ represents hydrogen or methyl; $R^1$ represents cyano; $W^5$ represents hydrogen; $X^2$ represents a single bond, —COO— or —OCO—; and m3 represents an integer of from 4 to 6, in the formula (3-1), k1 and k2 each represents 0; $R^{1a}$ and $R^{1b}$ each represents ethylene; $Z^{31}$ represents hydrogen; and m31 and n31 each represents 1, in the formula (3-2), $Z^{32}$ represents hydrogen; and m32 and n32 each represents 1, in the formula (3-3), $Z^{33}$ represents hydrogen; $R^{3a}$ and $R^{3b}$ each represents hydrogen; and m33 and n33 each independently represents an integer of from 1 to 3, in the formula (3-4), $Z^{34}$ represents hydrogen; $R^{4a}$ and $R^{4b}$ each represents hydrogen; and m34 and n34 each independently represents an integer of from 0 to 2, in the formula (3-5), $Z^{35}$ represents hydrogen, in the formula (3-6), $Z^{36}$ represents hydrogen; $R^{5a}$ and $R^{5b}$ each represents hydrogen; m35 and n35 each represents 1; m36 and n36 each represents 1; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 4 to 6, the component (E) is a non-liquid crystalline multifunctional polymerizable compound having from 3 to 16 acryloyloxy groups in one molecule, and the ratio of the component (A) is from 45 to 90% by weight, the ratio of the component (B) is from 10 to 40% by weight, and the ratio of the component (D) is from 0 to 15% by weight, based on the total weight of the component (A), the component (B) and the component (D); and the weight ratio of the component (C) is from 0.03 to 0.15 and the weight ratio of the component (E) is from 0 to 0.28, in terms of the total weight of the component (A), the component (B) and the component (D).

[7] A polymerizable liquid crystal layer obtained by coating the polymerizable liquid crystal composition according to any one of the items [1] to [6] directly on a supporting substrate.

[8] The polymerizable liquid crystal layer according to the item [7], wherein the supporting substrate is a glass substrate.

[9] The polymerizable liquid crystal layer according to the item [7], wherein the supporting substrate is a glass substrate having a plastic thin film coated on a surface thereof, or a plastic substrate comprising a plastic film.

[10] The polymerizable liquid crystal layer according to the item [7], wherein the supporting substrate is a glass substrate having a plastic thin film coated on a surface thereof and being subjected a rubbing treatment, a corona treatment or a plasma treatment on a surface of the plastic thin film, or a plastic substrate containing a plastic film being subjected a rubbing treatment, a corona treatment or a plasma treatment on a surface thereof.

[11] The polymerizable liquid crystal layer according to the item [9] or [10], wherein the plastic material of the plastic thin film and the plastic film is any one of polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

[12] The polymerizable liquid crystal layer according to the item [11], wherein the plastic material of the plastic thin film and the plastic film is any one of polyimide, polyvinyl alcohol, triacetyl cellulose, a partially saponified product of triacetyl cellulose and a cycloolefin resin.

[13] The polymerizable liquid crystal layer according to any one of the items [7] to [12], wherein an alignment state of a liquid crystal skeleton in the polymerizable liquid crystal layer is homeotropic alignment.

[14] A liquid crystal film obtained by polymerizing the polymerizable liquid crystal layer according to any one of the items [7] to [13].

[15] An optical compensation device comprising the liquid crystal film according to the item [14].

[16] An optical device comprising the liquid crystal film according to the item [14] and a polarizing plate.

[17] A liquid crystal display device comprising the optical compensation device according to the item [15] on an inner surface or an outer surface of a liquid crystal cell.

[18] A liquid crystal display device comprising the optical device according to the item [16] on an outer surface of a liquid crystal cell.

The composition of the invention contains at least one compound selected from a group of compounds represented by the formulae (1-1) and (1-2) as a component (A).

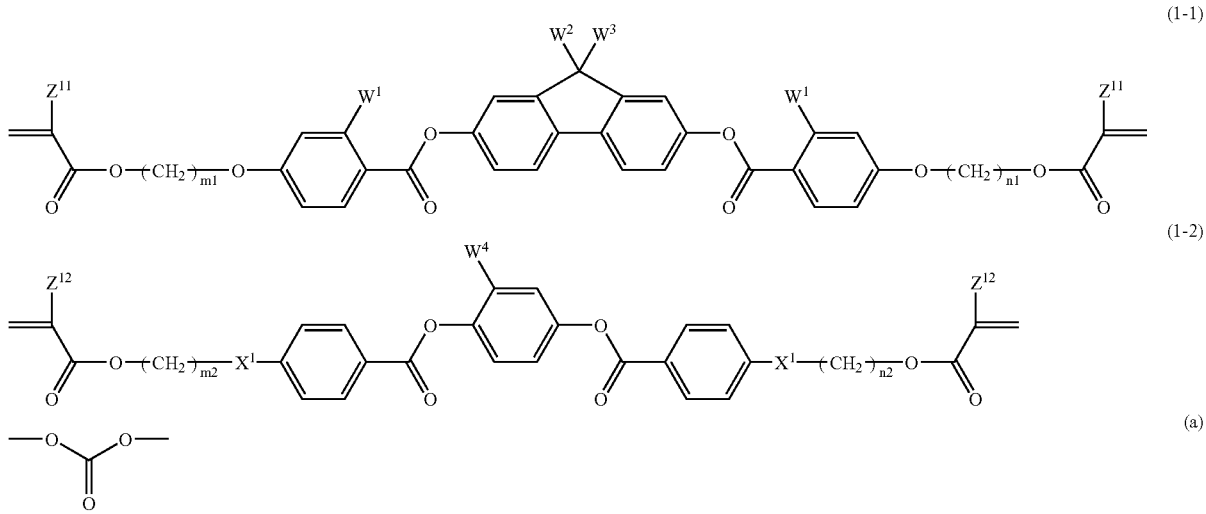

In the formulae (1-1) and (1-2), $Z^{11}$ and $Z^{12}$ each independently represents hydrogen, fluorine, methyl or trifluoromethyl, preferably hydrogen, fluorine or methyl, and more preferably hydrogen or methyl. $W^1$ independently represents hydrogen or fluorine, and preferably hydrogen. $W^2$ and $W^3$ each independently represents hydrogen or methyl. $W^4$ represents hydrogen or methyl. $X^1$ represents —O— or a group represented by the formula (a). m1, m2, n1 and n2 each independently represents an integer of from 2 to 15, preferably an integer of from 2 to 10, more preferably an integer of from 2 to 8, and further preferably an integer of from 4 to 6.

The composition of the invention contains at least one compound selected from a group of compounds represented by the formula (2-1) as a component (B).

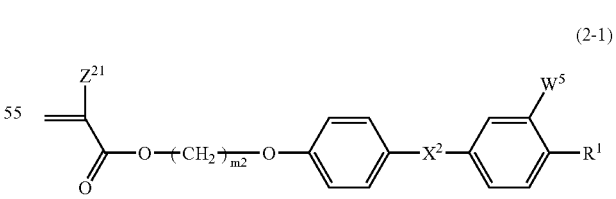

In the formula (2-1), $Z^{21}$ represents hydrogen or methyl. $R^1$ represents cyano, trifluoromethoxy, alkyl having from 1 to 10 carbon atoms or alkoxy having from 1 to 10 carbon atoms, preferably cyano, alkyl having from 1 to 8 carbon atoms or alkoxy having from 1 to 8 carbon atoms, and more preferably cyano. $W^5$ represents hydrogen or fluorine, and preferably hydrogen. $X^2$ represents a single bond, —COO— or —OCO—. m3 represents an integer of from 2 to 15, preferably an integer of from 2 to 10, more preferably an integer of from 2 to 8, and further preferably an integer of from 4 to 6.

The composition of the invention contains at least one compound selected from a group of compounds represented by the formulae (3-1), (3-2), (3-3), (3-4), (3-5) and (3-6) as a component (C).

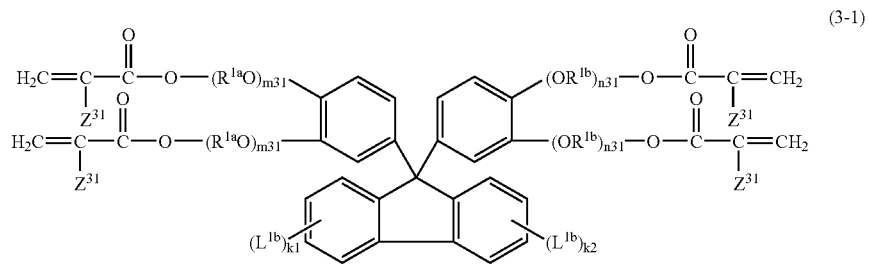

(3-1)

In the formula (3-1), $L^{1a}$ and $L^{1b}$ each independently represents alkyl having from 1 to 4 carbon atoms. $R^{1a}$ and $R^{1b}$ each independently represents alkylene having from 2 to 4 carbon atoms, and preferably alkylene having 2 carbon atoms, i.e., ethylene. $Z^{31}$ independently represents hydrogen or methyl, and preferably hydrogen. k1 and k2 each independently represents an integer of from 0 to 4, and preferably 0. m31 and n31 each independently represents an integer of from 0 to 6, preferably an integer of from 1 to 4, and more preferably 1.

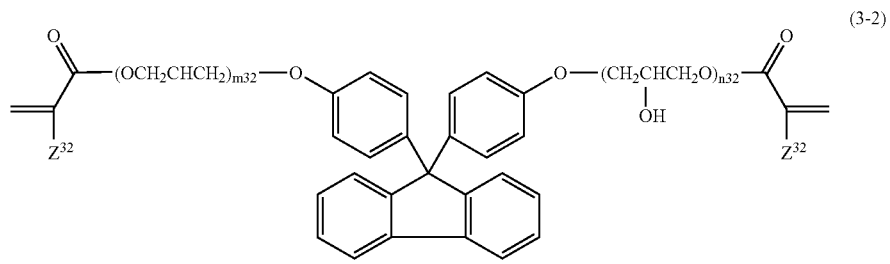

(3-2)

In the formula (3-2), $Z^{32}$ independently represents hydrogen or methyl, and preferably hydrogen. m32 and n32 each independently represents an integer of from 1 to 3, and preferably 1.

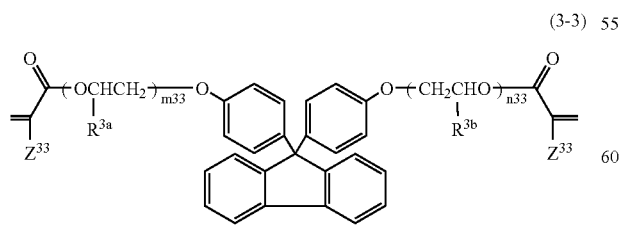

(3-3)

In the formula (3-3), $Z^{33}$ independently represents hydrogen or methyl, and preferably hydrogen. $R^{3a}$ and $R^{3b}$ each independently represents hydrogen, methyl or ethyl, and preferably hydrogen. m33 and n33 each independently represents an integer of from 0 to 3, and preferably an integer of from 1 to 3.

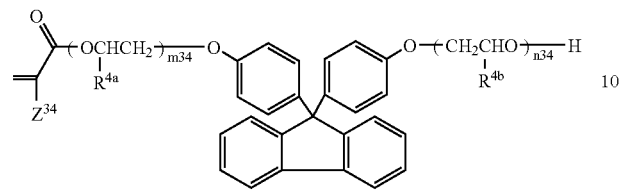

(3-4)

In the formula (3-4), $Z^{34}$ represents hydrogen or methyl, and preferably hydrogen. $R^{4a}$ and $R^{4b}$ each independently represents hydrogen or alkyl having from 1 to 6 carbon atoms, and preferably hydrogen. m34 and n34 each independently represents an integer of from 0 to 10, preferably an integer of from 0 to 5, and more preferably an integer of from 0 to 2.

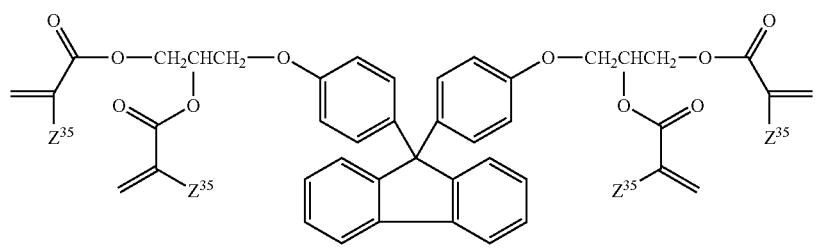

(3-5)

In the formula (3-5), $Z^{35}$ independently represents hydrogen or methyl, and preferably hydrogen.

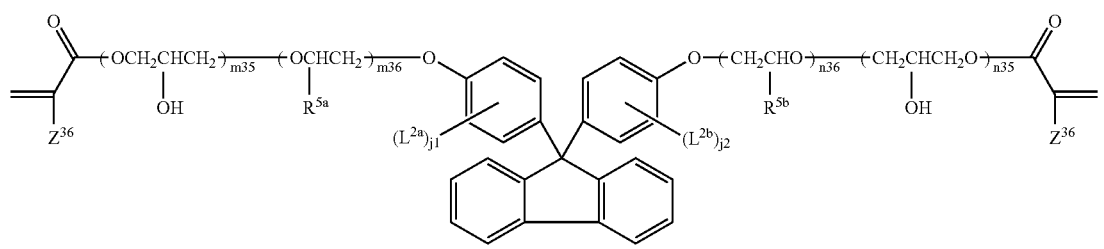

(3-6)

In the formula (3-6), $Z^{36}$ independently represents hydrogen or methyl, and preferably hydrogen. $R^{5a}$ and $R^{5b}$ each independently represents hydrogen or alkyl having from 1 to 6 carbon atoms, and preferably hydrogen. $L^{2a}$ and $L^{2b}$ each independently represents alkyl having from 1 to 6 carbon atoms. m35 and n35 each independently represents an integer of from 1 to 3, and preferably 1. m36 and n36 each independently represents an integer of from 1 to 3, and preferably 1. j1 and j2 each independently represents an integer of from 0 to 4, and preferably 0.

The composition of the invention optionally contains at least one compound selected from a group of compounds represented by the formulae (4-1) and (4-2) as a component (D).

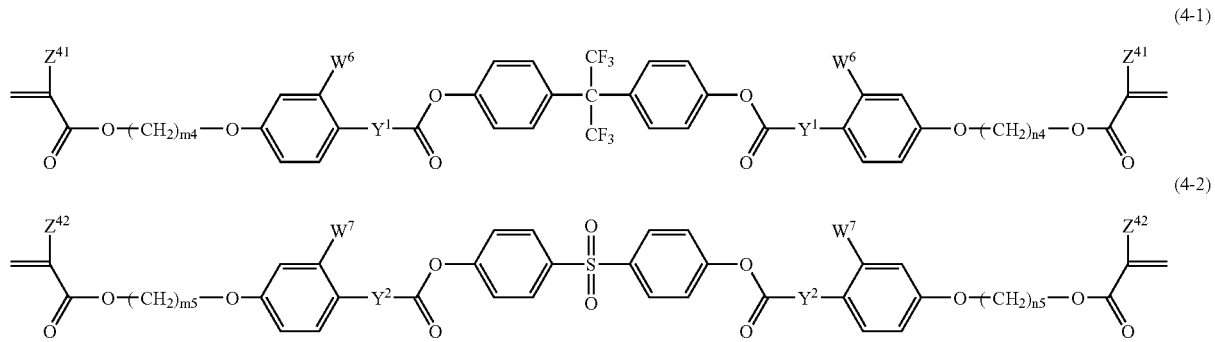

In the formulae (4-1) and (4-2), $Z^{41}$ and $Z^{42}$ each independently represents hydrogen or methyl. $Y^1$ and $Y^2$ each independently represents a single bond, —(CH$_2$)$_2$— or —CH=CH—. $W^6$ and $W^7$ each independently represents hydrogen or fluorine. m4, m5, n4 and n5 each independently represents an integer of from 2 to 15, preferably an integer of from 2 to 10, more preferably an integer of from 2 to 8, and further preferably an integer of from 4 to 6.

The composition of the invention optionally contains a non-liquid crystalline multifunctional polymerizable compound having from 3 to 70 acryloyl groups or methacryloyl groups in one molecule as a component (E). Preferred examples of the component (E) include a non-liquid crystalline multifunctional polymerizable compound having from 3 to 64 acryloyloxy groups or methacryloyloxy groups in one molecule, in which the number of the acryloyloxy groups or methacryloyloxy groups is more preferably from 3 to 32, and further preferably from 3 to 16, and acryloyloxy groups are preferred as compared to methacryloyl groups.

Preferred embodiments of the components of the composition of the invention have been described above. Examples of combinations of the preferred embodiments include the aforementioned items (2) to (6).

The composition of the invention has a nematic phase at room temperature, and is oriented homeotropically on a plastic substrate, a supporting substrate having a plastic thin film coated on a surface thereof, or a glass substrate. The composition of the invention has a high tendency of homeotropic alignment on a supporting substrate having polar groups, such as —COOH, —NH$_2$ and —OH, on a surface thereof, and there is no necessity of a special alignment film (such as an alignment film having long-chain alkyl groups) for homeotropic alignment.

The compounds used in the composition of the invention will be described.

The compounds (1-1) and (1-2) have a liquid crystal skeleton and two polymerizable groups. A polymer of the polymerizable compounds can have a three-dimensional structure, and thus a hard polymer is provided as compared to a compound having one polymerizable group. The compounds are liable to undergo homogeneous alignment while it depends on such conditions as the supporting substrate and the additives. The compounds exhibit a liquid crystal phase within a wide temperature range.

The compound (2-1) has one polymerizable group. The compound has such a property that tilt angles of other liquid crystal compounds are increased, and melting point thereof are decreased. The compounds (3-1) to (3-6) are not liquid crystal compounds. The compounds have a bisphenol fluorene structure. The compounds have such an effect that liquid crystal molecules undergo homeotropic alignment. In the following description, the compounds (3-1) to (3-6) may be referred to as the compound (3) as a generic name in some cases.

The compounds (4-1) and (4-2) have a bisphenol skeleton and two polymerizable groups. A polymer of the polymerizable compounds can have a three-dimensional structure, and thus a hard polymer is provided as compared to a compound having one polymerizable group. The compounds may exhibit or may not exhibit liquid crystallinity. The compounds have such a function that the melting point of the polymerizable liquid crystal composition is decreased. In the case where the compounds are used in combination with the other polymerizable liquid crystal compounds, homeotropic alignment is liable to be obtained while it depends on such conditions as the supporting substrate and the additives. The compound (E) is a non-liquid crystalline multifunctional polymerizable compound having at least 3 acryloyl groups or methacryloyl groups in one molecule. A polymer of the compound can have a three-dimensional structure, and may be used depending on necessity for increasing the hardness of the hardened film.

The composition of the invention may contain the other polymerizable compound that is different from the compounds (1-1) and (1-2), the compound (2-1), the compounds (3-1) to (3-6) and the compounds (4-1) and (4-2). The composition may contain an additive, such as a surfactant, for forming a thin coated film, and the surfactant may not be necessarily used for a purpose of controlling the kind of alignment. The composition may contain such an additive as a polymerization initiator and a photosensitizer suitable for polymerization. The composition may contain such an additive as an ultraviolet ray absorbent, an antioxidant, a radical scavenger and a light stabilizer for improving the characteristics of the polymer. The composition may contain an organic solvent. The organic solvent is useful for forming a coated film (i.e., paint film) having a uniform thickness.

The ratios of the components of the composition of the invention will be described.

The ratio of the component (A) is preferably from 30 to 97% by weight, more preferably 35 to 97% by weight, further preferably from 35 to 95% by weight, particularly preferably from 35 to 90% by weight, and extremely preferably from 45 to 90% by weight, based on the total weight of the component (A), the component (B) and the component (D).

The ratio of the component (B) is preferably from 3 to 45% by weight, more preferably 5 to 45% by weight, further preferably from 10 to 45% by weight, and particularly preferably from 10 to 40% by weight, based on the total weight of the component (A), the component (B) and the component (D).

The ratio of the component (D) is preferably from 0 to 25% by weight, more preferably 0 to 20% by weight, and further preferably from 0 to 15% by weight, based on the total weight of the component (A), the component (B) and the component (D).

The weight ratio of the component (C) is preferably from 0.01 to 0.20, and more preferably from 0.03 to 0.15, in terms of the total weight of the component (A), the component (B) and the component (D).

The weight ratio of the component (E) is preferably from 0 to 0.30, and more preferably from 0 to 0.28, in terms of the total weight of the component (A), the component (B) and the component (D).

The addition amount of the other polymerizable compound is preferably from 0 to 0.20, and more preferably from 0 to 0.10, in a weight ratio in terms of the total weight of the component (A), the component (B) and the component (D). In the case where an additive, such as a surfactant and a polymerization initiator, is used, the addition amount thereof may be a minimum amount capable of attaining the purpose thereof.

The combination of the components of the composition of the invention will be described.

A preferred combination is a combination of the component (A), the component (B) and the component (C). In the case where the melting point is controlled, a combination of the component (A), the component (B), the component (C) and the component (D) is preferred. In the case where the hardness is controlled, a combination of the component (A), the component (B), the component (C) and the component (E), or a combination of the component (A), the component (B), the component (C), the component (D) and the component (E) are preferred. In these combinations, the other polymerizable compound may further be combined.

The synthesis methods of the compounds will be described. The compounds used in the invention can be synthesized by appropriately combining the synthesis methods of organic chemistry disclosed in Houben Wyle, Methoden der Organischen Chemie, Georg Thieme Verlag, Stuttgart; Organic Syntheses, John Wiley & Sons, Inc.; Organic Reactions, John Wiley & Sons, Inc.; Comprehensive Organic Synthesis, Pergamon Press; New Experimental Chemistry Course (Shin Jikken Kagaku Kouza), Maruzen, Inc., and the like.

A synthesis method of the compound (1-1) is disclosed in JP-A-2003-328419 (US 2003/203128 A1). A synthesis method of the compound (1-2) is disclosed in Macromol. Chem., vol., 190, p. 3201-3215 (1998), WO 97/00600 and the like. As a method for introducing α-fluoroacryloyloxy ($CH_2$=CF—COO—), α-fluoroacrylic acid and α-fluoroacrylic chloride may be used, but a method of reacting α-fluoroacrylic fluoride ($CH_2$=CFCOOF) is useful. A synthesis method of α-fluoroacrylic fluoride is disclosed in J. Org. Chem., vol. 54, p. 5640 (1989), JP-A-60-158137, JP-A-61-85345 and the like, and α-fluoroacrylic fluoride can be synthesized according to these methods. The compounds (1-1) and (1-2) can be synthesized by using the compounds as starting materials. A synthesis method of the compound (2-1) is disclosed in Macromolecules, vol. 26, p. 6132-6134 (1993) and Makromol. Chem., vol. 183, p. 2311-2321 (1982).

A synthesis method of the compound (3) is disclosed in the following literatures.
Compound (3-1): WO 05/33061
Compounds (3-2) to (3-4): JP-A-2005-338550
Compound (3-4): JP-A-2002-293762
Compound (3-5): JP-A-2005-272485

Precursor of compound (3-6) (epoxy acrylate precursor): JP-A-2002-348357

A synthesis method of the compounds (4-1) and (4-2) is disclosed in JP-A-2007-16213 (US 2006/278851 A1).

Preferred examples of the compound (1-1) are shown below.

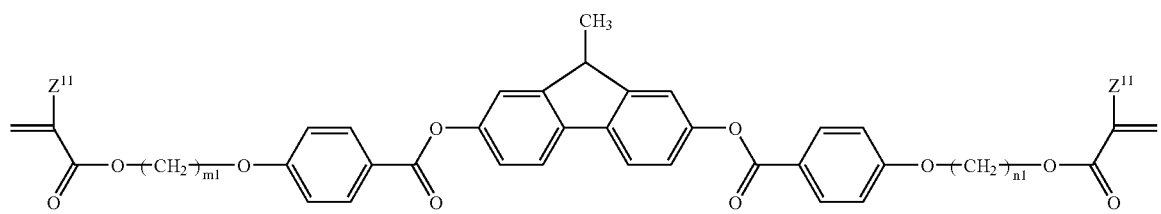

(1-1-A)

-continued
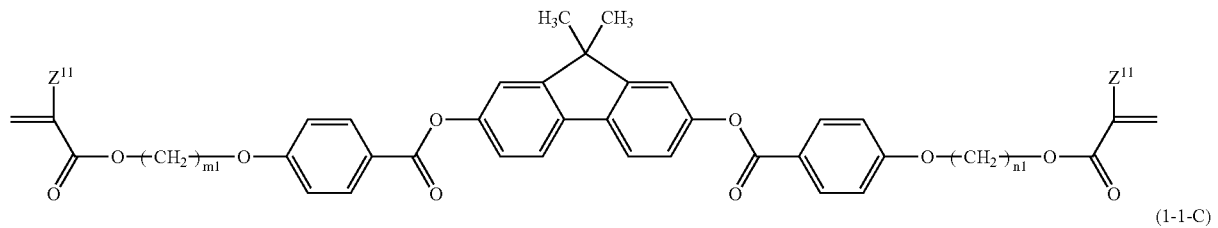
(1-1-B)
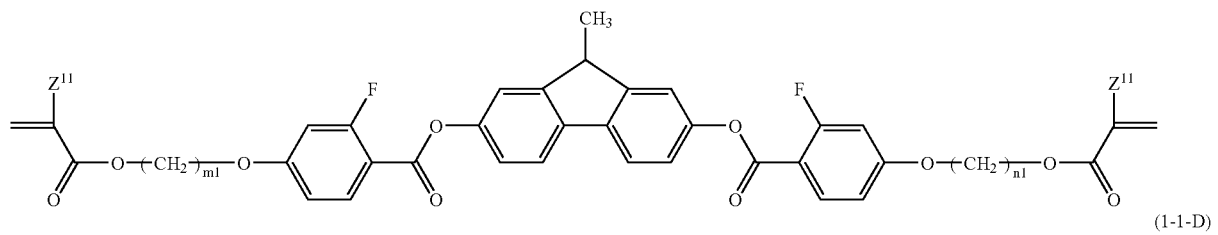
(1-1-C)
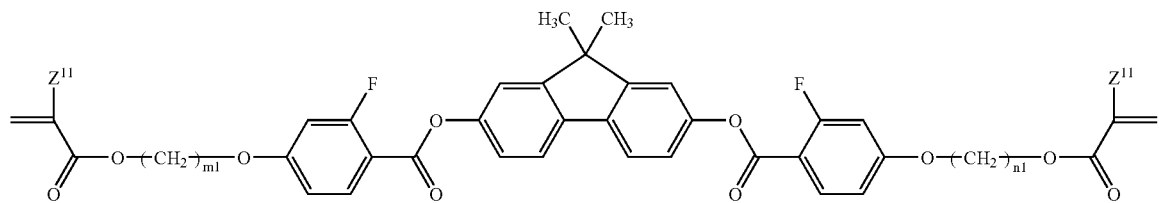
(1-1-D)
In the formulae (1-1-A) to (1-1-D), $Z^{11}$ represents hydrogen, fluorine, methyl or trifluoromethyl; m1 and n1 represent integers of from 2 to 15, i.e., these are bilaterally symmetric compounds.
Preferred examples of the compound (1-2) are shown below.
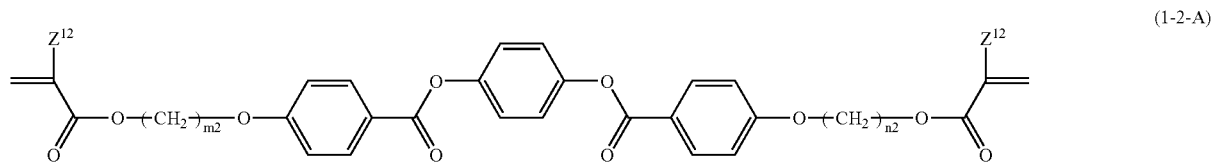
(1-2-A)
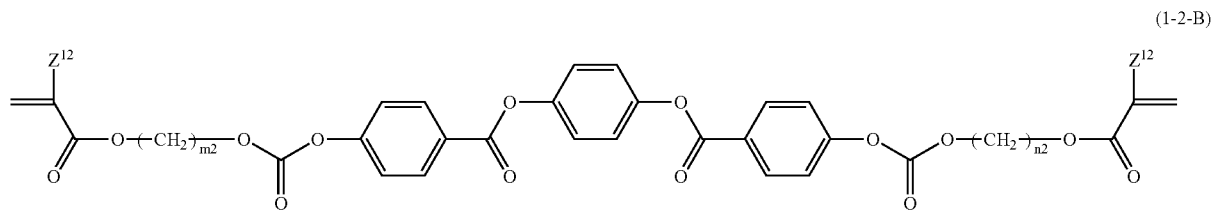
(1-2-B)
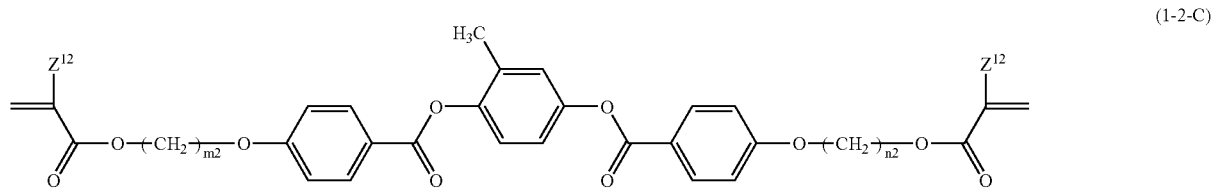
(1-2-C)

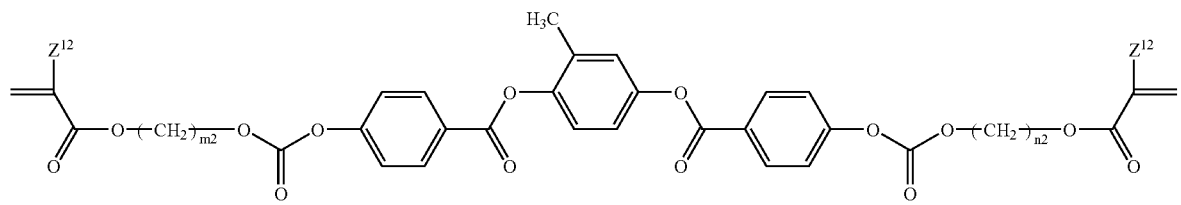

(1-2-D)

In the formulae (1-2-A) to (1-2-D), $Z^{12}$ represents hydrogen, fluorine, methyl or trifluoromethyl; and m2 and n2 represent integers of from 2 to 15, i.e., these are also bilaterally symmetric compounds.

Preferred examples of the compound (2-1) are shown below.

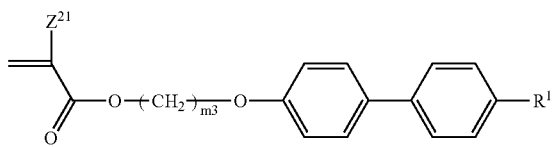

(2-1-A)

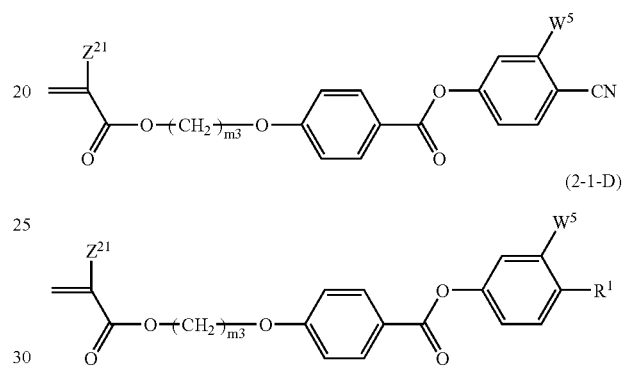

(2-1-B)

(2-1-C)

(2-1-D)

In the formulae (2-1-A) to (2-1-D), $Z^{21}$ represents hydrogen or methyl; $W^5$ represents hydrogen or fluorine; $R^1$ represents alkyl having from 1 to 10 carbon atoms or alkoxy having from 1 to 10 carbon atoms; and m3 represents an integer of from 2 to 15.

Preferred examples of the compounds (3-1) to (3-6) are shown below.

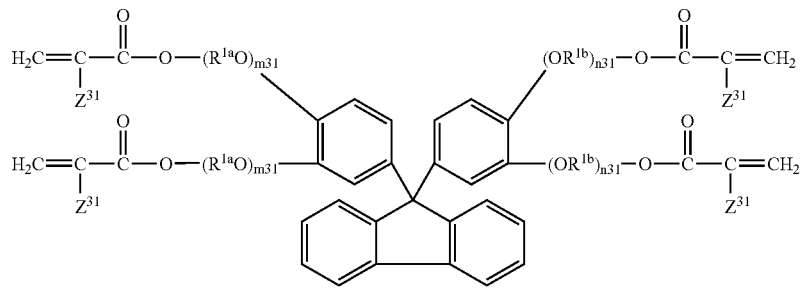

(3-1-A)

wherein $Z^{31}$ represents hydrogen or methyl; $R^{1a}$ and $R^{1b}$ each independently represents alkylene having from 2 to 4 carbon atoms; and m31 and n31 each independently represents an integer of from 0 to 6.

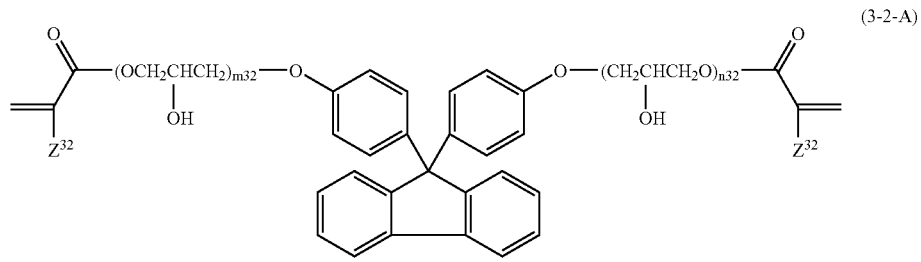
(3-2-A)

wherein $Z^{32}$ represents hydrogen or methyl; and m32 and n32 each independently represents an integer of from 1 to 3.

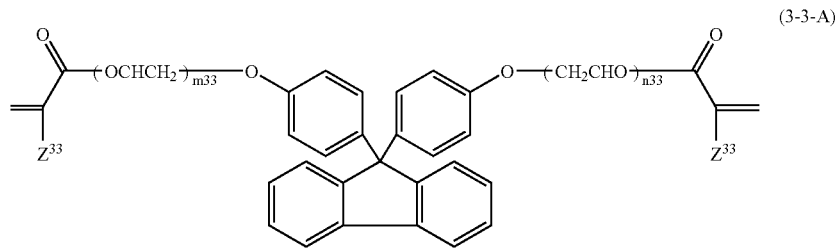
(3-3-A)

wherein $Z^{33}$ represents hydrogen or methyl; and m33 and n33 each independently represents an integer of from 0 to 3.

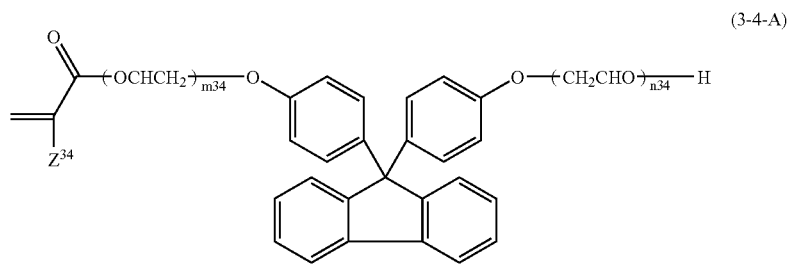
(3-4-A)

wherein $Z^{34}$ represents hydrogen or methyl; and m34 and n34 each independently represents an integer of from 0 to 10.

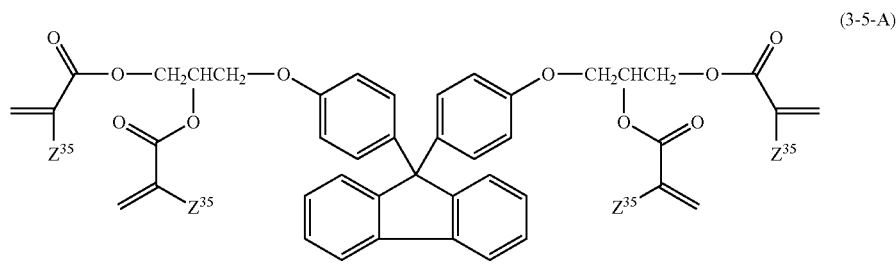
(3-5-A)

wherein $Z^{35}$ represents hydrogen or methyl.
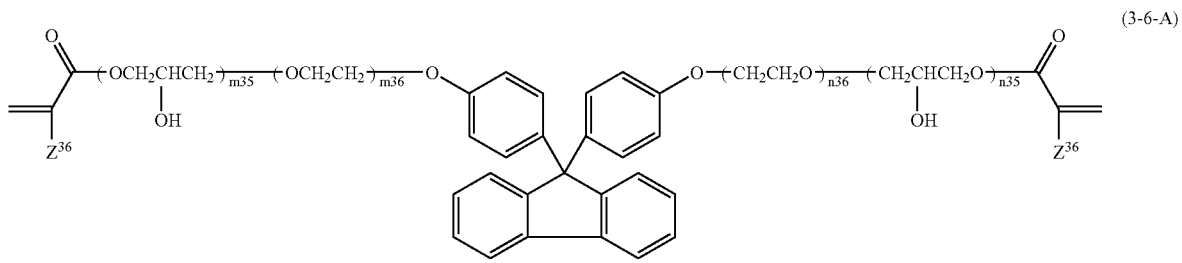
(3-6-A)
wherein $Z^{36}$ represents hydrogen or methyl; m35 and n35 each independently represents an integer of from 1 to 3; and m36 and n36 each independently represents an integer of from 1 to 3.
Preferred examples of the compounds (4-1) and (4-2) are shown below.
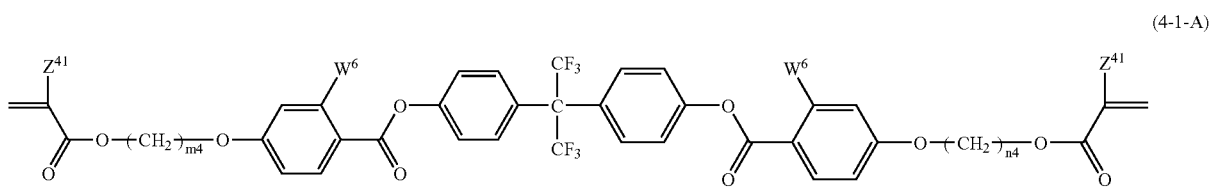
(4-1-A)
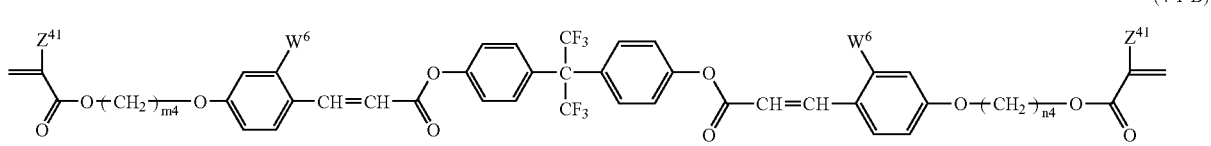
(4-1-B)
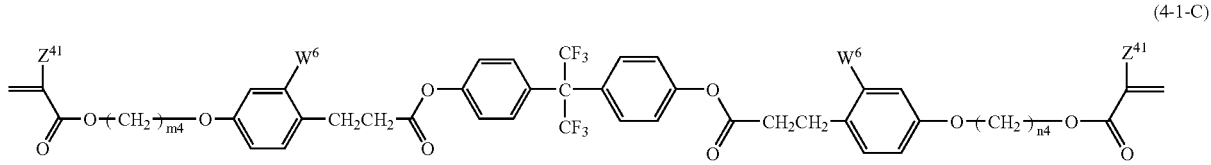
(4-1-C)
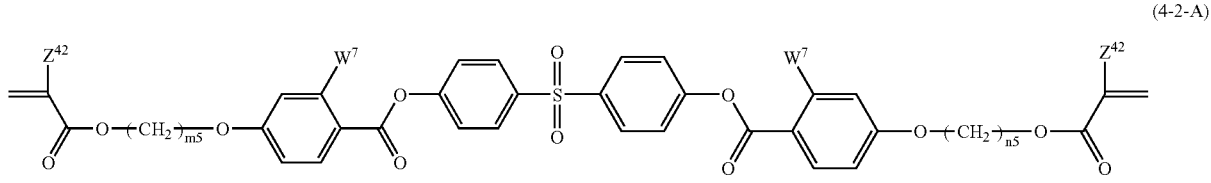
(4-2-A)
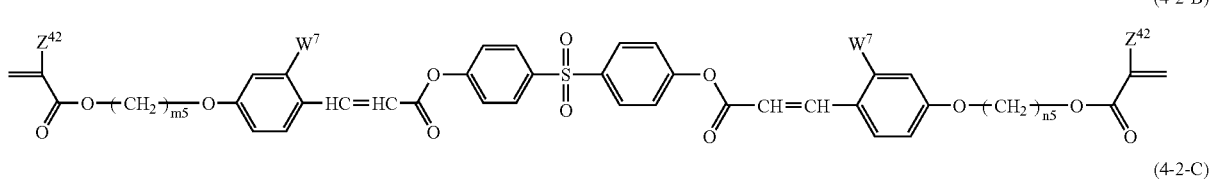
(4-2-B)
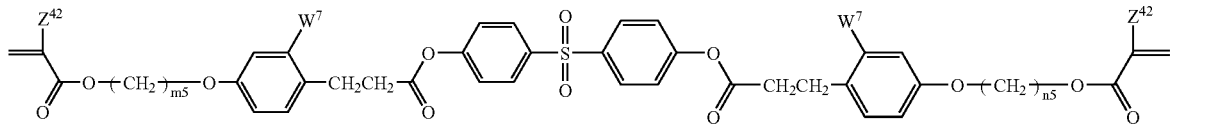
(4-2-C)

In the formulae (4-1-A) to (4-1-C), $Z^{41}$ represents hydrogen or methyl; $W^6$ represents hydrogen or fluorine; and m5 and n5 each represents an integer of from 2 to 15. In the formulae (4-2-A) to (4-2-C), $Z^{42}$ represents hydrogen or methyl; $W^7$ represents hydrogen or fluorine; and m5 and n5 each represents an integer of from 2 to 15.

Specific examples of the compounds (1-1) and (1-2), the compound (2-1), the compounds (3-1) to (3-6), the compounds (4-1) and (4-2) and the compound (E) are shown below.

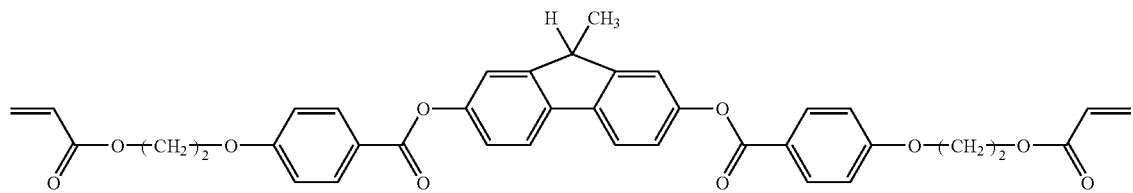

(1-1-1)

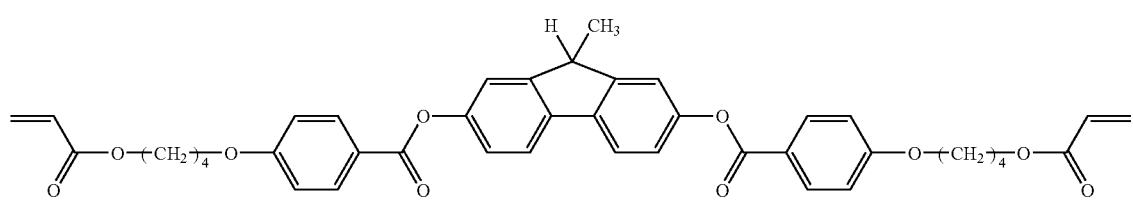

(1-1-2)

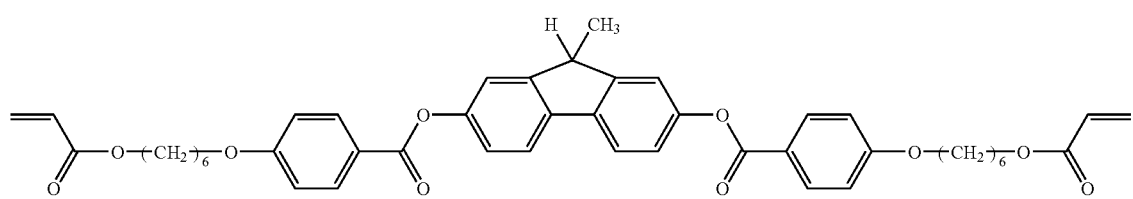

(1-1-3)

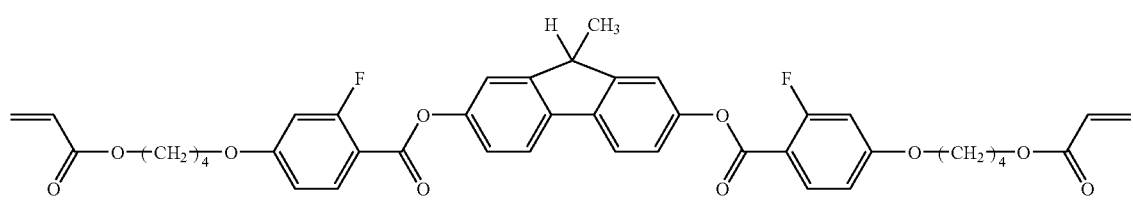

(1-1-4)

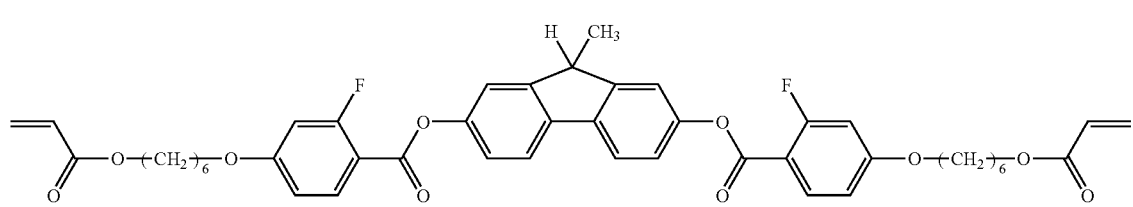

(1-1-5)

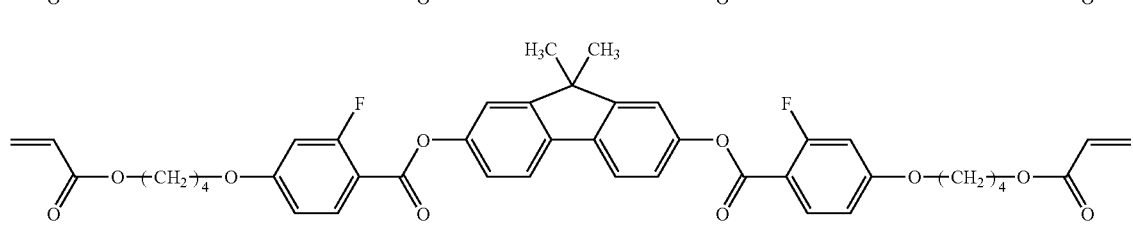

(1-1-6)

-continued
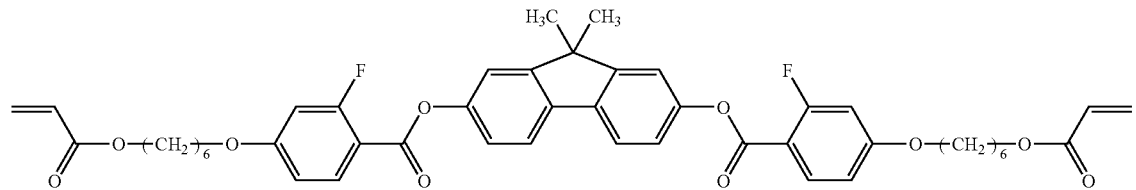
(1-1-7)
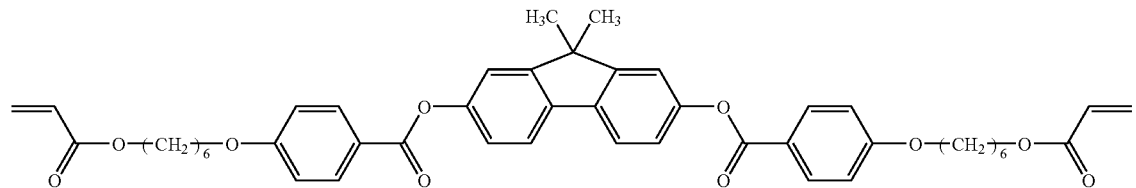
(1-1-8)
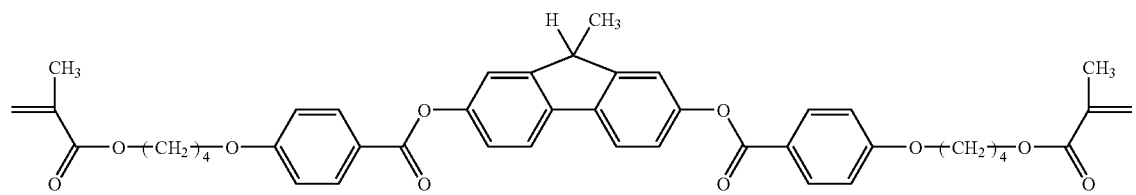
(1-1-9)
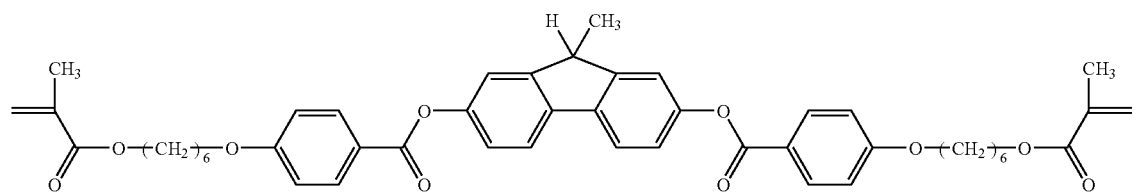
(1-1-10)
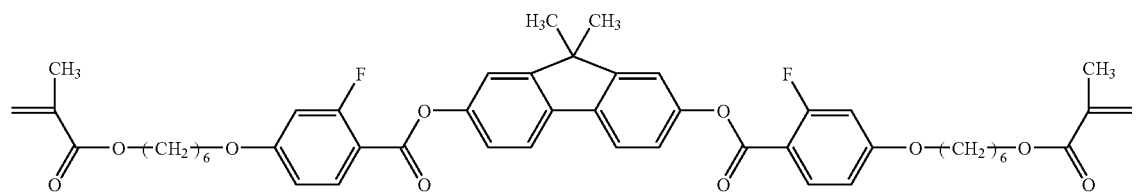
(1-1-11)
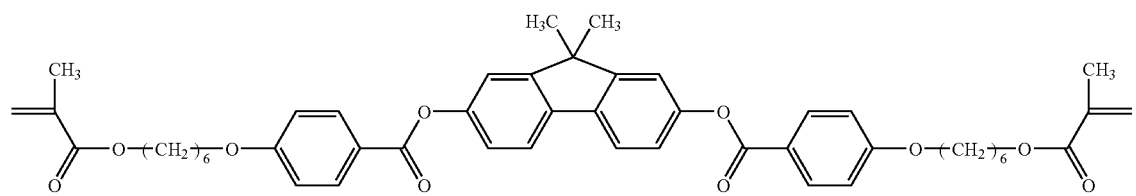
(1-1-12)
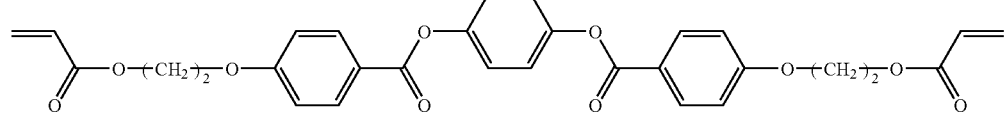
(1-2-1)
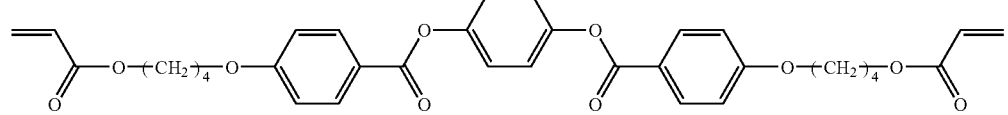
(1-2-2)

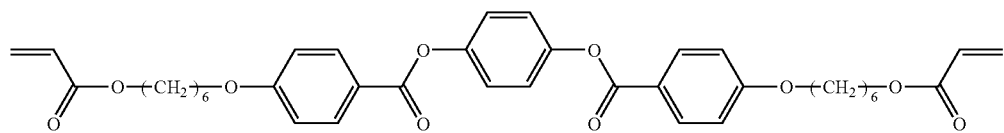
(1-2-3)
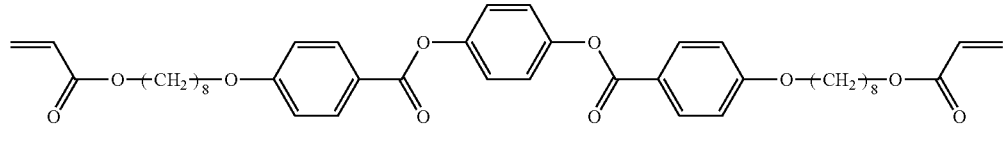
(1-2-4)
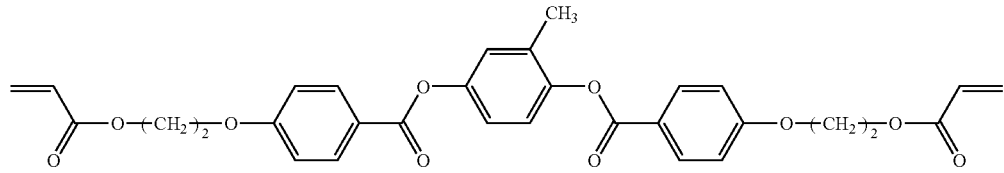
(1-2-5)
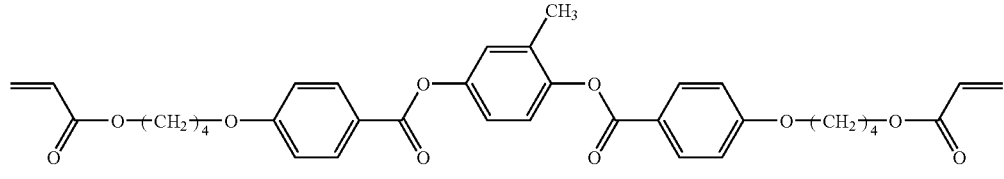
(1-2-6)
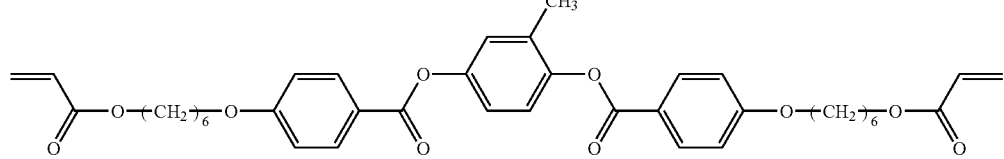
(1-2-7)
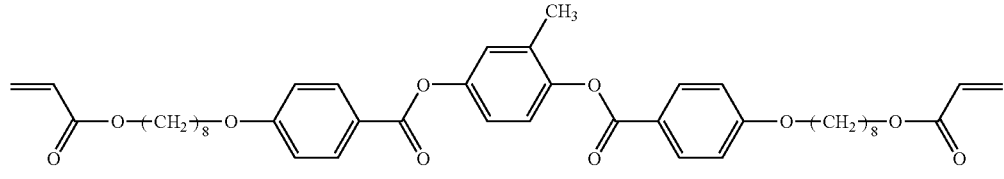
(1-2-8)
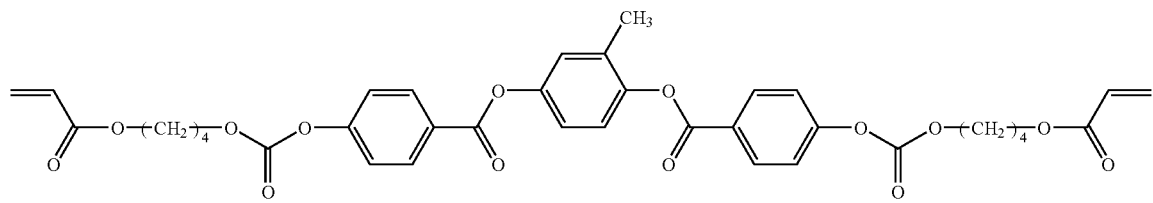
(1-2-9)
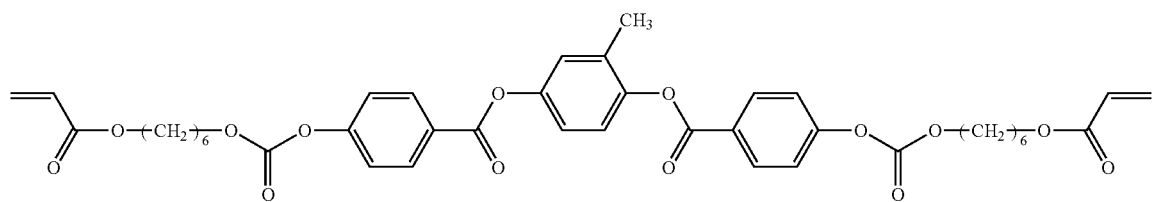
(1-2-10)
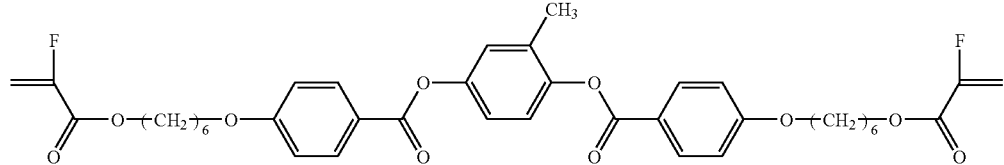
(1-2-11)

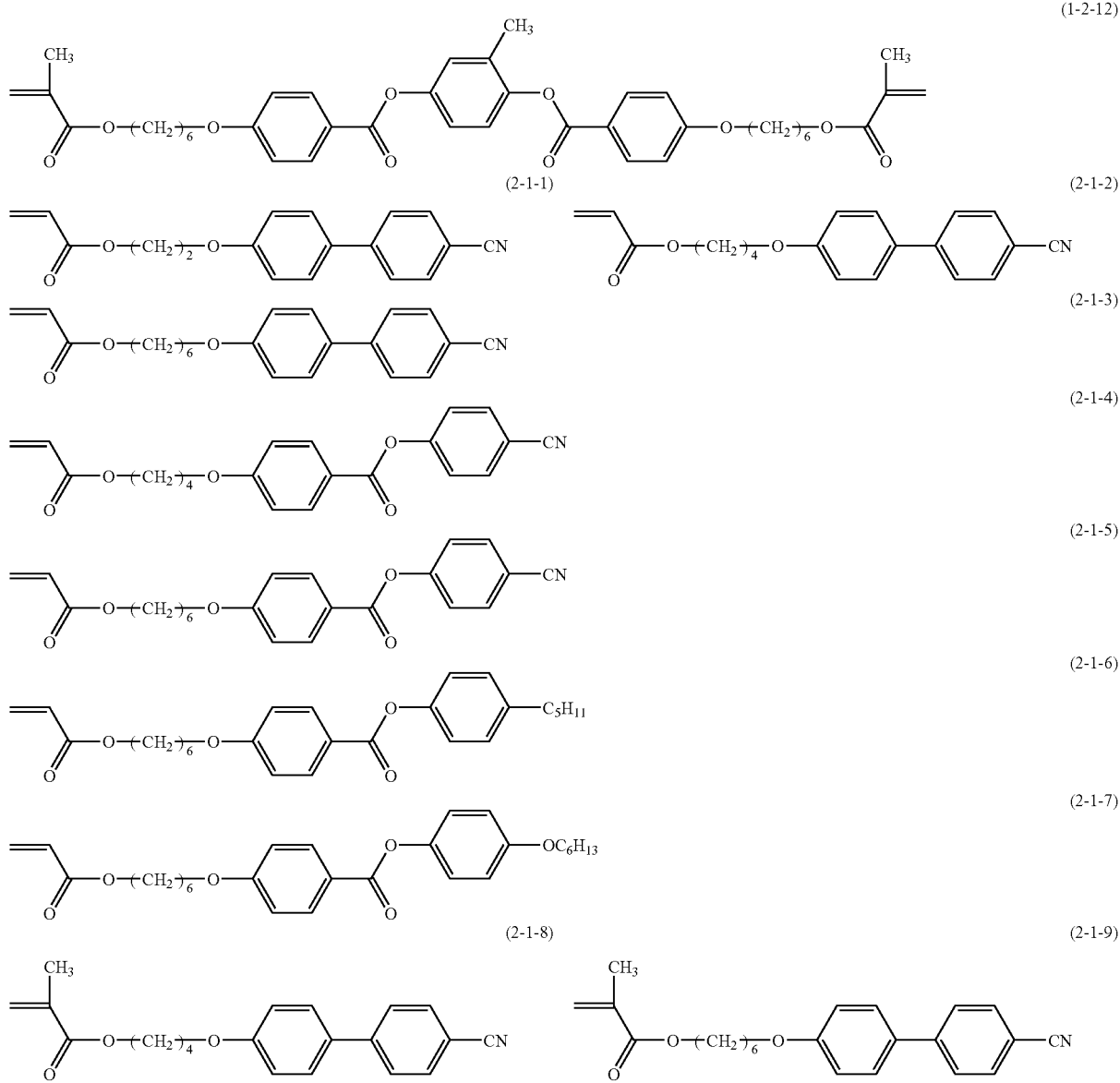
The compound (3) is a bisphenol fluorene compound. Specific examples of the compound (3) are shown below.
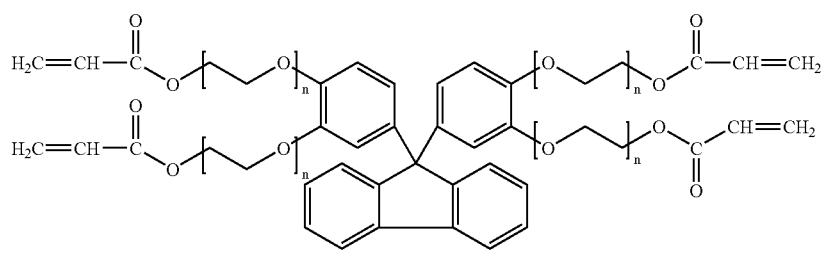

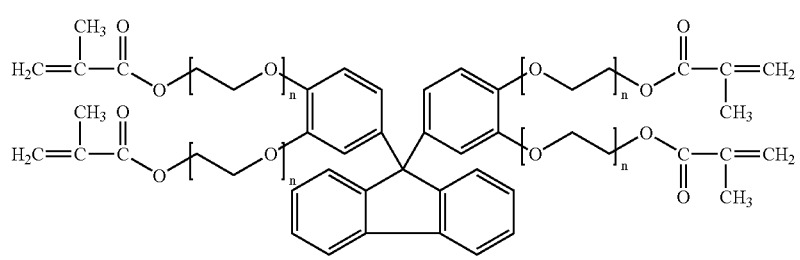
(3-1-2)
In the the formulae (3-1-1) and (3-1-2), n represents an integer of from 1 to 4.
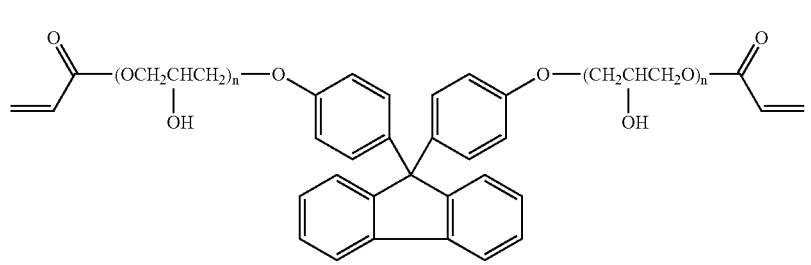
(3-2-1)
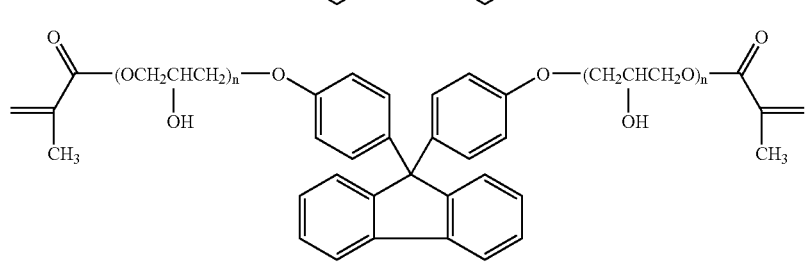
(3-2-2)
In the the formulae (3-2-1) and (3-2-2), n represents an integer of from 1 to 3.
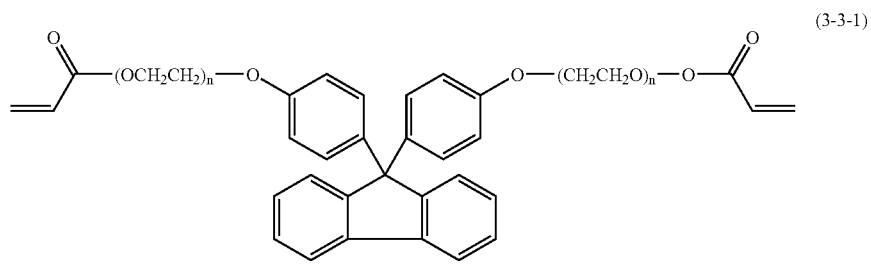
(3-3-1)
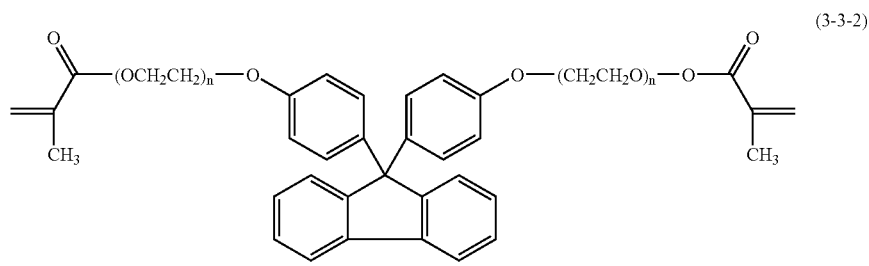
(3-3-2)

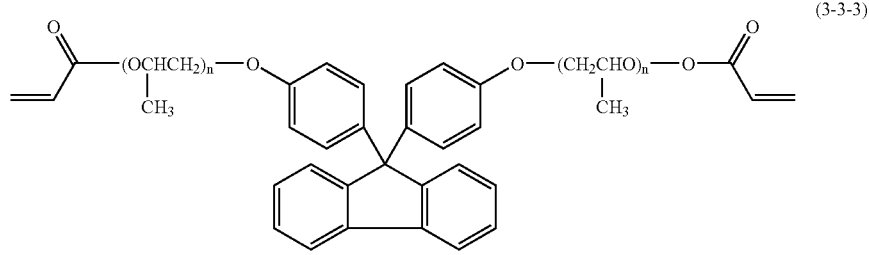
(3-3-3)
In the the formulae (3-3-1) to (3-3-3), n represents an integer of from 1 to 3.
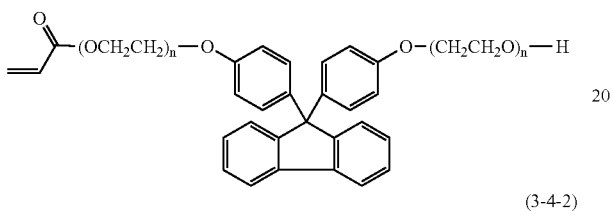
(3-4-1)
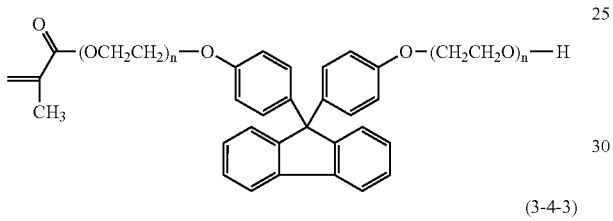
(3-4-2)
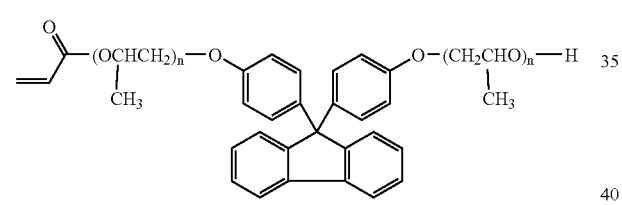
(3-4-3)
In the the formulae (3-4-1) to (3-4-3), n represents an integer of from 0 to 2.
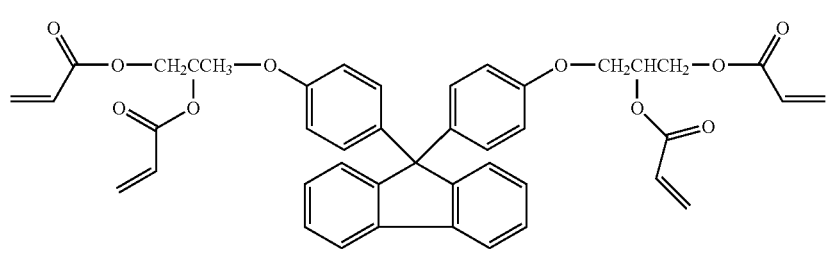
(3-5-1)
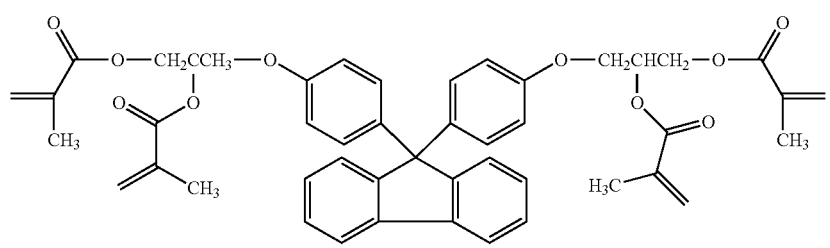
(3-5-2)

-continued
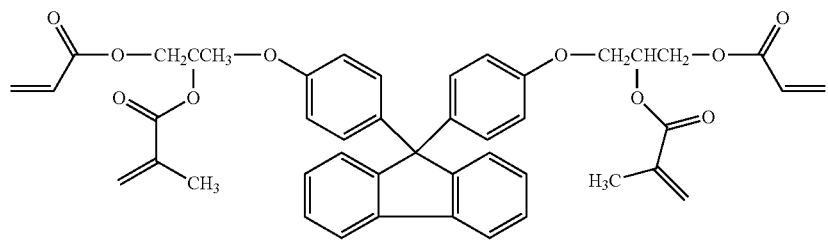
(3-5-3)
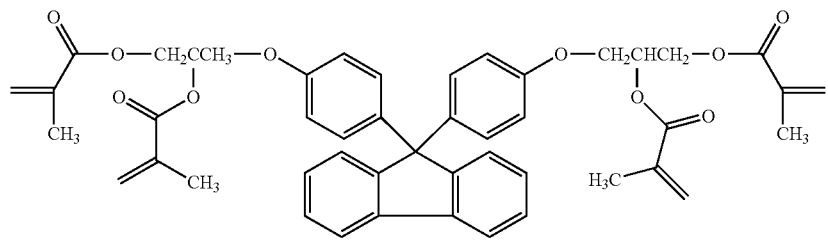
(3-5-4)
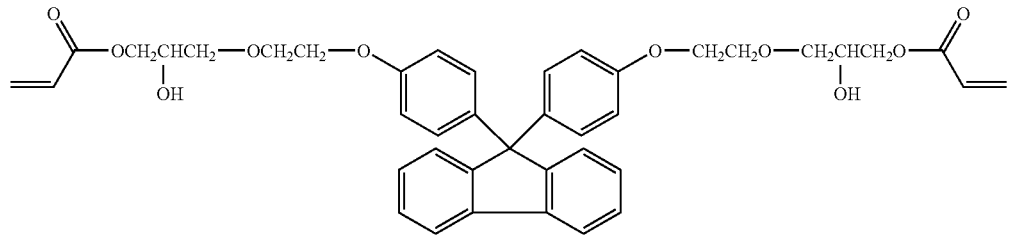
(3-6-1)
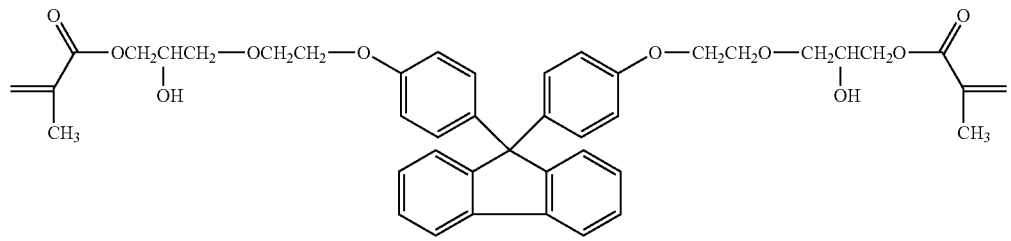
(3-6-2)
Examples of commercial products containing the compound (3-1-1) and the compound (3-3-1) or (3-6-1) include OGSOL EA-0250T, OGSOL EA-0500, OGSOL EA-1000, CA-0400, CA-0450T, ONF-1 and BPEFA, produced by Osaka Gas Chemicals Co., Ltd. These commercially available products may be used in the invention.
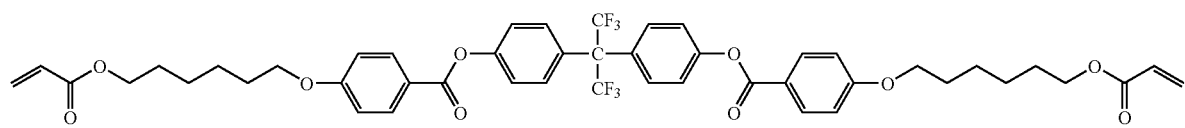
(4-1-1)
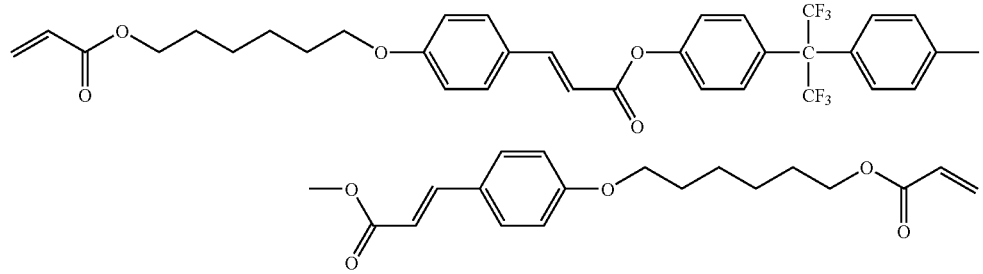
(4-1-2)

-continued
(4-1-3)
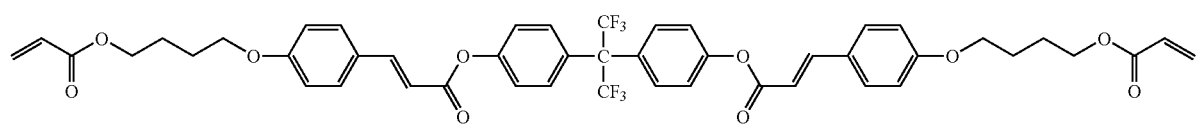
(4-1-4)
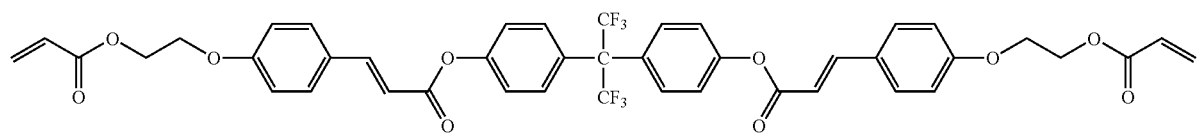
(4-1-5)
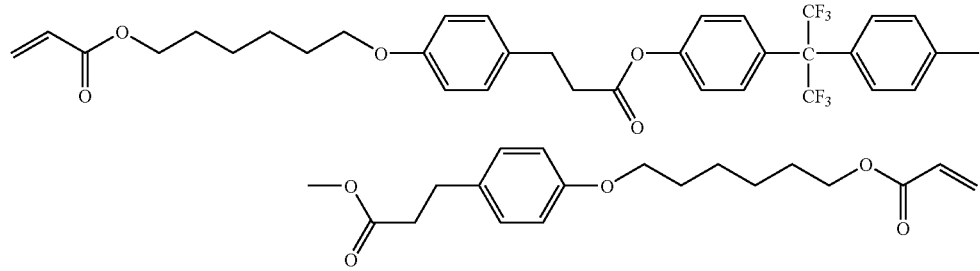
(4-1-6)
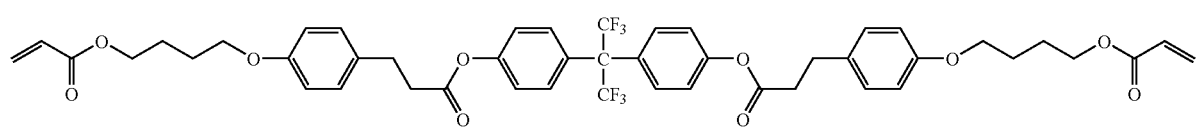
(4-1-7)
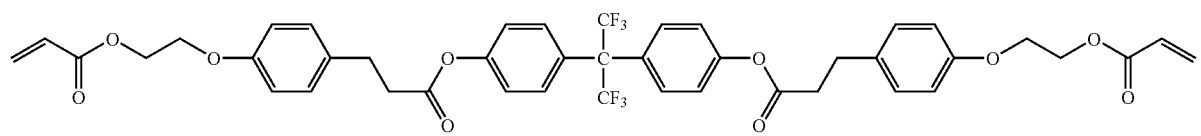
(4-1-8)
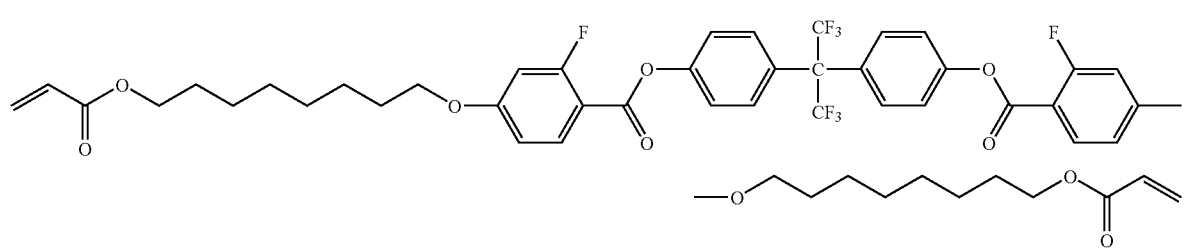
(4-1-9)
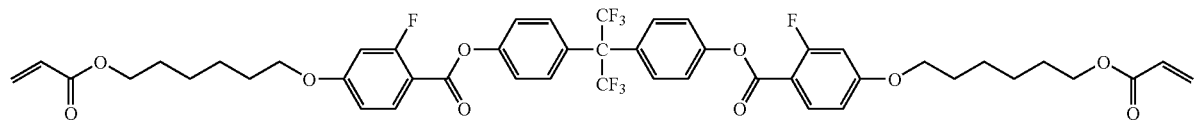
(4-1-10)
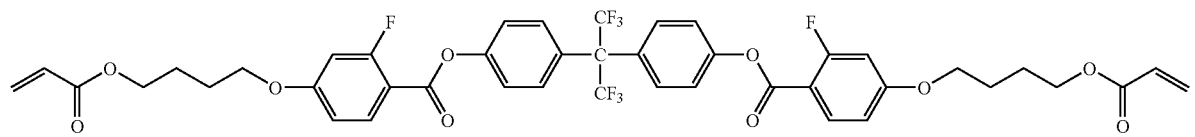

(4-1-11)
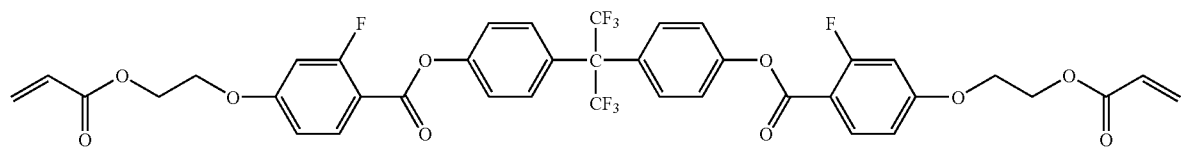
(4-1-12)
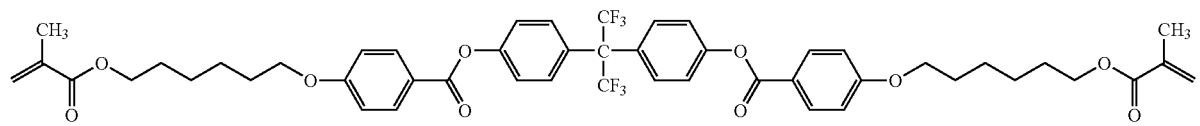
(4-1-13)
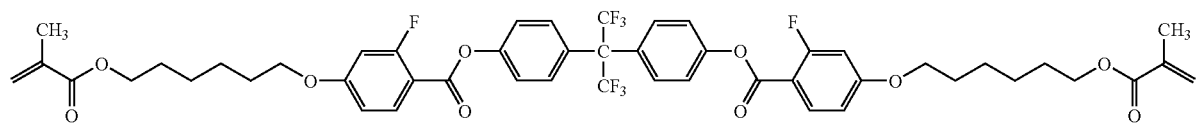
(4-1-14)
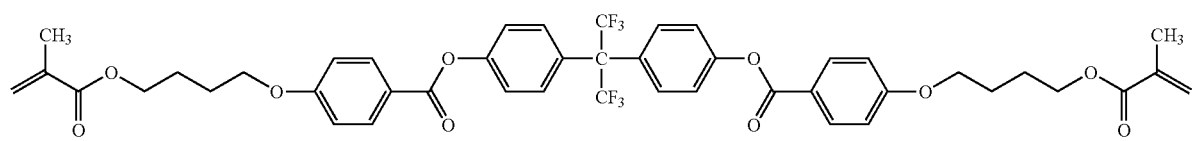
(4-1-15)
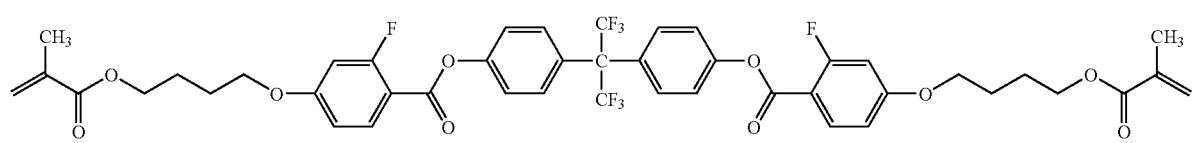
(4-2-1)
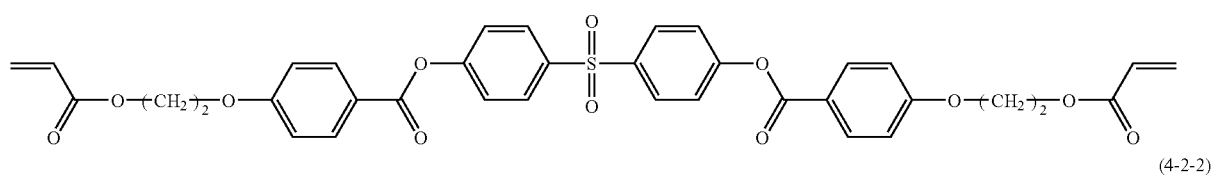
(4-2-2)
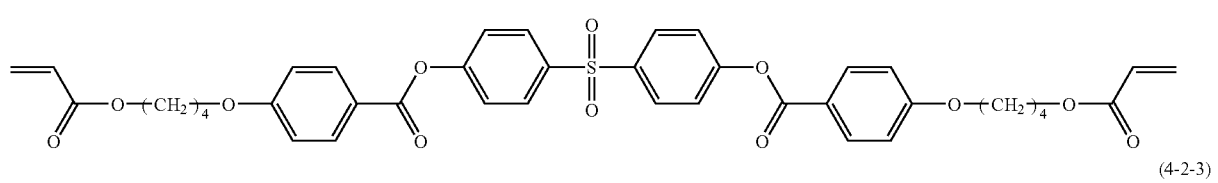
(4-2-3)
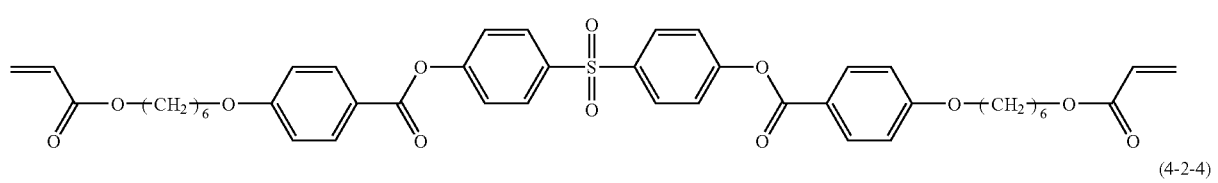
(4-2-4)
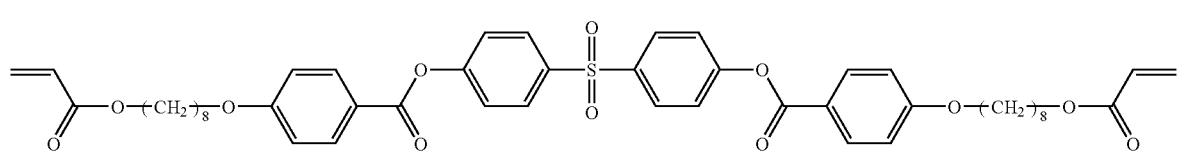

-continued
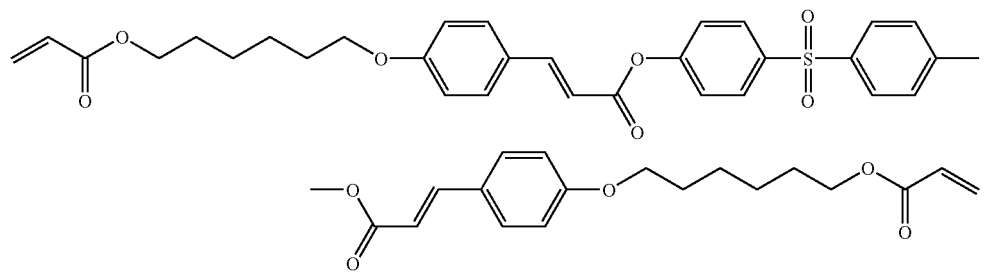
(4-2-5)
(4-2-6)
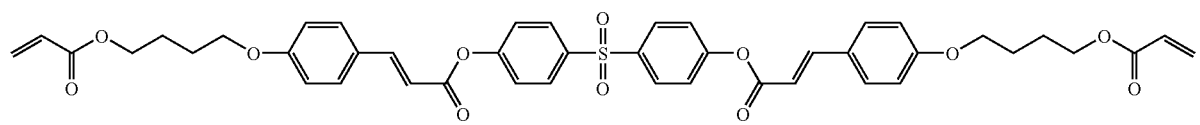
(4-2-7)
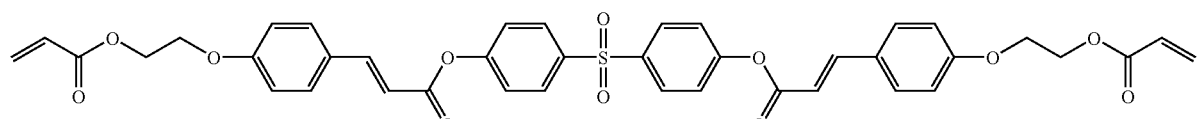
(4-2-8)
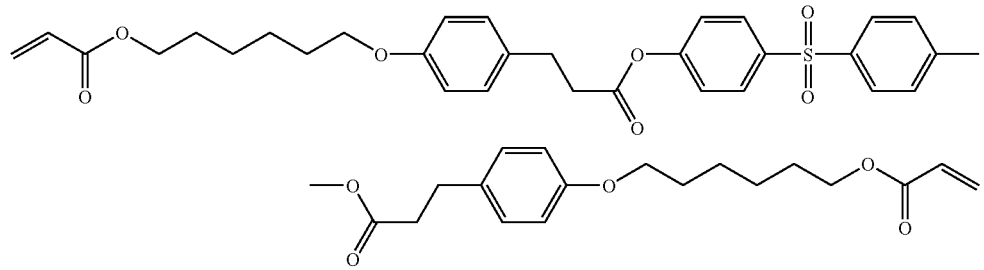
(4-2-9)
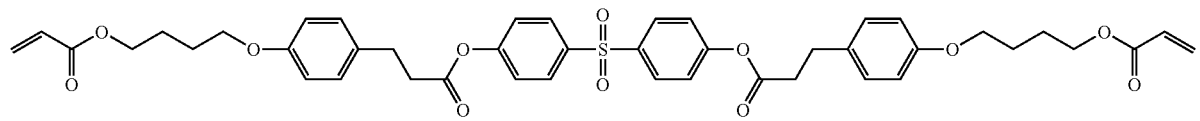
(4-2-10)
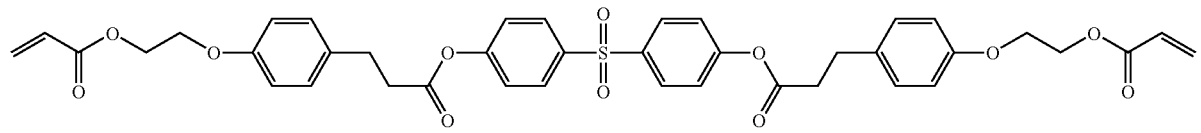
(4-2-11)
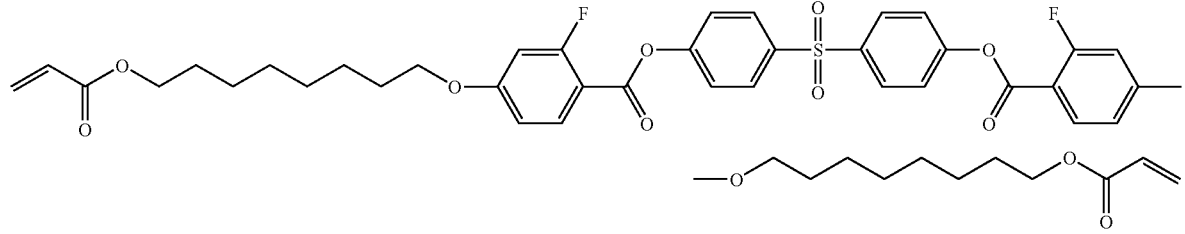
(4-2-12)
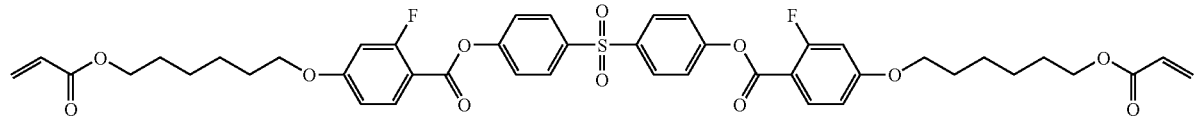

-continued (4-2-13)
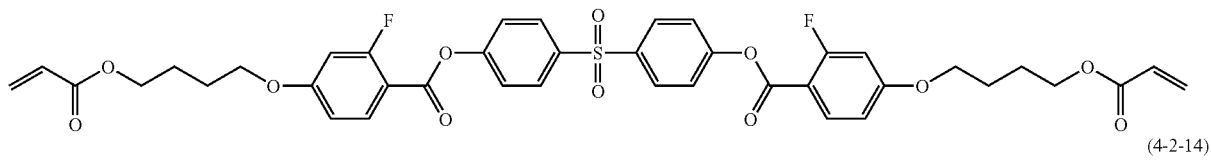

(4-2-14)
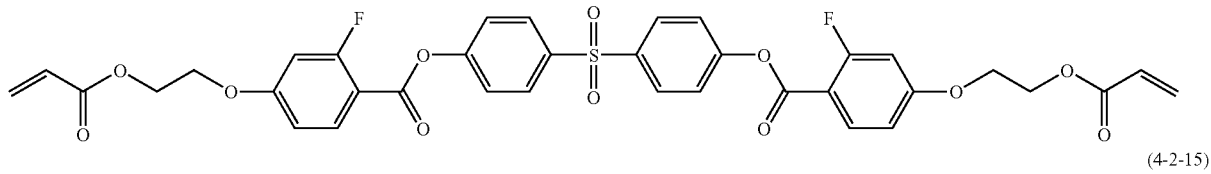

(4-2-15)
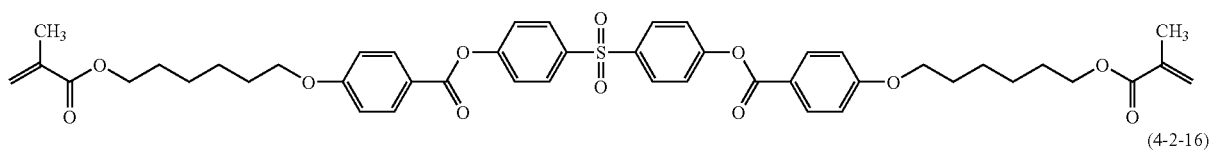

(4-2-16)
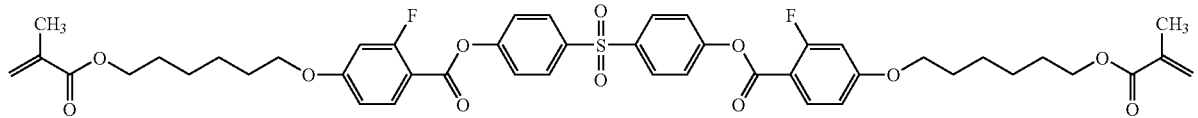

The compound (E) is a non-liquid crystalline multifunctional polymerizable compound having from 3 to 70 polymerizable groups in one molecule. The compound may be a commercially available product. Preferred examples of the compound (E) include pentaerythritol triacrylate, trimethylolpropane triacrylate, trimethylol ethylene oxide adduct triacrylate, tris(acryloxyethyl) phosphate, tris(acryloxyethyl) isocyanurate, alkyl-modified dipentaerythritol triacrylate, ethylene oxide-modified trimethylolpropane triacrylate, polyethylene oxide-modified trimethylolpropane triacrylate, pentaerythritol tetraacrylate, alkyl-modified dipentaerythritol tetraacrylate, ditrimethylolpropane tetraacrylate, dipentaerythritol hexaacrylate, dipentaerythritol monohydroxypentaacrylate, alkyl-modified dipentaerythritol pentaacrylate, Biscoat V #802 (number of functional groups: 8), and Biscoat V #1000 (number of functional groups: ca. 14). "Biscoat" is a trade name of Osaka Organic Chemical Industry, Ltd. A compound having a number of functional groups of 16 or more can be obtained by acrylating Boltorn H20 (number of functional groups: 16), Boltorn H30 (number of functional groups: 32) and Boltorn H40 (number of functional groups: 64), available from Perstorp Specialty Chemicals AB.

Examples of the other polymerizable compound, the additive and the organic solvent will be described. These compounds may be commercially available products. Examples of the other polymerizable compound include a compound having one polymerizable group and a compound having two polymerizable groups.

Examples of the compound having one polymerizable group include styrene, nuclear substituted styrene, acrylonitrile, vinyl chloride, vinylidene chloride, vinylpyridine, N-vinylpyrrolidone, vinylsulfonic acid, a vinyl fatty acid ester (such as vinyl acetate), an α,β-ethylenic unsaturated carboxylic acid (such as acrylic acid, methacrylic acid, maleic acid, fumaric acid and itaconic acid), an alkyl ester of (meth)acrylic acid (number of carbon atoms of alkyl: 1 to 18), a hydroxyalkyl ester of (meth)acrylic acid (number of carbon atoms of hydroxyalkyl: 1 to 18), an aminoalkyl ester of (meth)acrylic acid (carbon number of aminoalkyl: 1 to 18), an ether oxygen-containing alkyl ester of (meth)acrylic acid (number of carbon atoms of ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butylbenzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoic acid, vinyl propionate, vinyl stearate, vinyl 2-ethyl-2-methylbutanoate, dicyclopentanyloxylethyl (meth)acrylate, isobornyloxyethyl (meth)acrylate, isobornyl (meth)acrylate, adamantyl (meth)acrylate, dimethyladamantyl (meth)acrylate, dicyclopentanyl (meth)acrylate, dicyclopentenyl (meth)acrylate, 2-acryloyloxyethylsuccinic acid, 2-acryloyloxyethylhexahydrophthalic acid, 2-acryloyloxyethylphthalic acid, 2-acryloyloxyethyl-2-hydroxyethylphthalic acid, 2-acryloyloxyethyl acid phosphate, 2-methacryloyloxyethyl acid phosphate, a mono(meth)acrylate ester or a di(meth)acrylate ester of polyalkylene glycol, such as polyethylene glycol, polypropylene glycol or a copolymer of ethylene oxide and propylene oxide, having a polymerization degree of from 1 to 100, and a mono(meth)acrylate ester of polyalkylene glycol, such as polyethylene glycol, polypropylene glycol or a copolymer of ethylene oxide and propylene oxide, having a polymerization degree of from 1 to 100 and having a terminal capped with an alkyl group having from 1 to 6 carbon atoms.

Examples of the compound having two polymerizable groups include 1,4-butanediol diacrylate, 1,6-hexanediol diacrylate, 1,9-nonanediol diacrylate, neopentyl glycol diacrylate, dimethyloltricyclodecane diacrylate, triethylene glycol diacrylate, dipropylene glycol diacrylate, tripropylene glycol diacrylate, tetraethylene glycol diacrylate, bisphenol A ethylene oxide adduct diacrylate, bisphenol A glycidyl diacrylate (Biscoat V #700), polyethylene glycol diacrylate, and methacrylate compounds of these compounds. These compounds are suitable for increasing the film forming property of the polymer.

Various compound may be used as the surfactant, examples of which include a silicone compound, a fluorine compound, a polyether compound, an acrylic acid copolymer, a titanate compound, imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, an amine lauryl sulfate compound, an alkyl-substituted aromatic sulfonate salt, an alkyl phosphate salt, an aliphatic or aromatic sulfonic acid formalin condensate, laurylamide propylbetaine, laurylamino betaine acetate, a polyethylene glycol fatty acid ester, polyoxyethylene alkylamine, a perfluoroalkyl sulfonate salt, a perfluoroalkyl carboxylate salt, an oligomer having a perfluoroalkyl group and a hydrophilic group, an oligomer having a perfluoroalkyl group and an oleophilic group, urethane having a perfluoroalkyl group, polyester-modified polydimethylsiloxane having a hydroxyl group, polyester-modified polydimethylsiloxane having a hydroxyl group, polyether-modified polydimethylsiloxane having a hydroxyl group, and polyester-modified polyalkylsiloxane. The surfactant has such an effect as facilitation of coating of the composition on the supporting substrate. A preferred ratio of the surfactant varies depending on the kind of the surfactant and the compositional formulation of the composition, and is from 0.0001 to 0.05, and more preferably from 0.001 to 0.03, in a weight ratio in terms of the total weight of the polymerizable compounds.

A known photopolymerization initiator may be used for optimizing the polymerization rate of the polymerizable liquid crystal composition. The addition amount of the photopolymerization initiator is preferably from 0.0001 to 0.20, more preferably from 0.001 to 0.15, and further preferably from 0.01 to 0.15, in a weight ratio in terms of the total weight of the polymerizable compounds. Examples of the photopolymerization initiator include 2-hydroxy-2-methyl-1-phenyl-propan-1-one (DAROCURE 1173), 1-hydorxycyclohexyl phenyl ketone, 2,2-dimethoxy-1,2-diphenylethan-1-one (IRGACURE 651), 1-hydroxycyclohexyl phenyl ketone (IRGACURE 184), IRGACURE 127, IRGACURE 500 (a mixture of IRGACURE 184 and benzophenone), IRGACURE 2959, IRGACURE 907, IRGACURE 369, IRGACURE 379, IRGACURE 754, IRGACURE 1300, IRGACURE 819, IRGACURE 1700, IRGACURE 1800, IRGACURE 1850, IRGACURE 1870, DAROCURE 4265, DAROCURE MBF, DAROCURE TPO, IRGACURE 784, IRGACURE 754, IRGACURE OXE01, and IRGACURE OXE02. DAROCURE and IRGACURE are trade names of commercial products available from Ciba Specialty Chemicals Co., Ltd. A known sensitizer may be added thereto, examples of which include isopropylthioxanthone, diethylthioxanthone, ethyl-4-dimethylaminobenzoate (DAROCURE EDB) and 2-ethylhexyl-4-dimethylaminobenzoate (DAROCURE EHA).

Examples of the photoradical polymerization initiator also include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-(4-(methylthio)phenyl)-2-morpholinopropane-1-one, a mixture of 2,4-diethylxanthone and methyl p-dimethylaminobenzoate, a mixture of benzophenone and methyltriethanolamine.

One or two or more chain transfer agents may be added to the polymerizable liquid crystal composition to control the mechanical characteristics of the polymer. The use of a chain transfer agent enables to control the length of the polymer chain or the distance between two crosslinked polymer chains in the polymer film. These lengths can be controlled simultaneously. Upon increasing the amount of the chain transfer agent, the length of the polymer chain is decreased. Preferred examples of the chain transfer agent include a thiol compound. Examples of a monofunctional thiol compound include dodecanethiol and 2-ethylhexyl-(3-mercaptopropyonate). Examples of a multifunctional thiol compound include trimethylolpropane tris(3-mercaptopropyonate), pentaerythritol tetrakis(3-mercaptopropyonate), 1,4-bis(3-mercaptobutyryloxy)butane (Karenz MT BD1), pentaerythritol tetrakis (3-mercaptobutyrate) (Karenz MT PE1), and 1,3,5-tris(3-mercaptobutyloxyethyl)-1,3,5-triazine-2,4,6(1H,3H,5H)-trione (Karenz MT NR1). Karenz is a trade name of a commercial product available from Showa Denko Co., Ltd.

A polymerization inhibitor may be added to the polymerizable liquid crystal composition for preventing initiation of polymerization upon storing. A known polymerization inhibitor may be used, and preferred examples thereof include 2,5-di(t-butyl)hydroxytoluene (BHT), hydroquinone, Methylene Blue, diphenylpicric acid hydrazide (DPPH), benzothiadine, 4-nitrosodimethylaniline (NIDI) and o-hydroxybenzophenone.

An oxygen inhibitor may be added to the polymerizable liquid crystal composition for improving the storage stability thereof. A radical formed in the composition reacts with oxygen in the atmosphere to provide a peroxide radical, which accelerate unfavorable reaction with the polymerizable compound. In order to prevent the phenomenon, an oxygen inhibitor is preferably added. Examples of the oxygen inhibitor include a phosphate ester compound.

In order to improve the weather resistance of the polymerizable liquid crystal composition, an ultraviolet ray absorbent, a light stabilizer (radical scavenger) and an antioxidant may be added. Examples of the ultraviolet ray absorbent include TINUVIN PS, TINUVIN P, TINUVIN 99-2, TINUVIN 109, TINUVIN 213, TINUVIN 234, TINUVIN 326, TINUVIN 328, TINUVIN 329, TINUVIN 384-2, TINUVIN 571, TINUVIN 900, TINUVIN 928, TINUVIN 1130, TINUVIN 400, TINUVIN 405, TINUVIN 460, TINUVIN 479 TINUVIN 5236, ADK STAB LA32, ADK STAB LA-34, ADK STAB LA-36, ADK STAB LA-31, ADK STAB 1413 and ADK STAB LA-51. TINUVIN is a trade name of a commercial product available from Ciba Specialty Chemicals Co., Ltd., and ADK STAB is a trade name of a commercial product available from ADEKA Corp.

Examples of the light stabilizer include TINUVIN 111FDL, TINUVIN 123, TINUVIN 144, TINUVIN 152, TINUVIN 292, TINUVIN 622, TINUVIN 770, TINUVIN 765, TINUVIN 780, TINUVIN 905, TINUVIN 5100, TINUVIN 5050, TINUVIN 5060, TINUVIN 5151, CHIMASSORB 119FL, CHIMASSORB 944FL, CHIMASSORB 944LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, CYASORB UV-3346, available from Nihon Cytec Industries Inc., and Good-rite UV-3034, available from Goodrich Corp. CHIMASSORB is a trade name of a commercial product available from Ciba Specialty Chemicals Co., Ltd.

Examples of the antioxidant include ADK STAB AO-20, AO-30, AO-40, AO-50, AO-60 and AO-80, Sumilizer BHT, Sumilizer BBM-S and Sumilizer GA-80, available from Sumitomo Chemical Co., Ltd., and Irganox 1076, Irganox 1010, Irganox 3114 and Irganox 245, available from Ciba Specialty Chemicals Co., Ltd. These commercially available products may be used.

A silane coupling agent may be added to the polymerizable liquid crystal composition for controlling adhesion to the substrate. Specific examples of the silane coupling agent include vinyltrialkoxysilane, 3-aminopropyltrialkoxysilane, N-(2-aminoethyl)-3-aminopropyltrialkoxysilane, 3-glycidoxypropyltrialkoxysilane, 3-chlorotrialkoxysilane, and 3-methacryloxypropyltrialkoxysilane. Examples thereof also include dialkoxymethylsilane compounds obtained by replacing one alkoxy group among the three alkoxy groups of these compounds by methyl. Preferred examples of the silane coupling agent include 3-aminopropyltriethoxysilane.

The polymerizable liquid crystal composition may be coated as it is on the surface of the substrate. However, in general, for facilitating coating operation, the polymerizable liquid crystal composition is diluted with a solvent, or in alternative, the components of the polymerizable liquid crystal composition are dissolved in a solvent, so as to prepare a solution of the polymerizable liquid crystal composition containing the polymerizable liquid crystal composition and the solvent, and the solution is coated. A sole compound may be used as the solvent, and two or more of compounds may be used as a mixture therefor. Examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (such as methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (such as methyl propionate, methyl 3-methoxypropyonate, ethyl propionate, propyl propionate and butyl propionate), alkyl butyrate (such as methyl butyrate, ethyl butyrate, isobutyl butyrate and propyl butyrate), dialkyl malonate (such as diethyl malonate), alkyl glycolate (such as methyl glycolate and ethyl glycolate), alkyl lactate (such as methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-dimethylacetamide, N-methylpropyonamide, N,N-dimethylformamide, N,N-diethylformamide, N,N-diethylacetamide, N,N-diemthylacetamide dimethylacetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis(2-propyl) ether, 1,4-dioxane and tetrahydrofuran (THF).

Preferred examples of the glycol monoalkyl ether solvent include ethylene glycol monoalkyl ether (such as ethylene glycol monomethyl ether and ethylene glycol monobutyl ether), diethylene glycol monoalkyl ether (such as diethylene glycol monoethyl ether), triethylene glycol monoalkyl ether, propylene glycol monoalkyl ether (such as propylene glycol monobutyl ether), dipropylene glycol monoalkyl ether (such as dipropylene glycol monomethyl ether), ethylene glycol monoalkyl ether acetate (such as ethylene glycol monobutyl ether acetate), diethylene glycol monoalkyl ether acetate (such as diethylene glycol monoethyl ether acetate), triethylene glycol monoalkyl ether acetate, propylene glycol monoalkyl ether acetate (such as propylene glycol monomethyl ether acetate, propylene glycol monoethyl ether acetate and propylene glycol monobutyl ether acetate), dipropylene glycol monoalkyl ether acetate (such as dipropylene glycol monomethyl ether acetate), and diethylene glycol methyl ethyl ether.

Preferred examples of the aromatic hydrocarbon solvent include benzene, toluene, xylene, mesitylene, ethylbenzene, diethylbenzene, i-propylbenzene, n-propylbenzene, t-butylbenzene, s-butylbenzene, n-butylbenzene and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

An amide solvent, an aromatic hydrocarbon solvent and a ketone solvent are preferably used from the standpoint of solubility of the polymerizable liquid crystal compounds, and an ester solvent, an alcohol solvent, an ether solvent and a glycol monoalkyl ether solvent are also preferably used in combination from the standpoint of the boiling point of the solvent. There is no particular limitation on selecting the solvent, and in the case where a plastic substrate is used as the supporting substrate, it is necessary to lower the drying temperature to prevent the substrate from being deformed, and is also necessary to prevent the substrate from being damaged with the solvent. Preferred examples of the solvent used in this case include an aromatic hydrocarbon solvent, a ketone solvent, an ester solvent, an ether solvent, an alcohol solvent, an acetate solvent and a glycol monoalkyl acetate solvent.

The ratio of the solvent in the solution of the polymerizable liquid crystal composition is generally from 50 to 95% based on the total weight of the solution. The lower limit is a value determined by considering the solubility of the polymerizable liquid crystal compound and the optimum viscosity upon coating the solution. The upper limit is a value determined by considering the economical issue, such as the cost for the solvent and the time and amount of heat necessary for evaporating the solvent. The ratio of the solvent is preferably from 60 to 90%, and more preferably from 70 to 85%.

In the following description, a liquid crystal film of the invention obtained from the polymerizable liquid crystal composition may be referred to as a liquid crystal film in some cases. The liquid crystal film can be produced in the following manner. The solution of the polymerizable liquid crystal composition is coated on a supporting substrate, and then dried to form a coated film. The coated film is then irradiated with light to polymerize the polymerizable liquid crystal composition to fix the nematic alignment formed by the composition in a liquid crystal state in the coated film. The supporting substrate that can be used herein include glass and a plastic film. Examples of the plastic film include films of polyimide, polyamideimide, polyamide, polyetherimide, polyeheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

Examples of the cycloolefin resin include a norbornene resin and a dicyclopentadiene resin, but it is not limited thereto. Among these, those having no unsaturated bond or having unsaturated bonds that have been hydrogenated are preferred. Examples thereof include a hydrogenated product of a ring-opening (co)polymer of one or plural norbornene monomers, an addition (co)polymer of one or plural norbornene monomers, an addition copolymer of a norbornene monomer and an olefin monomer (such as ethylene and α-olefin), an addition copolymer of a norbornene monomer and a cycloolefin monomer (such as cyclopentene, cyclooctene and 5,6-dihyroxycyclopentadiene), and modified products thereof, and specific examples thereof include ZEONEX and ZEONOR (produced by Nippon Zeon Corp.), ARTON (produced by JSR Corp.), TOPAS (produced by Ticona, Inc.), APEL (produced by Mitsui Chemicals, Inc.), ESCENA (produced by Sekisui Chemical Co., Ltd.) and OPTOREZ (produced by Hitachi Chemical Co., Ltd.)

The plastic film may be a uniaxially stretched film or a biaxially stretched film. The plastic film may be subjected to a surface treatment, such as a hydrophilic treatment, e.g., a corona treatment and a plasma treatment, and a hydrophobic treatment. The method for the hydrophilic treatment is not particularly limited, but a corona treatment and a plasma treatment are preferred, and a plasma treatment is particularly preferred. The plasma treatment can be effected by a method disclosed in JP-A-2002-226616 and JP-A-2002-121648. An anchor coating layer may be formed for improving adhesion between the liquid crystal film and the plastic film. The anchor coating layer may be formed of an inorganic material or an organic material as far as the layer improves adhesion between the liquid crystal film and the plastic film. The plastic film may be a laminated film. Instead of the plastic film, a metallic substrate, such as aluminum, iron and copper, having slit grooves formed on the surface thereof, and a glass substrate, such as alkali glass, borosilicate glass and flint glass, having been etched in a slit form may also be used.

The supporting substrate, such as the glass and plastic films, may be subjected to a physical or mechanical surface treatment, such as rubbing, before forming a coated film of the polymerizable liquid crystal composition. In the case where the polymerizable liquid crystal layer and the liquid crystal film of homeotropic alignment are to be formed, such a surface treatment as rubbing is not carried out in many cases, but the rubbing treatment may be carried out for preventing alignment defects from occurring. The rubbing treatment may be carried out by an arbitrary method, and in general, the following methods are employed. That is, a rubbing cloth formed of such a material as rayon, cotton or polyamide is wound on a metallic roll, and the roll is rotated and moved in a state where the roll is in contact with the supporting substrate or the polymer film, or the supporting substrate is moved with the rotated roll staying. The rubbing treatment may be carried out directly on the supporting substrate, or a polymer film is firstly formed on the supporting substrate, and then the polymer film is subjected to the rubbing treatment. The method for the rubbing treatment has been described above. An alignment capability may be imparted to the surface of the supporting substrate by oblique vapor deposition of silicon oxide depending on the kind of the supporting substrate.

Examples of a coating method for obtaining a uniform thickness upon coating the polymerizable liquid crystal composition or a solution thereof include a spin coating method, a microgravure coating method, a gravure coating method, a wire bar coating method, a dip coating method, a spray coating method, a meniscus coating method and a die coating method. In particular, a wire bar coating method and the like, in which a shearing force is applied to the liquid crystal composition upon coating, may be employed in the case where the alignment of the liquid crystal composition is controlled without a surface treatment, such as rubbing, on the substrate.

Upon preparing the solution of the polymerizable liquid crystal composition, the compound (3) as the component (C) may be used after dissolving with a solvent. The solvent is selected from such solvents that have a capability of dissolving the component (C) and do not impair the stability and uniformity of the homeotropic alignment of the polymerizable liquid crystal composition, which is an advantage of the invention. Examples of the solvent include those solvents that have been described for preparation of the solution of the polymerizable liquid crystal composition. The using amount thereof may be set within such a range that the stability of the polymerizable liquid crystal composition is not impaired.

Upon coating the solution of the polymerizable liquid crystal composition of the invention, the solvent is removed after coating to form a polymerizable liquid crystal layer having a uniform thickness, i.e., a layer of the polymerizable liquid crystal composition, on the supporting substrate. The conditions for removing the solvent are not particularly limited, and the coated film is dried to such an extent that the solvent has been substantially removed, and the coated film of the polymerizable liquid crystal composition loses flowability. The solvent can be removed by air drying at room temperature, drying with a hot plate, drying in a drying furnace, blowing warm air or hot air. The polymerizable liquid crystal composition in the coated film may complete nematic alignment during the drying operation of the coated film in some cases, depending on the kinds and the compositional ratios of the compounds used in the polymerizable liquid crystal composition. Accordingly, the coated film after completing the drying step can be subjected to a polymerizing step without subjecting to a heat-treating step described later.

Preferred ranges of the temperature and time for the heat treatment of the coated film, the wavelength of light used for light irradiation, and the amount of light radiated from a light source vary depending on the kinds and compositional ratios of the compounds used in the polymerizable liquid crystal composition, and the presence or absence and the addition amount of the photopolymerization initiator. Accordingly, the conditions of the temperature and time for the heat treatment of the coated film, the wavelength of light used for light irradiation, and the amount of light radiated from a light source described later are considered to be approximative ranges.

The heat treatment of the coated film is preferably carried out under such conditions that the solvent is removed, and uniform alignment of the polymerizable liquid crystal is obtained. The heat treatment may be carried out at a temperature higher than the liquid crystal phase transition temperature of the polymerizable liquid crystal composition. One example of the heat-treating method is a method of heating the coated film to a temperature where the polymerizable liquid crystal composition exhibits a nematic liquid crystal phase, whereby the polymerizable liquid crystal composition in the coated film forms nematic alignment. Nematic alignment may be formed by changing the temperature of the coated film within a temperature range where the polymerizable liquid crystal composition exhibits a nematic liquid crystal phase. In this method, the coated film is heated to a high temperature region within the aforementioned temperature range to complete substantially nematic alignment of the coated film, and then the temperature is decreased to make alignment with higher regularity. In both cases using the heat-treating methods, the heat-treating temperature may be from room temperature to 120° C., preferably room temperature to 100° C., more preferably from room temperature to 90° C., and further preferably from room temperature to 70° C. The heat-treating time is generally from 5 seconds to 2 hours, preferably from 10 seconds to 40 minutes, and more preferably from 20 seconds to 20 minutes. In order to increase the temperature of the layer containing the polymerizable liquid crystal composition to the prescribed temperature, the heat-treating time is preferably 5 seconds or more. In order to prevent the productivity from being deteriorated, the heat-treating time is preferably 2 hours or less. The polymerizable liquid crystal layer of the invention is thus completed in this manner.

The nematic alignment state of the polymerizable liquid crystal compounds formed in the polymerizable liquid crystal layer is fixed by polymerizing the polymerizable liquid crystal composition through irradiation of light. The wavelength of the light used for the light irradiation is not particularly limited, and an electron beam, an ultraviolet ray, a visible ray, an infrared ray (heat ray) and the like may be used. In general, an ultraviolet ray or a visible ray is used. The range of the wavelength is generally from 150 to 500 nm, preferably from 250 to 450 nm, and more preferably from 300 to 400 nm. Examples of the light source include a low pressure mercury lamp (such as a bactericidal lamp, a fluorescent chemical lamp and a black light), a high pressure discharge lamp (such as a high pressure mercury lamp and a metal halide lamp), and a short arc discharge lamp (such as a super high pressure mercury lamp, a xenon lamp and a mercury xenon lamp). Preferred examples of the light source include a metal halide lamp, a xenon lamp, a super high pressure mercury lamp and a high pressure mercury lamp. The wavelength range of the light source used for irradiation may be selected by inserting a filter between the light source and the polymerizable liquid crystal layer to pass the specific wavelength range. The amount of light radiated from the light source is generally from 2 to 5,000 mJ/cm$^2$, preferably from 10 to 3,000 mJ/cm$^2$, and more preferably from 100 to 2,000 mJ/cm$^2$. The temperature condition upon irradiation of light is preferably set similarly to the heat-treating temperature. The atmosphere upon polymerization may be any of a nitrogen atmosphere, an inert gas atmosphere and an air atmosphere, and a nitrogen atmosphere and an inert gas atmosphere are preferred from the standpoint of improving the curing property.

In the case where the polymerizable liquid crystal layer of the invention and a liquid crystal film obtained by polymerizing it through light or heat are used in various optical devices, and in the case where they are used as an optical compensation device used in a liquid crystal display device, it is considerably important to control the distribution of the tilt angle in the thickness direction.

One example of the method of controlling the tilt angle is a method of controlling the kinds and compositional ratios of the liquid crystal compounds used in the polymerizable liquid crystal composition. The tilt angle can be controlled by adding other components to the polymerizable liquid crystal composition. The tilt angle of the liquid crystal film can also be controlled by the kind of the solvent and the concentration of the solute in the polymerizable liquid crystal composition, and the kind and addition amount of the surfactant added as one of the other components. The tilt angle of the liquid crystal film can also be controlled by the kind and the rubbing condition of the supporting substrate or the polymer coated film, and the drying conditions and heat-treating conditions of the coated film of the polymerizable liquid crystal composition. Furthermore, the irradiation atmosphere and the temperature upon irradiation in the photopolymerization step after alignment also influence the tilt angle of the liquid crystal film. In other words, it can be considered that substantially the all conditions in the production process of the liquid crystal film influence the tilt angle in any way. Therefore, an arbitrary tilt angle can be obtained by optimizing the polymerizable liquid crystal composition and by appropriately selecting the various conditions in the production process of the liquid crystal film.

In homeotropic alignment, the tilt angle is distributed uniformly from the substrate interface to the free interface at from 85 to 90 degree. The alignment state can be obtained by forming a coated film of the polymerizable liquid crystal composition of the invention having the component (C) added thereto on the surface of the supporting substrate. In order to obtain uniform homeotropic alignment in the invention, the using ratio of the component (C) is preferably from 0.01 to 0.20, and more preferably from 0.03 to 0.15, in terms of weight ratio based on the total weight of the component (A), the component (B) and the component (D). Preferred examples of the compound (3) include the compound (3-1-1) (wherein n is 1 or 2), the compound (3-3-1) (wherein n is 2) and the compound (3-6-1).

In order to form uniform homeotropic alignment, plural kinds of the compounds (3) as the component (C) may be used in combination. The component (C) may be added directly to the polymerizable liquid crystal composition or added after diluting with a solvent or the like. There are some cases where it is difficult to form uniform homeotropic alignment even by the aforementioned method depending on the kinds of the polymerizable liquid crystal compounds or the the formulation of the polymerizable liquid crystal composition. In these cases, since it is considered that homogeneous alignment property or tilted alignment is significant, uniform homeotropic alignment can be obtained by such optimization that the addition amount of the component (C) is increased, or the amounts of the polymerizable liquid crystal compounds are decreased to the necessary minimum amounts. The homeotropic alignment can be further improved in uniformity when the surface of the supporting substrate has polarity by a hydrophilic treatment or the like. The uniform homeotropic alignment can be obtained without a surface treatment, such as rubbing, effected.

In the case where a homeotropic alignment agent is formed on the supporting substrate, examples thereof include a silane coupling agent, such as octadecyltriethoxysilane, lecithin, a chromium complex, a polyimide alignment film for homeotropic alignment, a low temperature (less than 180° C.) baked film of a polyamic acid alignment film, a high temperature (180° C. or more) baked film of a polyamic acid alignment film, and a water soluble silsesquioxane film. The tilt angle can also be controlled by using an electric field or a magnetic field.

There are cases where the uniformity of the aforementioned various alignment modes of the liquid crystal film can be improved by appropriately selecting the structures of the polymerizable liquid crystal compounds used. It has been observed in the invention that the uniformity can be stably obtained when the monofunctional polymerizable liquid crystal compound has cyano at a mesogen terminal group. Preferred examples of such compounds include the compounds (2-1-2), (2-1-3), (2-1-4), (2-1-5), (2-1-8) and (2-1-9).

A suitable thickness of the liquid crystal film varies depending on the retardation corresponding to the target device and the birefringence of the liquid crystal film. Therefore, the suitable range thereof cannot be determined strictly and may be generally from 0.05 to 50 μm, preferably from 0.1 to 20 μm, and more preferably from 0.5 to 10 μm. The liquid crystal film preferably has a haze of 1.5% or less, and more preferably 1.0% or less, and a transmittance of 80% or more, and more preferably 95% or more. The conditions of transmittance preferably satisfied in the visible ray region.

The liquid crystal film is effective as an optical compensation device applied to a liquid crystal display device (particularly, a liquid crystal display device of an active matrix type or a passive matrix type). Examples of the type of the liquid crystal display device, to which the liquid crystal film is applied as an optical compensation film, include an IPS (in-plane switching) type, an OCB (optically compensated birefringence) type, a TN (twisted nematic) type, an STN (super twisted nematic) type, an ECB (electrically controlled birefringence) type, a DAP (deformation of aligned phases) type, a CSH (color super homeotropic) type, a VAN/VAC (vertically aligned nematic/cholesteric) type, an OMI (optical mode interference) type and an SBE (super birefringence effect) type. Furthermore, the liquid crystal film can be used as a phase retarder for a display device of a guest-host type, a ferroelectric type or antiferroelectric type. The optimum values of the parameters demanded for the liquid crystal film, such as the distribution of tilt angle in the thickness direction and the thickness, vary depending on the kind of device since they greatly depend on the kind of a liquid crystal device to be compensated and the optical parameters thereof.

The liquid crystal film can be used as an optical device having a polarizing plate and the like integrated therewith, and in this case, the liquid crystal film is disposed outside the liquid crystal cell. However, the liquid crystal film as an optical compensation device can be disposed inside the liquid crystal cell since it suffers no or less elution of impurities into the liquid crystal filled in the cell. By applying a photolithography technique to the use of the polymerizable liquid crystal composition, an optical compensation layer containing liquid crystal films having different optical parameters can be disposed in respective pixels of blue, green and red of the liquid crystal display device, or in respective prescribed regions obtained by dividing one of the pixels. For example, by applying the technique disclosed in JP-A-2001-222009 (US 2002/054260 A1), one pixel can be divided into a reflection display part and a transmission display part having a ¼λ plate formed of the liquid crystal film, whereby a semi-transmission-reflection liquid crystal display device improved in light utilization efficiency can be provided, i.e., the display capability of the liquid crystal display device can be further improved.

EXAMPLES

The invention will be described in more detail below with reference to examples, but the invention is not construed as being limited to the examples. Evaluation methods used in the examples are shown below.

(Polymerization Conditions)

A polymerizable composition was irradiated with light having an intensity of 30 mW/cm$^2$ (365 nm) by using a 250 W super high pressure mercury lamp for 30 seconds at room temperature.

(Confirmation of Alignment State of Liquid Crystal)

A substrate having a liquid crystal film was held between two polarizing plates having been disposed as crossed nicols. In the case where a dark field was viewed by observing the substrate from the front, and a bright field was viewed by observing the substrate in the vertical direction or the horizontal direction, it was evaluated that the liquid crystal film exhibited homeotropic alignment. With respect to the uniformity of homeotropic alignment, a substrate having a liquid crystal film was held between two polarizing plates having been disposed as crossed nicols, and in the case where light passing through the liquid crystal film due to alignment defects of the liquid crystal was not observed (dark field), it was evaluated that the liquid crystal film exhibited uniform homeotropic alignment. As the supporting substrate, a plastic film, a glass substrate coated with polyvinyl alcohol (PVA), a non-alkali glass substrate and a slide glass coated with polyamic acid having no long chain alkyl group, followed by baking, were used. A polymerizable liquid crystal composition was coated on a supporting substrate, oriented and polymerized under the aforementioned conditions to obtain a liquid crystal film.

(Measurement with Ellipsometer)

OPTIPRO ellipsometer, produced by SHINTECH, Inc., was used. A substrate having a liquid crystal film was irradiated with light having a wavelength of 550 nm. The retardation was measured by decreasing the incident angle of the light with respect to the film surface from 90 degree. The retardation is expressed by $\Delta n \times d$, wherein $\Delta n$ represents the optical anisotropy, and d represents the thickness of the polymer film.

(Confirmation of Stability of Solution)

A solution was allowed to stand at room temperature for 24 hours, and occurrence of change in color of the solution was observed. The change in rotation viscosity of the solution at 25° C. was measured with an E-type viscometer.

The compounds used in the examples are shown below.

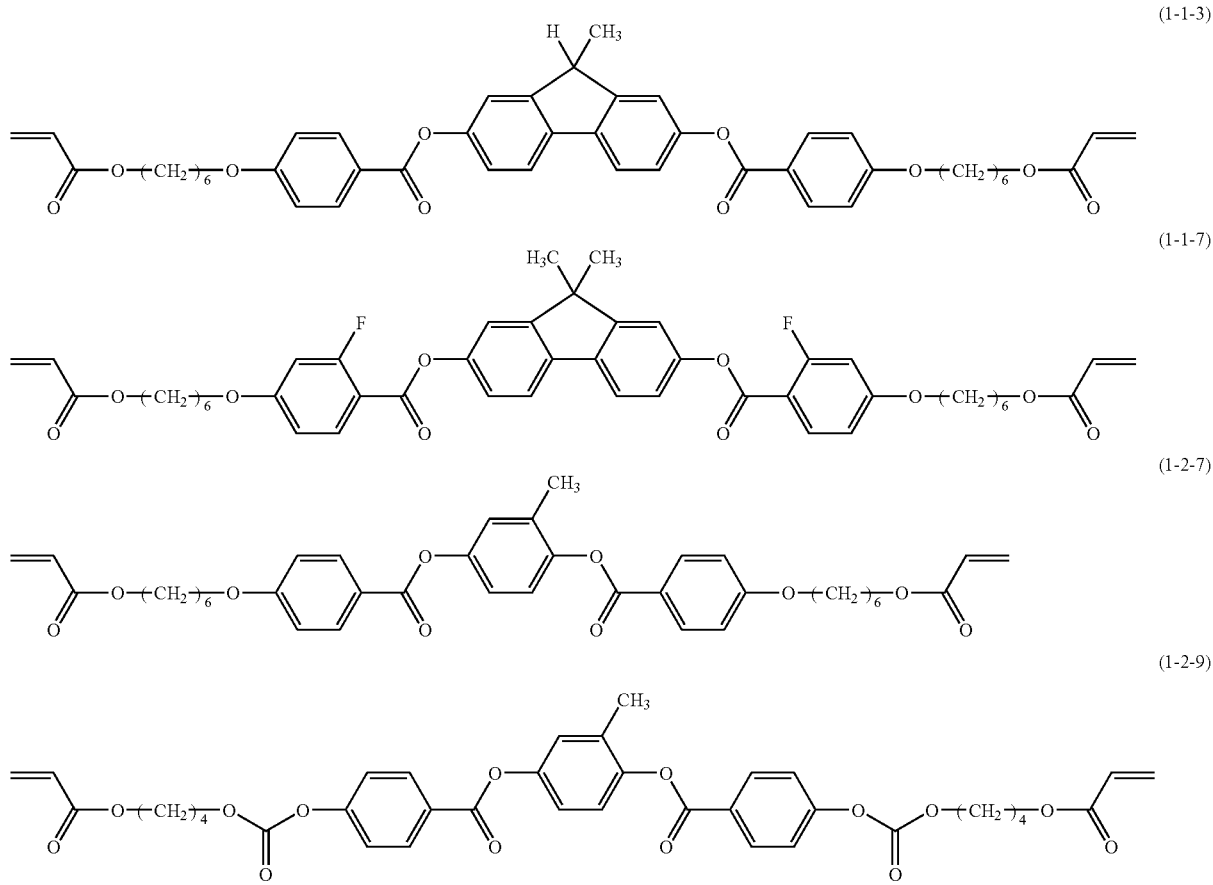

(1-2-11)
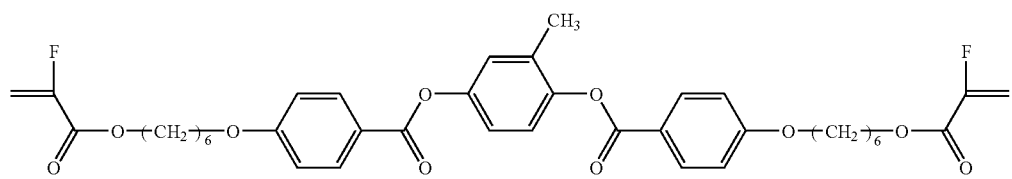
(1-2-12)
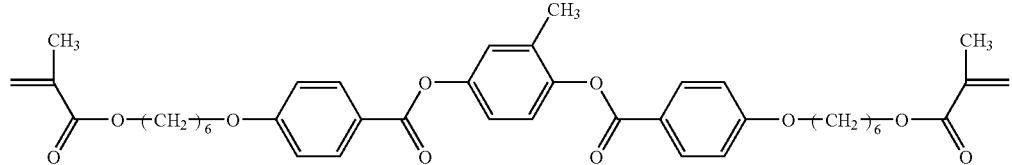
As the compound (2), the following compounds were used.
(2-1-3)
(2-1-9)
(2-1-5)
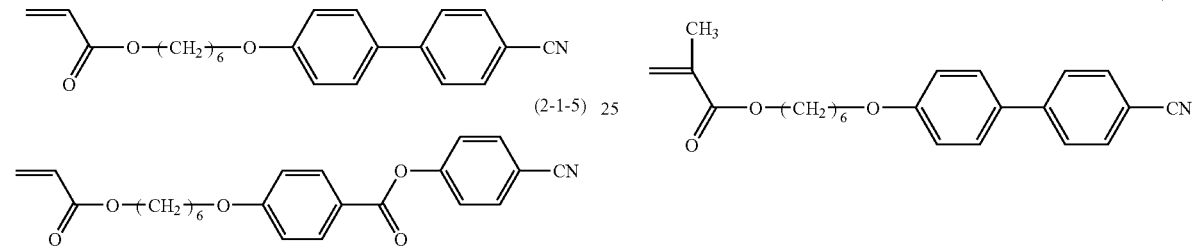
As the compound (3), the following compounds were used.
(3-1-1)
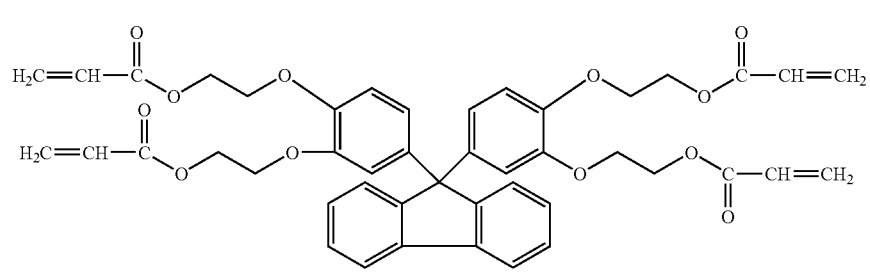
(3-3-1)
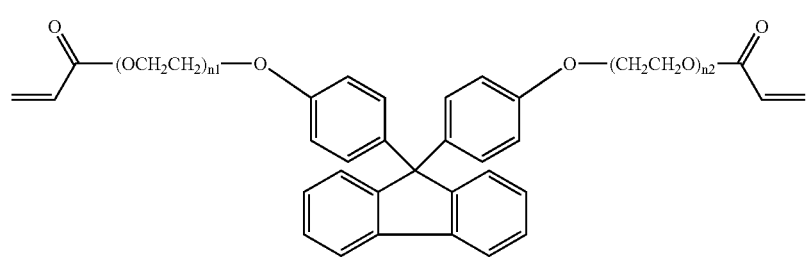
(3-6-1)
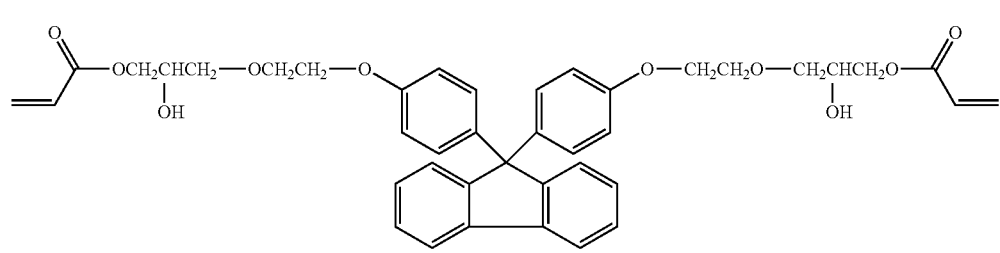

-continued

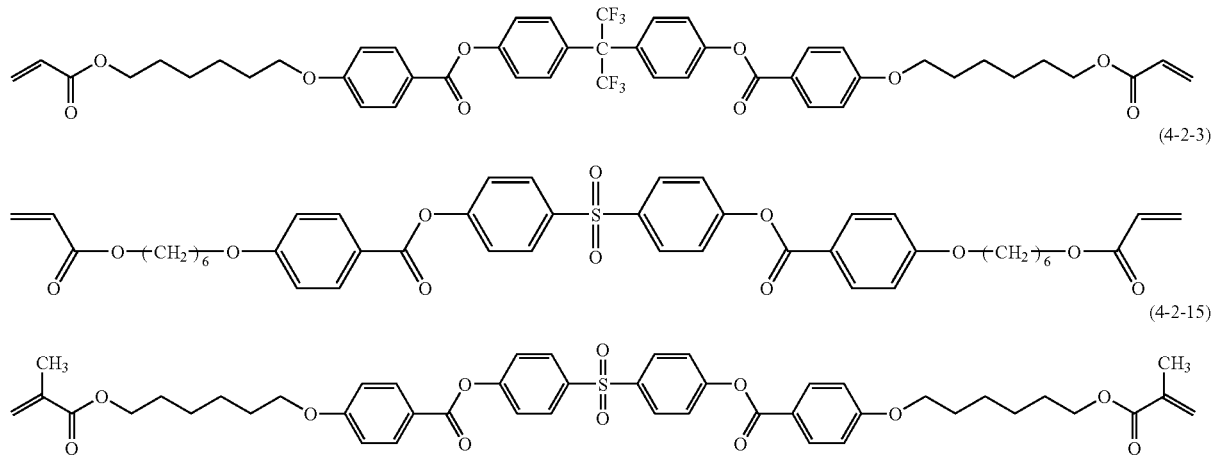

The compound (1-1-3) was synthesized by the method disclosed in JP-A-2003-238491 (US 2003/203128 A1).

The compound (1-1-7) was synthesized by the method disclosed in JP-A-2006-307150 (US 2006/222784 A1).

The compound (1-2-7) was synthesized according to the method disclosed in Makromol. Chem., vol. 190, p. 3201-3215 (1998).

The compound (1-2-9) was synthesized by the similar method as the method disclosed in WO 97/00600 (U.S. Pat. No. 6,136,225).

The compounds (2-1-3) and (2-1-9) were synthesized by the similar method as the method disclosed in Macromolecules, vol. 26, p. 6132-6134 (1993).

The compound (2-1-5) was synthesized by the method disclosed in Makromol. Chem., vol. 183, p. 2311-2321 (1982).

OGSOL CA-0400 was used as the compound (3-1-1), OGSOL EA-0500 (n1+n2=5) was used as the compound (3-3-1), and ONF-1 was used as the compound (3-6-1). The compounds were commercial products available from Osaka Gas Chemicals Co., Ltd.

The compounds (4-1-1), (4-2-3) and (4-2-15) were synthesized according to the method disclosed in JP-A-2007-16213 (US 2006/278851 A1).

Example 1

(Preparation of MIX1)

The compound (1-1-3) and the compound (2-1-3) were mixed at a weight ratio of 65/35, and the resulting composition was designated as MIX1. The compound (3-1-1) in a weight ratio of 0.05 and a polymerization initiator, IRGACURE 907, in a weight ratio of 0.03 were added to MIX1. Toluene was added to the composition to prepare a polymerizable liquid crystal composition (1) having a content of the solvent of 75% by weight.

Polyamic acid for low pretilt angle (for homogeneous alignment) (Lixon Aligner PIA-5310, produced by Chisso Corp.) was coated on a glass substrate (S-1112, produced by Matsunami Glass Industries, Ltd.), and after drying at 80° C. for 3 minutes, baked at 210° C. for 30 minutes. The polymerizable liquid crystal composition (1) was coated on the glass substrate having polyamic acid by a spin coating method. The substrate was heated to 70° C. for 3 minutes and cooled at room temperature for 3 minutes to form a coated film, from which the solvent was removed, and the coated film was polymerized with an ultraviolet ray under a nitrogen stream, so as to obtain a liquid crystal film exhibiting uniform homeotropic alignment. The measurement of retardation of the film provided the results shown in FIG. 1. The polymerizable liquid crystal composition (1) had good storage stability, and substantially no change in color thereof was observed. The polymerizable liquid crystal composition (1) also suffered no change in rotation viscosity of the solution, which indicated good storage stability.

Example 2

The compound (1-1-3) and the compound (2-1-3) were mixed at a weight ratio of 78/22, and the resulting composition was designated as MIX2. A polymerizable liquid crystal composition (2) was prepared in the same manner as in Example 1 except that the compound (3-1-1) in a weight ratio of 0.10 was added to MIX2, and a liquid crystal film was obtained with the polymerizable liquid crystal composition (2) in the same manner as in Example 1. The liquid crystal film exhibited uniform homeotropic alignment. The measurement of retardation of the film provided a curve similar to the curve shown in FIG. 1. The polymerizable liquid crystal composition (2) had good storage stability, and substantially no change in color thereof was observed. The polymerizable liquid crystal composition (2) also suffered no change in rotation viscosity of the solution, which indicated good storage stability.

Example 3

The compound (1-2-11) and the compound (2-1-3) were mixed at a weight ratio of 78/22, and the resulting composition was designated as MIX3. A polymerizable liquid crystal composition (3) was prepared in the same manner as in Example 1 except that the compound (3-1-1) in a weight ratio of 0.10 was added to MIX3, and a liquid crystal film was obtained with the polymerizable liquid crystal composition (3) in the same manner as in Example 1. The liquid crystal film exhibited uniform homeotropic alignment. The measurement of retardation of the film provided a curve similar to the curve shown in FIG. 1. The polymerizable liquid crystal composition (3) had good storage stability, and substantially no change in color thereof was observed. The polymerizable liquid crystal composition (3) also suffered no change in rotation viscosity of the solution, which indicated good storage stability.

Example 4

The compound (1-2-12) and the compound (2-1-3) were mixed at a weight ratio of 78/22, and the resulting composition was designated as MIX4. A polymerizable liquid crystal composition (4) was prepared in the same manner as in Example 1 except that the compound (3-1-1) in a weight ratio of 0.10 was added to MIX4, and a liquid crystal film was obtained with the polymerizable liquid crystal composition (4) in the same manner as in Example 1. The liquid crystal film exhibited uniform homeotropic alignment. The measurement of retardation of the film provided a curve similar to the curve shown in FIG. 1. The polymerizable liquid crystal composition (4) had good storage stability, and substantially no change in color thereof was observed. The polymerizable liquid crystal composition (4) also suffered no change in rotation viscosity of the solution, which indicated good storage stability.

Example 5

The compound (1-1-3) and the compound (2-1-5) were mixed at a weight ratio of 78/22, and the resulting composition was designated as MIX5. A polymerizable liquid crystal composition (5) was prepared in the same manner as in Example 1 except that the compound (3-1-1) in a weight ratio of 0.10 was added to MIX5, and a liquid crystal film was obtained with the polymerizable liquid crystal composition (5) in the same manner as in Example 1. The liquid crystal film exhibited uniform homeotropic alignment. The measurement of retardation of the film provided a curve similar to the curve shown in FIG. 1. The polymerizable liquid crystal composition (5) had good storage stability, and substantially no change in color thereof was observed. The polymerizable liquid crystal composition (5) also suffered no change in rotation viscosity of the solution, which indicated good storage stability.

Example 6

The compound (1-1-3) and the compound (2-1-3) were mixed at a weight ratio of 78/22, and the resulting composition was designated as MIX6. A polymerizable liquid crystal composition (6) was prepared in the same manner as in Example 1 except that the compound (3-3-1) in a weight ratio of 0.10 was added to MIX6, and a liquid crystal film was obtained with the polymerizable liquid crystal composition (6) in the same manner as in Example 1. The liquid crystal film exhibited uniform homeotropic alignment. The measurement of retardation of the film provided a curve similar to the curve shown in FIG. 1. The polymerizable liquid crystal composition (6) had good storage stability, and substantially no change in color thereof was observed. The polymerizable liquid crystal composition (6) also suffered no change in rotation viscosity of the solution, which indicated good storage stability.

Example 7

The compound (1-1-3) and the compound (2-1-3) were mixed at a weight ratio of 78/22, and the resulting composition was designated as MIX7. A polymerizable liquid crystal composition (7) was prepared in the same manner as in Example 1 except that the compound (3-6-1) in a weight ratio of 0.10 was added to MIX7, and cyclopentanone was used as the solvent. A liquid crystal film was obtained with the polymerizable liquid crystal composition (7) in the same manner as in Example 1. The liquid crystal film exhibited uniform homeotropic alignment. The measurement of retardation of the film provided a curve similar to the curve shown in FIG. 1. The polymerizable liquid crystal composition (7) had good storage stability, and substantially no change in color thereof was observed. The polymerizable liquid crystal composition (7) also suffered no change in rotation viscosity of the solution, which indicated good storage stability.

Example 8

MIX3 described in Example 3 was used. A polymerizable liquid crystal composition (8) was prepared in the same manner as in Example 1 except that the compound (3-1-1) in a weight ratio of 0.10 was added to MIX3, and cyclohexanone was used as the solvent. A liquid crystal film was obtained with the polymerizable liquid crystal composition (8) in the same manner as in Example 1. The liquid crystal film exhibited uniform homeotropic alignment. The measurement of retardation of the film provided a curve similar to the curve shown in FIG. 1. The polymerizable liquid crystal composition (8) had good storage stability, and substantially no change in color thereof was observed. The polymerizable liquid crystal composition (8) also suffered no change in rotation viscosity of the solution, which indicated good storage stability.

Example 9

MIX3 described in Example 3 was used. A polymerizable liquid crystal composition (9) was prepared in the same manner as in Example 1 except that the compound (3-1-1) in a weight ratio of 0.10 was added to MIX3, and a mixed solvent of toluene and ethyl lactate (1/1 by weight) was used as the solvent. A liquid crystal film was obtained with the polymerizable liquid crystal composition (9) in the same manner as in Example 1. The liquid crystal film exhibited uniform homeotropic alignment. The measurement of retardation of the film provided a curve similar to the curve shown in FIG. 1. The polymerizable liquid crystal composition (9) had good storage stability, and substantially no change in color thereof was observed. The polymerizable liquid crystal composition (9) also suffered no change in rotation viscosity of the solution, which indicated good storage stability.

Example 10

The compound (1-1-3) and the compound (2-1-3) were mixed at a weight ratio of 79/21, and the resulting composition was designated as MIX8. A polymerizable liquid crystal composition (10) was prepared in the same manner as in Example 1 except that the compound (3-3-1) in a weight ratio of 0.05 was added to MIX8, and toluene was used as the solvent. A liquid crystal film was obtained with the polymerizable liquid crystal composition (10) in the same manner as in Example 1 except that a TAC film (TACPHAN, a trade name, produced by Goju Sangyo Co., Ltd., thickness: 80 µm) was used as the supporting substrate. The liquid crystal film exhibited uniform homeotropic alignment. The measurement of retardation of the film provided a curve similar to the curve shown in FIG. 1. The polymerizable liquid crystal composition (10) had good storage stability, and substantially no change in color thereof was observed. The polymerizable liquid crystal composition (10) also suffered no change in rotation viscosity of the solution, which indicated good storage stability.

Example 11

MIX8 described in Example 10 was used. A polymerizable liquid crystal composition (11) was prepared in the same manner as in Example 1 except that the compound (3-1-1) in a weight ratio of 0.05 was added to MIX8, and toluene was used as the solvent. A liquid crystal film was obtained with the polymerizable liquid crystal composition (11) in the same manner as in Example 1 except that the TAC film (TACPHAN) was used as the supporting substrate. The liquid crystal film exhibited uniform homeotropic alignment. The measurement of retardation of the film provided a curve similar to the curve shown in FIG. 1. The polymerizable liquid crystal composition (11) had good storage stability, and substantially no change in color thereof was observed. The polymerizable liquid crystal composition (11) also suffered no change in rotation viscosity of the solution, which indicated good storage stability.

Example 12

The compound (1-2-7) and the compound (2-1-3) were mixed at a weight ratio of 68/32, and the resulting composition was designated as MIX9. A polymerizable liquid crystal composition (12) was prepared in the same manner as in Example 1 except that the compound (3-6-1) in a weight ratio of 0.05 was added to MIX9, and a mixed solvent of toluene and 2-propanol (9/1 by weight) was used as the solvent. A liquid crystal film was obtained with the polymerizable liquid crystal composition (12) in the same manner as in Example 1. The liquid crystal film exhibited uniform homeotropic alignment. The measurement of retardation of the film provided a curve similar to the curve shown in FIG. 1. The polymerizable liquid crystal composition (12) had good storage stability, and substantially no change in color thereof was observed. The polymerizable liquid crystal composition (12) also suffered no change in rotation viscosity of the solution, which indicated good storage stability.

Example 13

The compound (1-1-3), the compound (1-2-7), the compound (2-1-3) and the compound (2-1-5) were mixed at a weight ratio of 23/30/36/11, and the resulting composition was designated as MIX10. 1,6-Hexanediol diacrylate (Biscoat V #230, produced by Osaka Organic Chemical Industry, Ltd.) in a weight ratio of 0.10 and the compound (3-6-1) in a weight ratio of 0.05 were added to MIX10 to prepare MIX11. A polymerizable liquid crystal composition (13) was prepared in the same manner as in Example 1 except that a mixed solvent of toluene and 2-propanol (9/1 by weight) was used as the solvent, and a liquid crystal film was obtained with the polymerizable liquid crystal composition (13) in the same manner as in Example 1. The liquid crystal film exhibited uniform homeotropic alignment. The measurement of retardation of the film provided a curve similar to the curve shown in FIG. 1. The polymerizable liquid crystal composition (13) had good storage stability, and substantially no change in color thereof was observed. The polymerizable liquid crystal composition (13) also suffered no change in rotation viscosity of the solution, which indicated good storage stability.

Example 14

A norbornene resin (ZEONOR Film ZEONOR 1600R, produced by Nippon Zeon Corp., described in JP-A-2004-4641 (US 2003/210370 A1)) was used as a supporting substrate. The surface of the supporting substrate was subjected to a hydrophilic treatment (plasma treatment) by using an atmospheric pressure plasma surface treatment apparatus (AP-T02-L) in the following manner according to the method disclosed in JP-A-2002-226616.

An upper electrode (stainless steel (SUS304), dimension: 150 mm×100 mm) and a lower electrode (stainless steel (SUS304), dimension: 150 mm×100 mm) were disposed as being insulated from a metallic chamber. The distance between the electrodes was 2 mm. The facing surfaces of the upper electrode and the lower electrode were coated with $Al_2O_3$ thermal spraying films having a thickness of 1.5 mm. The norbornene resin film was disposed between the upper electrode and the lower electrode, and the apparatus was evacuated until the pressure inside the apparatus reached 1 Torr (ca. 133 Pa) with an oil rotation vacuum pump. After completing the evacuation, a mixed gas of argon and oxygen (70/30 by volume) was introduced through a gas introducing tube until the pressure inside apparatus reached 760 Torr (ca. $1.01×10^5$ Pa). Plasma discharge was effected by applying an alternating current pulse voltage of a rising time of 5 µs, a pulse width of 100 µs, a frequency of 10 kHz and a voltage of ±5 kV to the electrodes with a pulse electric power source, whereby both the surfaces of the norbornene resin film were subjected to a plasma discharge treatment. The norbornene resin film was subjected to the plasma discharge treatment by moving the resin film at a speed of 4 m/min between the upper electrode and the lower electrode.

The extent of the hydrophilic treatment was evaluated by measuring the contact angle of pure water dropped on the norbornene resin substrate at 25° C. (by using a contact angle meter CA-A, produced by Kyowa Interface Science Co., Ltd.), and the contact angle was 97 degree before the treatment and 30 degree after the treatment. MIX1 described in Example 1 was used, and a polymerizable liquid crystal composition (14) was prepared in the same manner as in Example 1 except that the compound (3-6-1) in a weight ratio of 0.10 was added to MIX1, and cyclohexanone was used as the solvent. A liquid crystal film was obtained with the polymerizable liquid crystal composition (14) in the same manner as in Example 1 except that the norbornene resin substrate having been subjected to the hydrophilic treatment was used as the supporting substrate. The liquid crystal film exhibited uniform homeotropic alignment. The measurement of retardation of the film provided a curve similar to the curve shown in FIG. 1. The polymerizable liquid crystal composition (14) had good storage stability, and substantially no change in color thereof was observed. The polymerizable liquid crystal composition (14) also suffered no change in rotation viscosity of the solution, which indicated good storage stability.

Example 15

MIX1 described in Example 1 was used, and Biscoat V #1000 (produced by Osaka Organic Chemical Industry, Ltd.) in a weight ratio of 0.15 and the compound (3-1-1) in a weight ratio of 0.10 were added to MIX1 to prepare MIX12. A polymerizable liquid crystal composition (15) was prepared in the same manner as in Example 1 except that a mixed solvent of N,N-dimethylacetamide, 3-methoxybutyl acetate and 2-propanol (3/6/1 by weight) was used as the solvent added to MIX12, and a liquid crystal film was obtained with the polymerizable liquid crystal composition (15) in the same manner as in Example 1. The liquid crystal film exhibited uniform homeotropic alignment. The measurement of retardation of the film provided a curve similar to the curve shown in FIG. 1. The polymerizable liquid crystal composition (15) had good storage stability, and substantially no change in color thereof was observed. The polymerizable liquid crystal composition (15) also suffered no change in rotation viscosity of the solution, which indicated good storage stability.

Example 16

MIX12 described in Example 15 was used, and Biscoat V #1000 (produced by Osaka Organic Chemical Industry, Ltd.) in a weight ratio of 0.18 and the compound (3-1-1) in a weight ratio of 0.15 were added to MIX12 to prepare MIX13. A polymerizable liquid crystal composition (16) was prepared in the same manner as in Example 1 except that a mixed solvent of N,N-dimethylacetamide, 3-methoxybutyl acetate and 2-propanol (3/6/1 by weight) was used as the solvent added to MIX13, and a liquid crystal film was obtained with the polymerizable liquid crystal composition (16) in the same manner as in Example 1. The liquid crystal film exhibited uniform homeotropic alignment. The measurement of retardation of the film provided a curve similar to the curve shown in FIG. 1. The polymerizable liquid crystal composition (16) had good storage stability, and substantially no change in color thereof was observed. The polymerizable liquid crystal composition (16) also suffered no change in rotation viscosity of the solution, which indicated good storage stability.

Example 17

MIX1 described in Example 1 was used, and Biscoat V #1000 (produced by Osaka Organic Chemical Industry, Ltd.) in a weight ratio of 0.15, pentaerythritol tetraacrylate (produced by Sigma Aldrich Corp.) in a weight ratio of 0.10 and the compound (3-1-1) in a weight ratio of 0.10 were added to MIX1 to prepare MIX14. A polymerizable liquid crystal composition (17) was prepared in the same manner as in Example 1 except that a mixed solvent of N,N-dimethylacetamide, 3-methoxybutyl acetate and 2-propanol (3/6/1 by weight) was used as the solvent added to MIX14, and a liquid crystal film was obtained with the polymerizable liquid crystal composition (17) in the same manner as in Example 1. The liquid crystal film exhibited uniform homeotropic alignment. The measurement of retardation of the film provided a curve similar to the curve shown in FIG. 1. The polymerizable liquid crystal composition (17) had good storage stability, and substantially no change in color thereof was observed. The polymerizable liquid crystal composition (17) also suffered no change in rotation viscosity of the solution, which indicated good storage stability.

Example 18

The compound (1-2-7), the compound (4-2-3) and the compound (2-1-3) were mixed at a weight ratio of 60/20/20, and the resulting composition was designated as MIX15. The compound (3-6-1) in a weight ratio of 0.05 was added to MIX15, and a polymerizable liquid crystal composition (18) was prepared in the same manner as in Example 1 except that cyclohexanone was used as the solvent, and the ratio of the solvent was changed to 70% by weight. A liquid crystal film was obtained with the polymerizable liquid crystal composition (18) in the same manner as in Example 1. The liquid crystal film exhibited uniform homeotropic alignment. The measurement of retardation of the film provided a curve similar to the curve shown in FIG. 1. The polymerizable liquid crystal composition (18) had good storage stability, and substantially no change in color thereof was observed. The polymerizable liquid crystal composition (18) also suffered no change in rotation viscosity of the solution, which indicated good storage stability.

Example 19

The compound (1-2-9), the compound (4-2-3) and the compound (2-1-3) were mixed at a weight ratio of 60/10/30, and the resulting composition was designated as MIX16. The compound (3-6-1) in a weight ratio of 0.05 was added to MIX16, and a polymerizable liquid crystal composition (19) was prepared in the same manner as in Example 1 except that cyclohexanone was used as the solvent, and the ratio of the solvent was changed to 70% by weight. A liquid crystal film was obtained with the polymerizable liquid crystal composition (19) in the same manner as in Example 1. The liquid crystal film exhibited uniform homeotropic alignment. The measurement of retardation of the film provided a curve similar to the curve shown in FIG. 1. The polymerizable liquid crystal composition (19) had good storage stability, and substantially no change in color thereof was observed. The polymerizable liquid crystal composition (19) also suffered no change in rotation viscosity of the solution, which indicated good storage stability.

Example 20

MIX1 described in Example 1 was used, and the compound (3-6-1) in a weight ratio of 0.05 was added to MIX1. A polymerizable liquid crystal composition (20) was prepared in the same manner as in Example 1 except that cyclohexanone was used as the solvent, and the ratio of the solvent was changed to 70% by weight. A liquid crystal film was obtained with the polymerizable liquid crystal composition (20) in the same manner as in Example 1. The liquid crystal film exhibited uniform homeotropic alignment. The measurement of retardation of the film provided a curve similar to the curve shown in FIG. 1. The polymerizable liquid crystal composition (20) had good storage stability, and substantially no change in color thereof was observed. The polymerizable liquid crystal composition (20) also suffered no change in rotation viscosity of the solution, which indicated good storage stability.

Example 21

MIX1 described in Example 1 was used, and the compound (3-6-1) in a weight ratio of 0.10 was added to MIX1. A polymerizable liquid crystal composition (21) was prepared in the same manner as in Example 1 except that cyclohexanone was used as the solvent, and the ratio of the solvent was changed to 70% by weight. A liquid crystal film was obtained with the polymerizable liquid crystal composition (21) in the same manner as in Example 1. The liquid crystal film exhibited uniform homeotropic alignment. The measurement of retardation of the film provided a curve similar to the curve shown in FIG. 1. The polymerizable liquid crystal composition (21) had good storage stability, and substantially no change in color thereof was observed. The polymerizable liquid crystal composition (21) also suffered no change in rotation viscosity of the solution, which indicated good storage stability.

Example 22

MIX1 described in Example 1 was used, and the compound (3-6-1) in a weight ratio of 0.05, a polymerization initiator, IRGACURE 907, in a weight ratio of 0.06 and a sensitizer, KAYACURE DETX (produced by Nippon Kayaku Co., Ltd.), in a weight ratio of 0.02 were added to MIX1. A polymerizable liquid crystal composition (22) was prepared in the same manner as in Example 1 except that cyclohexanone was used as the solvent, and the ratio of the solvent was changed to 70% by weight. A liquid crystal film was obtained with the polymerizable liquid crystal composition (22) in the same manner as in Example 1. The liquid crystal film exhibited uniform homeotropic alignment. The measurement of retardation of the film provided a curve similar to the curve shown in FIG. 1. The polymerizable liquid crystal composition (22) had good storage stability, and substantially no change in color thereof was observed. The polymerizable liquid crystal composition (22) also suffered no change in rotation viscosity of the solution, which indicated good storage stability.

Example 23

A 4% aqueous solution of polyvinyl alcohol (GOHSENOL EG-25, produced by Nippon Synthetic Chemical Industry Co., Ltd.) was coated on a glass substrate (S-1112, produced by Matsunami Glass Industries, Ltd.), and after drying at 90° C. for 3 minutes, baked at 170° C. for 30 minutes. A liquid crystal film was obtained in the same manner as in Example 1 except that the polymerizable liquid crystal composition (21) described in Example 21 was used. The liquid crystal film exhibited uniform homeotropic alignment. The measurement of retardation of the film provided a curve similar to the curve shown in FIG. 1.

Example 24

The compound (1-2-7), the compound (4-2-3) and the compound (2-1-3) were mixed at a weight ratio of 60/10/30, and the resulting composition was designated as MIX17. The compound (3-6-1) in a weight ratio of 0.05 was added to MIX17, and a polymerizable liquid crystal composition (23) was prepared in the same manner as in Example 1 except that cyclohexanone was used as the solvent, and the ratio of the solvent was changed to 70% by weight. A liquid crystal film was obtained with the polymerizable liquid crystal composition (23) in the same manner as in Example 1. The liquid crystal film exhibited uniform homeotropic alignment. The measurement of retardation of the film provided a curve similar to the curve shown in FIG. 1. The polymerizable liquid crystal composition (23) had good storage stability, and substantially no change in color thereof was observed. The polymerizable liquid crystal composition (23) also suffered no change in rotation viscosity of the solution, which indicated good storage stability.

Example 25

The compound (1-2-7), the compound (1-1-3), the compound (4-2-3) and the compound (2-1-3) were mixed at a weight ratio of 40/20/10/30, and the resulting composition was designated as MIX18. The compound (3-6-1) in a weight ratio of 0.05 was added to MIX18, and a polymerizable liquid crystal composition (24) was prepared in the same manner as in Example 1 except that cyclohexanone was used as the solvent, and the ratio of the solvent was changed to 70% by weight. A liquid crystal film was obtained with the polymerizable liquid crystal composition (24) in the same manner as in Example 1. The liquid crystal film exhibited uniform homeotropic alignment. The measurement of retardation of the film provided a curve similar to the curve shown in FIG. 1. The polymerizable liquid crystal composition (24) had good storage stability, and substantially no change in color thereof was observed. The polymerizable liquid crystal composition (24) also suffered no change in rotation viscosity of the solution, which indicated good storage stability.

Example 26

The compound (1-2-7), the compound (1-1-3), the compound (4-2-3) and the compound (2-1-3) were mixed at a weight ratio of 50.5/15.5/10/24, and the resulting composition was designated as MIX19. The compound (3-6-1) in a weight ratio of 0.05 was added to MIX19, and a polymerizable liquid crystal composition (25) was prepared in the same manner as in Example 1 except that cyclohexanone was used as the solvent, and the ratio of the solvent was changed to 70% by weight. A liquid crystal film was obtained with the polymerizable liquid crystal composition (25) in the same manner as in Example 1. The liquid crystal film exhibited uniform homeotropic alignment. The measurement of retardation of the film provided a curve similar to the curve shown in FIG. 1. The polymerizable liquid crystal composition (25) had good storage stability, and substantially no change in color thereof was observed. The polymerizable liquid crystal composition (25) also suffered no change in rotation viscosity of the solution, which indicated good storage stability.

Example 27

The compound (1-2-9), the compound (1-1-3), the compound (4-2-3) and the compound (2-1-3) were mixed at a weight ratio of 50.5/15.5/10/24, and the resulting composition was designated as MIX20. The compound (3-6-1) in a weight ratio of 0.05 was added to MIX20, and a polymerizable liquid crystal composition (26) was prepared in the same manner as in Example 1 except that cyclohexanone was used as the solvent, and the ratio of the solvent was changed to 70% by weight. A liquid crystal film was obtained with the polymerizable liquid crystal composition (26) in the same manner as in Example 1. The liquid crystal film exhibited uniform homeotropic alignment. The measurement of retardation of the film provided a curve similar to the curve shown in FIG. 1. The polymerizable liquid crystal composition (26) had good storage stability, and substantially no change in color thereof was observed. The polymerizable liquid crystal composition (26) also suffered no change in rotation viscosity of the solution, which indicated good storage stability.

Example 28

The compound (1-2-12) and the compound (2-1-9) were mixed at a weight ratio of 65/35, and the resulting composition was designated as MIX21. The compound (3-6-1) in a weight ratio of 0.05 was added to MIX21, and a polymerizable liquid crystal composition (27) was prepared in the same manner as in Example 1 except that cyclohexanone was used as the solvent, and the ratio of the solvent was changed to 70% by weight. A liquid crystal film was obtained with the polymerizable liquid crystal composition (27) in the same manner as in Example 1. The liquid crystal film exhibited uniform homeotropic alignment. The measurement of retardation of the film provided a curve similar to the curve shown in FIG. 1. The polymerizable liquid crystal composition (27) had good storage stability, and substantially no change in color thereof was observed. The polymerizable liquid crystal composition (27) also suffered no change in rotation viscosity of the solution, which indicated good storage stability.

Example 29

The compound (1-2-12), the compound (4-2-15) and the compound (2-1-9) were mixed at a weight ratio of 60/10/30, and the resulting composition was designated as MIX22. The compound (3-6-1) in a weight ratio of 0.05 was added to MIX22, and a polymerizable liquid crystal composition (28) was prepared in the same manner as in Example 1 except that cyclohexanone was used as the solvent, and the ratio of the solvent was changed to 70% by weight. A liquid crystal film was obtained with the polymerizable liquid crystal composition (28) in the same manner as in Example 1. The liquid crystal film exhibited uniform homeotropic alignment. The measurement of retardation of the film provided a curve similar to the curve shown in FIG. 1. The polymerizable liquid crystal composition (28) had good storage stability, and substantially no change in color thereof was observed. The polymerizable liquid crystal composition (28) also suffered no change in rotation viscosity of the solution, which indicated good storage stability.

Example 30

The compound (1-1-3), the compound (4-1-1) and the compound (2-1-3) were mixed at a weight ratio of 60/10/30, and the resulting composition was designated as MIX23. The compound (3-6-1) in a weight ratio of 0.05 was added to MIX23, and a polymerizable liquid crystal composition (29) was prepared in the same manner as in Example 1 except that cyclohexanone was used as the solvent, and the ratio of the solvent was changed to 70% by weight. A liquid crystal film was obtained with the polymerizable liquid crystal composition (29) in the same manner as in Example 1 except that the substrate having a PVA film in Example 23 was used as the supporting substrate. The liquid crystal film exhibited uniform homeotropic alignment. The measurement of retardation of the film provided a curve similar to the curve shown in FIG. 1. The polymerizable liquid crystal composition (29) had good storage stability, and substantially no change in color thereof was observed. The polymerizable liquid crystal composition (29) also suffered no change in rotation viscosity of the solution, which indicated good storage stability.

Example 31

The compound (1-1-3), the compound (4-1-1) and the compound (2-1-3) were mixed at a weight ratio of 70/10/20, and the resulting composition was designated as MIX24. The compound (3-6-1) in a weight ratio of 0.05 was added to MIX24, and a polymerizable liquid crystal composition (30) was prepared in the same manner as in Example 1 except that cyclohexanone was used as the solvent, and the ratio of the solvent was changed to 70% by weight. A liquid crystal film was obtained with the polymerizable liquid crystal composition (30) in the same manner as in Example 1 except that the substrate having a PVA film in Example 23 was used as the supporting substrate. The liquid crystal film exhibited uniform homeotropic alignment. The measurement of retardation of the film provided a curve similar to the curve shown in FIG. 1. The polymerizable liquid crystal composition (30) had good storage stability, and substantially no change in color thereof was observed. The polymerizable liquid crystal composition (30) also suffered no change in rotation viscosity of the solution, which indicated good storage stability.

Example 32

MIX1 described in Example 1 was used, and the compound (3-6-1) in a weight ratio of 0.05, a polymerization initiator, IRGACURE 369, in a weight ratio of 0.05 and a polymerization initiator, IRGACURE Oxe02, in a weight ratio of 0.05 were added to MIX1. A polymerizable liquid crystal composition (32) was prepared in the same manner as in Example 1 except that cyclohexanone was used as the solvent, and the ratio of the solvent was changed to 70% by weight. A liquid crystal film was obtained with the polymerizable liquid crystal composition (32) in the same manner as in Example 1. The liquid crystal film exhibited uniform homeotropic alignment. The measurement of retardation of the film provided a curve similar to the curve shown in FIG. 1. The polymerizable liquid crystal composition (32) had good storage stability, and substantially no change in color thereof was observed. The polymerizable liquid crystal composition (32) also suffered no change in rotation viscosity of the solution, which indicated good storage stability.

Example 33

The compound (1-1-3), the compound (1-1-7) and the compound (2-1-3) were mixed at a weight ratio of 52.5/17.5/30, and the resulting composition was designated as MIX25. The compound (3-6-1) in a weight ratio of 0.10 was added to MIX25, and a polymerizable liquid crystal composition (33) was prepared in the same manner as in Example 1 except that cyclopentanone was used as the solvent, the ratio of the solvent was changed to 70% by weight, and a polymerization initiator, IRGACURE Oxe01, in a weight ratio of 0.06 was added. A liquid crystal film was obtained with the polymerizable liquid crystal composition (33) in the same manner as in Example 1 except that the drying temperature of the coated film was changed to 80° C. The liquid crystal film exhibited uniform homeotropic alignment. The measurement of retardation of the film provided a curve similar to the curve shown in FIG. 1. The polymerizable liquid crystal composition (33) had good storage stability, and substantially no change in color thereof was observed. The polymerizable liquid crystal composition (33) also suffered no change in rotation viscosity of the solution, which indicated good storage stability.

Comparative Example 1

A polymerizable liquid crystal composition was obtained in the same manner as in Example 1 except that the compound (3-1-1) was not added to MIX1 described in Example 1. A liquid crystal film was obtained with the polymerizable liquid crystal composition in the same manner as in Example 1, and the liquid crystal film exhibited random alignment.

Comparative Example 2

A polymerizable liquid crystal composition was obtained in the same manner as in Example 2 except that the compound (3-1-1) was not added to MIX2 described in Example 2. A liquid crystal film was obtained with the polymerizable liquid crystal composition in the same manner as in Example 1, and the liquid crystal film exhibited random alignment.

Comparative Example 3

A polymerizable liquid crystal composition was obtained in the same manner as in Example 3 except that the compound (3-1-1) was not added to MIX3 described in Example 3. A liquid crystal film was obtained with the polymerizable liquid crystal composition in the same manner as in Example 1, and the liquid crystal film exhibited random alignment.

Comparative Example 4

A polymerizable liquid crystal composition was obtained in the same manner as in Example 4 except that the compound (3-1-1) was not added to MIX4 described in Example 4. A liquid crystal film was obtained with the polymerizable liquid crystal composition in the same manner as in Example 1, and the liquid crystal film exhibited random alignment.

Comparative Example 5

A polymerizable liquid crystal composition was obtained in the same manner as in Example 5 except that the compound (3-1-1) was not added to MIX5 described in Example 5. A liquid crystal film was obtained with the polymerizable liquid crystal composition in the same manner as in Example 1, and the liquid crystal film exhibited random alignment.

Comparative Example 6

A polymerizable liquid crystal composition was obtained in the same manner as in Example 6 except that the compound (3-3-1) was not added to MIX6 described in Example 6. A liquid crystal film was obtained with the polymerizable liquid crystal composition in the same manner as in Example 1, and the liquid crystal film exhibited random alignment.

Comparative Example 7

A polymerizable liquid crystal composition was obtained in the same manner as in Example 7 except that the compound (3-6-1) was not added to MIX7 described in Example 7. A liquid crystal film was obtained with the polymerizable liquid crystal composition in the same manner as in Example 1, and the liquid crystal film exhibited random alignment.

Comparative Example 8

A polymerizable liquid crystal composition was obtained in the same manner as in Example 8 except that the compound (3-1-1) was not added to MIX3 described in Example 3, and the solvent was changed to cyclohexanone. A liquid crystal film was obtained with the polymerizable liquid crystal composition in the same manner as in Example 1, and the liquid crystal film exhibited random alignment.

Comparative Example 9

A polymerizable liquid crystal composition was obtained in the same manner as in Example 9 except that the compound (3-1-1) was not added to MIX3 described in Example 3, and the solvent was changed to a mixed solvent of toluene and ethyl lactate (1/1 by weight). A liquid crystal film was obtained with the polymerizable liquid crystal composition in the same manner as in Example 1, and the liquid crystal film exhibited random alignment.

Comparative Example 10

A polymerizable liquid crystal composition was obtained in the same manner as in Example 10 except that the compound (3-3-1) was not added to MIX8 described in Example 10, and the solvent was changed to toluene. A liquid crystal film was obtained with the polymerizable liquid crystal composition in the same manner as in Example 10, and the liquid crystal film exhibited random alignment.

Comparative Example 11

A polymerizable liquid crystal composition was obtained in the same manner as in Example 11 except that the compound (3-1-1) was not added to MIX8 described in Example 11, and the solvent was changed to toluene. A liquid crystal film was obtained with the polymerizable liquid crystal composition in the same manner as in Example 11, and the liquid crystal film exhibited random alignment.

Comparative Example 12

A polymerizable liquid crystal composition was obtained in the same manner as in Example 12 except that the compound (3-6-1) was not added to MIX9 described in Example 12, and the solvent was changed to a mixed solvent of toluene and 2-propanol (9/1 by weight). A liquid crystal film was obtained with the polymerizable liquid crystal composition in the same manner as in Example 12, and the liquid crystal film exhibited random alignment.

Comparative Example 13

A polymerizable liquid crystal composition was obtained in the same manner as in Example 13 except that the compound (3-6-1) was not added to MIX10 described in Example 13, and the solvent was changed to a mixed solvent of toluene and 2-propanol (9/1 by weight). A liquid crystal film was obtained with the polymerizable liquid crystal composition in the same manner as in Example 13, and the liquid crystal film exhibited random alignment.

Comparative Example 14

A polymerizable liquid crystal composition was obtained in the same manner as in Example 14 except that the compound (3-6-1) was not added to MIX1 described in Example 1, and the solvent was changed to cyclohexanone. A liquid crystal film was obtained with the polymerizable liquid crystal composition in the same manner as in Example 14, and the liquid crystal film exhibited random alignment.

Comparative Example 15

A polymerizable liquid crystal composition was obtained in the same manner as in Example 15 except that the compound (3-1-1) was not added to MIX12 described in Example 15. A liquid crystal film was obtained with the polymerizable liquid crystal composition in the same manner as in Example 1, and the liquid crystal film exhibited random alignment.

Comparative Example 16

A polymerizable liquid crystal composition was obtained in the same manner as in Example 16 except that the compound (3-1-1) was not added to MIX13 described in Example 16. A liquid crystal film was obtained with the polymerizable liquid crystal composition in the same manner as in Example 1, and the liquid crystal film exhibited random alignment.

Comparative Example 17

A polymerizable liquid crystal composition was obtained in the same manner as in Example 17 except that the compound (3-1-1) was not added to MIX14 described in Example 17. A liquid crystal film was obtained with the polymerizable liquid crystal composition in the same manner as in Example 1, and the liquid crystal film exhibited random alignment.

Comparative Example 18

A polymerizable liquid crystal composition was obtained in the same manner as in Example 18 except that the compound (3-6-1) was not added to MIX15 described in Example 18. A liquid crystal film was obtained with the polymerizable liquid crystal composition in the same manner as in Example 1, and the liquid crystal film exhibited random alignment.

Comparative Example 19

A polymerizable liquid crystal composition was obtained in the same manner as in Example 19 except that the compound (3-6-1) was not added to MIX16 described in Example 19. A liquid crystal film was obtained with the polymerizable liquid crystal composition in the same manner as in Example 1, and the liquid crystal film exhibited random alignment.

Comparative Example 20

A polymerizable liquid crystal composition was obtained in the same manner as in Example 20 except that the compound (3-6-1) was not added to MIX1 described in Example 1. A liquid crystal film was obtained with the polymerizable liquid crystal composition in the same manner as in Example 1, and the liquid crystal film exhibited random alignment.

Comparative Example 21

A polymerizable liquid crystal composition was obtained in the same manner as in Example 21 except that the compound (3-6-1) was not added to MIX1 described in Example 1. A liquid crystal film was obtained with the polymerizable liquid crystal composition in the same manner as in Example 1, and the liquid crystal film exhibited random alignment.

Comparative Example 22

A polymerizable liquid crystal composition was obtained in the same manner as in Example 22 except that the compound (3-6-1) was not added to MIX1 described in Example 1. A liquid crystal film was obtained with the polymerizable liquid crystal composition in the same manner as in Example 1, and the liquid crystal film exhibited random alignment.

Comparative Example 23

A polymerizable liquid crystal composition was obtained in the same manner as in Example 21 except that the compound (3-6-1) was not added to MIX1 described in Example 1. A liquid crystal film was obtained with the polymerizable liquid crystal composition in the same manner as in Example 23, and the liquid crystal film exhibited random alignment.

Comparative Example 24

A polymerizable liquid crystal composition was obtained in the same manner as in Example 24 except that the compound (3-6-1) was not added to MIX17 described in Example 24. A liquid crystal film was obtained with the polymerizable liquid crystal composition in the same manner as in Example 1, and the liquid crystal film exhibited random alignment.

Comparative Example 25

A polymerizable liquid crystal composition was obtained in the same manner as in Example 25 except that the compound (3-6-1) was not added to MIX18 described in Example 25. A liquid crystal film was obtained with the polymerizable liquid crystal composition in the same manner as in Example 1, and the liquid crystal film exhibited random alignment.

Comparative Example 26

A polymerizable liquid crystal composition was obtained in the same manner as in Example 26 except that the compound (3-6-1) was not added to MIX19 described in Example 26. A liquid crystal film was obtained with the polymerizable liquid crystal composition in the same manner as in Example 1, and the liquid crystal film exhibited random alignment.

Comparative Example 27

A polymerizable liquid crystal composition was obtained in the same manner as in Example 27 except that the compound (3-6-1) was not added to MIX20 described in Example 27. A liquid crystal film was obtained with the polymerizable liquid crystal composition in the same manner as in Example 1, and the liquid crystal film exhibited random alignment.

Comparative Example 28

A polymerizable liquid crystal composition was obtained in the same manner as in Example 28 except that the compound (3-6-1) was not added to MIX21 described in Example 28. A liquid crystal film was obtained with the polymerizable liquid crystal composition in the same manner as in Example 1, and the liquid crystal film exhibited random alignment.

Comparative Example 29

A polymerizable liquid crystal composition was obtained in the same manner as in Example 29 except that the compound (3-6-1) was not added to MIX22 described in Example 29. A liquid crystal film was obtained with the polymerizable liquid crystal composition in the same manner as in Example 1, and the liquid crystal film exhibited random alignment.

Comparative Example 30

A polymerizable liquid crystal composition was obtained in the same manner as in Example 30 except that the compound (3-6-1) was not added to MIX23 described in Example 30. A liquid crystal film was obtained with the polymerizable liquid crystal composition in the same manner as in Example 1, and the liquid crystal film exhibited random alignment.

Comparative Example 31

A polymerizable liquid crystal composition was obtained in the same manner as in Example 31 except that the compound (3-6-1) was not added to MIX24 described in Example 31. A liquid crystal film was obtained with the polymerizable liquid crystal composition in the same manner as in Example 1, and the liquid crystal film exhibited random alignment.

Comparative Example 32

A polymerizable liquid crystal composition was obtained in the same manner as in Example 32 except that the compound (3-6-1) was not added to the polymerizable liquid crystal composition (32) described in Example 32. A liquid crystal film was obtained with the polymerizable liquid crystal composition in the same manner as in Example 1, and the liquid crystal film exhibited random alignment.

Comparative Example 33

A polymerizable liquid crystal composition was obtained in the same manner as in Example 33 except that the compound (3-6-1) was not added to the polymerizable liquid crystal composition (33) described in Example 33. A liquid crystal film was obtained with the polymerizable liquid crystal composition in the same manner as in Example 1, and the liquid crystal film exhibited random alignment.

It is understood from the results of Examples and Comparative Examples that the liquid crystal films obtained with the polymerizable liquid crystal compositions of the invention exhibit uniform homeotropic alignment irrespective to the kind of the supporting substrate without an alignment film having long chain alkyl or a surface treatment, and the polymerizable liquid crystal compositions have no problem in storage stability.

INDUSTRIAL APPLICABILITY

According to the invention, a polymerizable liquid crystal composition excellent in storage stability can be obtained. A liquid crystal film exhibiting uniform homeotropic alignment without a special alignment film irrespective to the kind of the supporting substrate can be obtained with the polymerizable liquid crystal composition.

The invention claimed is:
1. A polymerizable liquid crystal composition containing at least one compound selected from a group of compounds represented by the formulae (1-1) and (1-2) as a component (A), at least one compound selected from a group of compounds represented by the formula (2-1) as a component (B), and at least one compound selected from a group of compounds represented by the formulae (3-1) to (3-6) as a component (C); optionally containing at least one compound selected from a group of compounds represented by the formulae (4-1) and (4-2) as a component (D); and optionally containing a non-liquid crystalline multifunctional polymerizable compound having from 3 to 70 acryloyl groups or methacryloyl groups in one molecule as a component (E):

(1-1)

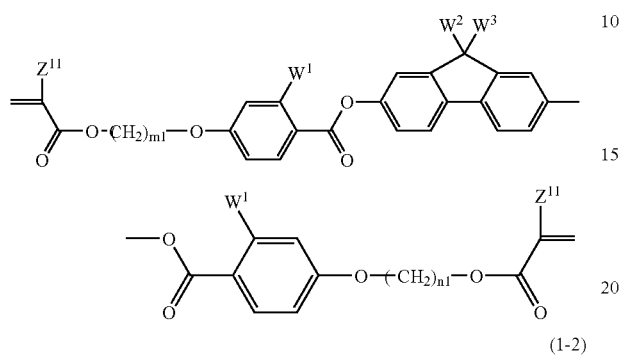

(1-2)

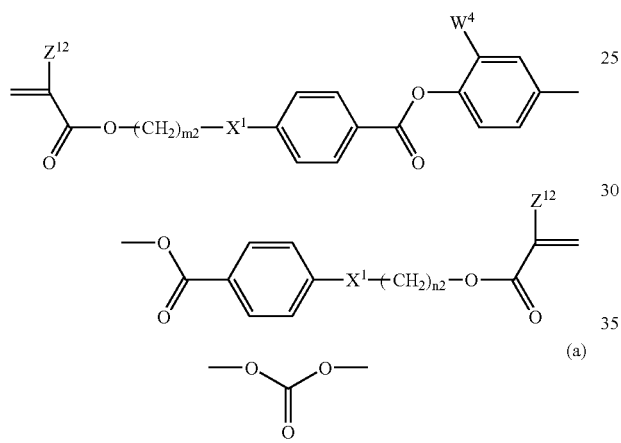

(a)

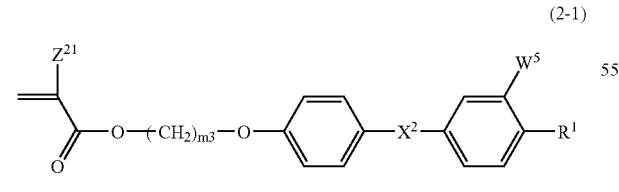

wherein $Z^{11}$ independently represents hydrogen, fluorine, methyl or trifluoromethyl; $Z^{12}$ independently represents hydrogen, fluorine, methyl or trifluoromethyl; $W^1$ independently represents hydrogen or fluorine; $W^2$ and $W^3$ each independently represents hydrogen or methyl; $W^4$ represents hydrogen or methyl; $X^1$ represents —O— or a group represented by the formula (a); and m1, m2, n1 and n2 each independently represents an integer of from 2 to 15, (2-1)

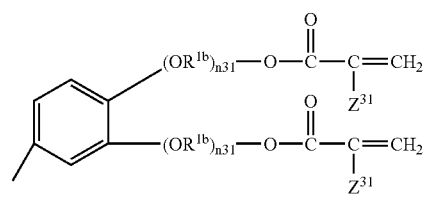

wherein $Z^{21}$ represents hydrogen or methyl; $R^1$ represents cyano, trifluoromethoxy, alkyl having from 1 to 10 carbon atoms or alkoxy having from 1 to 10 carbon atoms; $W^5$ represents hydrogen or fluorine; $X^2$ represents a single bond, —COO— or —OCO—; and m3 represents an integer of from 2 to 15, (3-1)

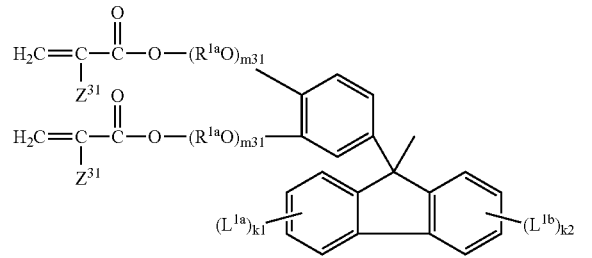

(3-2)

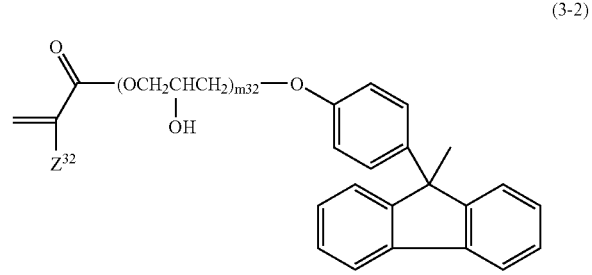

(3-3)

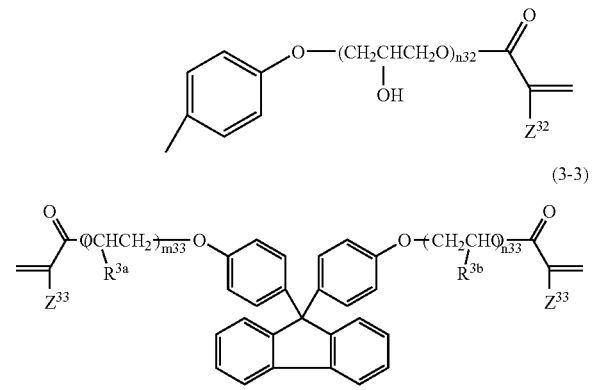

(3-4)

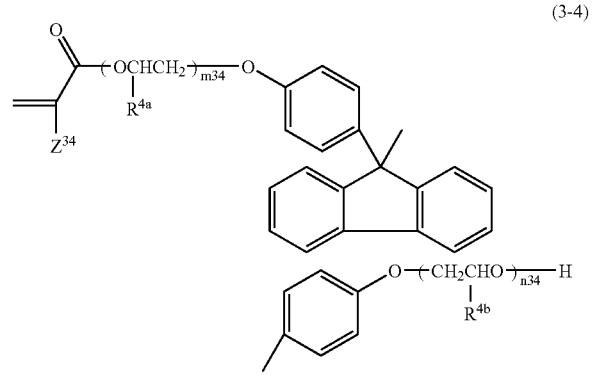

-continued

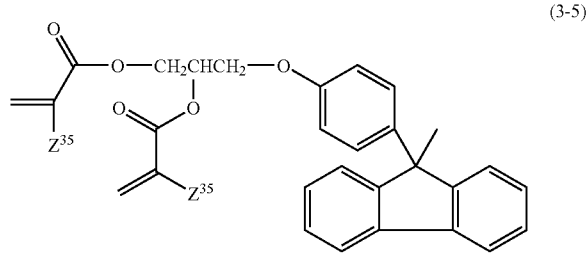

(3-5)

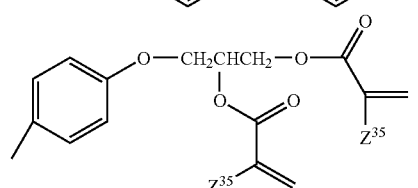
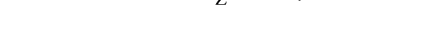

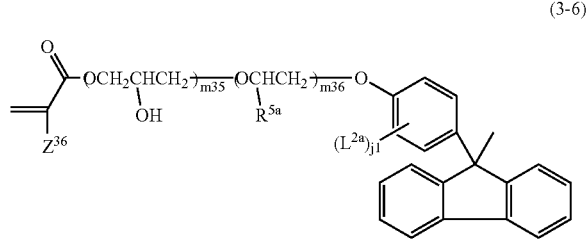

(3-6)

wherein in the formula (3-1), $L^{1a}$ and $L^{1b}$ each independently represents alkyl having from 1 to 4 carbon atoms; $R^{1a}$ and $R^{1b}$ each independently represents alkylene having from 2 to 4 carbon atoms; $Z^{31}$ independently represents hydrogen or methyl; k1 and k2 each independently represents an integer of from 0 to 4; and m31 and n31 each independently represents an integer of from 0 to 6, in the formula (3-2), $Z^{32}$ independently represents hydrogen or methyl; and m32 and n32 each independently represents an integer of from 1 to 3, in the formula (3-3), $Z^{33}$ independently represents hydrogen or methyl; $R^{3a}$ and $R^{3b}$ each independently represents hydrogen, methyl or ethyl; and m33 and n33 each independently represents an integer of from 0 to 3, in the formula (3-4), $Z^{34}$ represents hydrogen or methyl; $R^{4a}$ and $R^{4b}$ each independently represents hydrogen or alkyl having from 1 to 6 carbon atoms; and m34 and n34 each independently represents an integer of from 0 to 10, in the formula (3-5), $Z^{35}$ independently represents hydrogen or methyl, and in the formula (3-6), $Z^{36}$ independently represents hydrogen or methyl; $R^{5a}$ and $R^{5b}$ each independently represents hydrogen or alkyl having from 1 to 6 carbon atoms; $L^{2a}$ and $L^{2b}$ each independently represents alkyl having from 1 to 6 carbon atoms; m35 and n35 each independently represents an integer of from 1 to 3; m36 and n36 each independently represents an integer of from 1 to 3; and j1 and j2 each independently represents an integer of from 0 to 4,

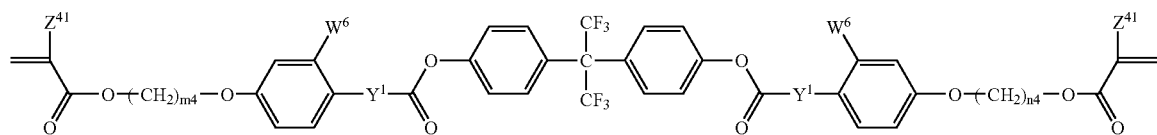

(4-1)

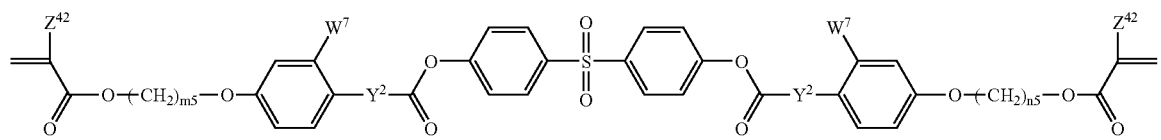

(4-2)

wherein $Z^{41}$ and $Z^{42}$ each independently represents hydrogen or methyl; $Y^1$ and $Y^2$ each independently represents a single bond, —$(CH_2)_2$— or —CH=CH—; $W^6$ and $W^7$ each independently represents hydrogen or fluorine; and m4, m5, n4 and n5 each independently represents an integer of from 2 to 15.

2. The polymerizable liquid crystal composition according to claim 1, wherein in the formulae (1-1) and (1-2), $Z^{11}$ independently represents hydrogen, fluorine, methyl or trifluoromethyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); and m1, m2, n1 and n2 each independently represents an integer of from 2 to 10, in the formula (2-1), $Z^{21}$ represents hydrogen or methyl; $R^1$ represents cyano, alkyl having from 1 to 8 carbon atoms or alkoxy having from 1 to 8 carbon atoms; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ independently represents hydrogen or methyl; and m31 and n31 each independently represents an integer of from 0 to 6, in the formula (3-2), $Z^{32}$ independently represents hydrogen or methyl; and m32 and n32 each independently represents an integer of from 1 to 3, in the formula (3-3), $Z^{33}$ independently represents hydrogen or methyl; $R^{3a}$ and $R^{3b}$ each independently represents hydrogen, methyl or ethyl; and m33 and n33 each independently represents an integer of from 0 to 3, in the formula (3-4), $Z^{34}$ represents hydrogen or methyl; $R^{4a}$ and $R^{4b}$ each independently represents hydrogen or alkyl having from 1 to 6 carbon atoms; and m34 and n34 each independently represents an integer of from 0 to 10, in the formula (3-5), $Z^{35}$ independently represents hydrogen or methyl, in the formula (3-6), $Z^{36}$ independently represents hydrogen or methyl; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —$(CH_2)_2$— or —CH=CH—; $W^6$ and $W^7$ each independently represents hydrogen or fluorine; and m4, m5, n4 and n5 each independently represents an integer of from 2 to 10, the component (E) is a non-liquid crystalline multifunctional polymerizable compound having from 3 to 64 acryloyloxy groups or methacryloyloxy groups in one molecule, and the ratio of the component (A) is from 30 to 97% by weight, the ratio of the component (B) is from 3 to 45% by weight, and the ratio of the component (D) is from 0 to 25% by weight, based on the total weight of the component (A), the component (B) and the component (D), and the weight ratio of the component (C) is from 0.01 to 0.20 and the weight ratio of the component (E) is from 0 to 0.30, in terms of the total weight of the component (A), the component (B) and the component (D).

3. The polymerizable liquid crystal composition according to claim 1, wherein in the formulae (1-1) and (1-2), $Z^{11}$ independently represents hydrogen or methyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); and m1, m2, n1 and n2 each independently represents an integer of from 2 to 10, in the formula (2-1), $Z^{21}$ represents hydrogen or methyl; $R^1$ represents cyano, alkyl having from 1 to 8 carbon atoms or alkoxy having from 1 to 8 carbon atoms; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ represents hydrogen; and m31 and n31 each independently represents an integer of from 0 to 6, in the formula (3-2), $Z^{32}$ represents hydrogen; and m32 and n32 each independently represents an integer of from 1 to 3, in the formula (3-3), $Z^{33}$ represents hydrogen; $R^{3a}$ and $R^{3b}$ each represents hydrogen; and m33 and n33 each independently represents an integer of from 0 to 3, in the formula (3-4), $Z^{34}$ represents hydrogen; $R^{4a}$ and $R^{4b}$ each represents hydrogen; and m34 and n34 each independently represents an integer of from 0 to 10, in the formula (3-5), $Z^{35}$ represents hydrogen, in the formula (3-6), $Z^{36}$ represents hydrogen; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —$(CH_2)_2$— or —CH=CH—; $W^6$ and $W^7$ each independently represents hydrogen or fluorine; and m4, m5, n4 and n5 each independently represents an integer of from 2 to 10, the component (E) is a non-liquid crystalline multifunctional polymerizable compound having from 3 to 32 acryloyloxy groups or methacryloyloxy groups in one molecule, and the ratio of the component (A) is from 35 to 97% by weight, the ratio of the component (B) is from 3 to 45% by weight, and the ratio of the component (D) from 0 to 20% by weight, based on the total weight of the component (A), the component (B) and the component (D), and the weight ratio of the component (C) is from 0.01 to 0.20 and the weight ratio of the component (E) is from 0 to 0.28, in terms of the total weight of the component (A), the component (B) and the component (D).

4. The polymerizable liquid crystal composition according to claim 1, wherein in the formulae (1-1) and (1-2), $Z^{11}$ independently represents hydrogen or methyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); and m1, m2, n1 and n2 each independently represents an integer of from 2 to 10, in the formula (2-1), $Z^{21}$ represents hydrogen or methyl; $R^1$ represents cyano, alkyl having from 1 to 8 carbon atoms or alkoxy having from 1 to 8 carbon atoms; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ represents hydrogen; and m31 and n31 each independently represents an integer of from 0 to 6, in the formula (3-2), $Z^{32}$ represents hydrogen; and m32 and n32 each represents 1, in the formula (3-3), $Z^{33}$ represents hydrogen; $R^{3a}$ and $R^{3b}$ each represents hydrogen; and m33 and n33 each independently represents an integer of from 1 to 3, in the formula (3-4), $Z^{34}$ represents hydrogen; $R^{4a}$ and $R^{4b}$ each represents hydrogen; and m34 and n34 each independently represents an integer of from 0 to 5, in the formula (3-5), $Z^{35}$ represents hydrogen, in the formula (3-6), $Z^{36}$ represents hydrogen; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 2 to 10, the component (E) is a non-liquid crystalline multifunctional polymerizable compound having from 3 to 32 acryloyloxy groups or methacryloyloxy groups in one molecule, and the ratio of the component (A) is from 35 to 95% by weight, the ratio of the component (B) is from 5 to 45% by weight, and the ratio of the component (D) is from 0 to 20% by weight, based on the total weight of the component (A), the component (B) and the component (D), and the weight ratio of the component (C) is from 0.01 to 0.20 and the weight ratio of the component (E) is from 0 to 0.28, in terms of the total weight of the component (A), the component (B) and the component (D).

5. The polymerizable liquid crystal composition according to claim 1, wherein in the formulae (1-1) and (1-2), $Z^{11}$ independently represents hydrogen or methyl; $Z^{12}$ independently represents hydrogen, fluorine, methyl or trifluoromethyl; $W^1$ represents hydrogen; $W^2$ represents hydrogen; $W^3$ represents methyl; $W^4$ represents hydrogen or methyl; $X^1$ represents —O— or a group represented by the formula (a); m1 and n1 each independently represents an integer of from 2 to 8; and m2 and n2 each independently represents an integer of from 2 to 8, in the formula (2-1), $Z^{21}$ represents hydrogen or methyl; $R^1$ represents cyano; $W^5$ represents hydrogen; $X^2$ represents a single bond, —COO— or —OCO—; and m3 represents an integer of from 2 to 10, in the formula (3-1), k1 and k2 each represents 0; $R^{1a}$ and $R^{1b}$ each independently represents alkylene having from 2 to 4 carbon atoms; $Z^{31}$ represents hydrogen; and m31 and n31 each independently represents an integer of from 1 to 4, in the formula (3-2), $Z^{32}$ represents hydrogen; and m32 and n32 each represents 1, in the formula (3-3), $Z^{33}$ represents hydrogen; $R^{3a}$ and $R^{3b}$ each represents hydrogen; and m33 and n33 each independently represents an integer of from 1 to 3, in the formula (3-4), $Z^{34}$ represents hydrogen; $R^{4a}$ and $R^{4b}$ each represents hydrogen; and m34 and n34 each independently represents an integer of from 0 to 2, in the formula (3-5), $Z^{35}$ represents hydrogen, in the formula (3-6), $Z^{36}$ represents hydrogen; $R^{5a}$ and $R^{5b}$ each represents hydrogen; m35 and n35 each independently represents an integer of from 1 to 3; m36 and n36 each independently represents an integer of from 1 to 3; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 2 to 8, the component (E) is a non-liquid crystalline multifunctional polymerizable compound having from 3 to 16 acryloyloxy groups or methacryloyloxy groups in one molecule, and the ratio of the component (A) is from 35 to 90% by weight, the ratio of the component (B) is from 10 to 45% by weight, and the ratio of the component (D) is from 0 to 20% by weight, based on the total weight of the component (A), the component (B) and the component (D), and the weight ratio of the component (C) is from 0.03 to 0.15 and the weight ratio of the component (E) is from 0 to 0.28, in terms of the total weight of the component (A), the component (B) and the component (D).

6. The polymerizable liquid crystal composition according to claim 1, wherein in the formulae (1-1) and (1-2), $Z^{11}$ independently represents hydrogen or methyl; $Z^{12}$ independently represents hydrogen, fluorine or methyl; $W^1$ represents hydrogen; $W^2$ represents hydrogen; $W^3$ represents methyl; $W^4$ represents hydrogen or methyl; $X^1$ represents —O— or a group represented by the formula (a); m1 and n1 each independently represents an integer of from 4 to 6; and m2 and n2 each independently represents an integer of from 4 to 6, in the formula (2-1), $Z^{21}$ represents hydrogen or methyl; $R^1$ represents cyano; $W^5$ represents hydrogen; $X^2$ represents a single bond, —COO— or —OCO—; and m3 represents an integer of from 4 to 6, in the formula (3-1), k1 and k2 each represents 0; $R^{1a}$ and $R^{1b}$ each represents ethylene; $Z^{31}$ represents hydrogen; and m31 and n31 each represents 1, in the formula (3-2), $Z^{32}$ represents hydrogen; and m32 and n32 each represents 1, in the formula (3-3), $Z^{33}$ represents hydrogen; $R^{3a}$ and $R^{3b}$ each represents hydrogen; and m33 and n33 each independently represents an integer of from 1 to 3, in the formula (3-4), $Z^{34}$ represents hydrogen; $R^{4a}$ and $R^{4b}$ each represents hydrogen; and m34 and n34 each independently represents an integer of from 0 to 2, in the formula (3-5), $Z^{35}$ represents hydrogen, in the formula (3-6), $Z^{36}$ represents hydrogen; $R^{5a}$ and $R^{5b}$ each represents hydrogen; m35 and n35 each represents 1; m36 and n36 each represents 1; and j1 and j2 each represents 0, in the formulae (4-1) and (4-2), $Z^{41}$ and $Z^{42}$ each independently represents hydrogen or methyl; $Y^1$ and $Y^2$ each independently represents a single bond, —(CH$_2$)$_2$— or —CH=CH—; $W^6$ and $W^7$ each independently represents hydrogen or fluorine; and m4, m5, n4 and n5 each independently represents an integer of from 4 to 6, the component (E) is a non-liquid crystalline multifunctional polymerizable compound having from 3 to 16 acryloyloxy groups or methacryloyloxy groups in one molecule, and the ratio of the component (A) is from 45 to 90% by weight, the ratio of the component (B) is from 10 to 40% by weight, and the ratio of the component (D) is from 0 to 15% by weight, based on the total weight of the component (A), the component (B) and the component (D), and the weight ratio of the component (C) is from 0.03 to 0.15 and the weight ratio of the component (E) is from 0 to 0.28, in terms of the total weight of the component (A), the component (B) and the component (D).

7. A polymerizable liquid crystal layer obtained by coating the polymerizable liquid crystal composition according to claim 1 directly on a supporting substrate.

8. The polymerizable liquid crystal layer according to claim 7, wherein the supporting substrate is a glass substrate.

9. The polymerizable liquid crystal layer according to claim 7, wherein the supporting substrate is a glass substrate having a plastic thin film coated on a surface thereof, or a plastic substrate comprising a plastic film.

10. The polymerizable liquid crystal layer according to claim 7, wherein the supporting substrate is a glass substrate having a plastic thin film coated on a surface thereof and being subjected a rubbing treatment, a corona treatment or a plasma treatment on a surface of the plastic thin film, or a plastic substrate containing a plastic film being subjected a rubbing treatment, a corona treatment or a plasma treatment on a surface thereof.

11. The polymerizable liquid crystal layer according to claim 9, wherein the plastic material of the plastic thin film and the plastic film is any one of polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

12. The polymerizable liquid crystal layer according to claim 11, wherein the plastic material of the plastic thin film and the plastic film is any one of polyimide, polyvinyl alcohol, triacetyl cellulose, a partially saponified product of triacetyl cellulose and a cycloolefin resin.

13. The polymerizable liquid crystal layer according to claim 7, wherein an alignment state of a liquid crystal skeleton in the polymerizable liquid crystal layer is homeotropic alignment.

14. A liquid crystal film obtained by ploymerizing the polymerizable liquid crystal layer according to claim 7.

15. An optical compensation device comprising the liquid crystal film according to claim 14.

16. An optical device comprising the liquid crystal film according to claim 14 and a polarizing plate.

17. A liquid crystal display device comprising the optical compensation device according to claim 15 on an inner surface or an outer surface of a liquid crystal cell.

18. A liquid crystal display device comprising the optical device according to claim 16 on an outer surface of a liquid crystal cell.

* * * * *